United States Patent
Izawa et al.

(10) Patent No.: US 7,228,209 B2
(45) Date of Patent: Jun. 5, 2007

(54) VEHICLE-DRIVE CONTROL SYSTEM AND METHOD AND PROGRAM THEREFOR

(75) Inventors: Kazuyuki Izawa, Anjo (JP); Hideki Hisada, Anjo (JP); Masaki Nomura, Anjo (JP); Kozo Yamaguchi, Anjo (JP); Toshio Okoshi, Anjo (JP); Tomochika Inagaki, Anjo (JP); Kazuma Hasegawa, Kariya (JP)

(73) Assignee: Aisin AW Co., Ltd., Anjo (JP)

( * ) Notice: Subject to any disclaimer, the term of this patent is extended or adjusted under 35 U.S.C. 154(b) by 190 days.

(21) Appl. No.: 10/856,861

(22) Filed: Jun. 1, 2004

(65) Prior Publication Data
US 2004/0255904 A1 Dec. 23, 2004

(30) Foreign Application Priority Data
Jun. 6, 2003 (JP) ............................. 2003-162551
Feb. 24, 2004 (JP) ............................. 2004-048120

(51) Int. Cl.
*B60L 9/00* (2006.01)
(52) U.S. Cl. ............................ 701/22; 701/54; 701/61; 701/87; 701/104; 477/43
(58) Field of Classification Search .................. 701/22, 701/54, 55, 56, 61, 87, 90, 101, 103, 104; 477/43, 48
See application file for complete search history.

(56) References Cited

U.S. PATENT DOCUMENTS 6,401,022 B2 * 6/2002 Kubota et al. ................. 701/54
6,647,955 B1 11/2003 Seiber
2002/0189582 A1 * 12/2002 Mamiya et al. ............. 123/295
2004/0216719 A1 11/2004 Condemine et al.

FOREIGN PATENT DOCUMENTS

| EP | 1 113 169 A1 | 7/2001 |
|---|---|---|
| EP | 1 136 696 A1 | 9/2001 |
| JP | A 9-264235 | 10/1997 |
| JP | 2001-225674 | 8/2001 |
| JP | A 2001-221138 | 8/2001 |
| WO | WO 01-44636 A2 | 6/2001 |
| WO | WO 03/012273 A2 | 2/2003 |

* cited by examiner

*Primary Examiner*—Gertrude A. Jeanglaude
(74) *Attorney, Agent, or Firm*—Oliff & Berridge, PLC

(57) ABSTRACT

The invention includes a target-engine-speed acquisition element that acquires a target engine speed necessary to reduce engine speed, thereby stopping the engine at a target stop position; a crank-angle acquisition element that acquires a crank angle indicative of the position of a crankshaft; and a target-engine-speed correction element that corrects the target engine speed according to the acquired crank angle. Because the target engine speed is corrected according to the crank angle, the engine can be stopped at the target stop position even if the friction in the engine, the electric motor, etc. varies, the temperature or viscosity of the lubricating and cooling oils varies, or the vehicle is accelerated or decelerated during the reduction of the engine speed.

22 Claims, 35 Drawing Sheets

| ELAPSED TIME | 0 | 50 | 100 | 150 | 200 | 250 | 300 | 350 | 400 | 450 | 500 |
|---|---|---|---|---|---|---|---|---|---|---|---|
| TARGET INTERGRATED VALUE $\Sigma\rho^*$ | 0 | 91 | 177 | 259 | 337 | 408 | 475 | 535 | 591 | 644 | 690 |
| | 550 | 600 | 650 | 700 | 750 | 800 | 850 | 900 | 950 | 1000 | 1500 |
| | 732 | 770 | 802 | 832 | 855 | 875 | 891 | 901 | 904 | 905 | 905 |

FIG. 31

| ELAPSED TIME | 0 | 50 | 100 | 150 | 200 | 250 | 300 | 350 | 400 | 450 | 500 | | 1000 | 1500 |
|---|---|---|---|---|---|---|---|---|---|---|---|---|---|---|
| TARGET INTERGRATED VALUE Σρ | 0 | 91 | 177 | 259 | 337 | 408 | 475 | 535 | 591 | 644 | 690 | | | |
| WEIGHT w | 1 | 1 | 1 | 1 | 1.1 | 1.1 | 1.1 | 1.2 | 1.2 | 1.2 | 1.3 | | | |
| | 550 | 600 | 650 | 700 | 750 | 800 | 850 | 900 | 950 | 1000 | 1500 | | | |
| | 732 | 770 | 802 | 832 | 855 | 875 | 891 | 901 | 904 | 905 | 905 | | | |
| | 1.3 | 1.4 | 1.4 | 1.5 | 1.5 | 1.5 | 1.5 | 1.5 | 1.5 | 1.5 | 1.5 | | | |

FIG. 38

VEHICLE-DRIVE CONTROL SYSTEM AND METHOD AND PROGRAM THEREFOR

This application claims priority from JP 2003-162551 filed Jun. 6, 2003, and JP 2004-048120 filed Feb. 24, 2004, the disclosures of which are incorporated in their entireties herein by reference thereto.

BACKGROUND OF THE INVENTION

1. Field of Invention

The invention relates to a system and a method for controlling the drive of a vehicle and a program therefor.

2. Description of Related Art

In vehicle drive systems (power trains) including generator motors between engines and transmissions, the rotors of the generator motors are joined between the engines and the input shafts of the transmissions and the stators are disposed radially outside the rotors. In the vehicle drive systems, the torque of the generators, or generator torque, can be transmitted to the engines to start them by using and driving the generator motors as a motor and electrical energy can be generated by using the generator motors as a generator and collecting the rotational energy of the rotors.

In hybrid-vehicle drive systems including planetary gear units, for transmitting the torque of the engine, or part of the engine torque, to generators, and transmitting the remaining to driving wheels together with the torque of drive motors, or drive-motor torque, carriers and the engine are joined together, ring gears and driving wheels are joined together, and sun gears and the generators are joined together. In the vehicle drive systems, the generator torque generated by using and driving the generators as a motor is transmitted to the engine to start the engine and electrical energy can be generated by collecting the rotational energy of the rotors of the generators in an overdriven condition.

A vehicle-drive control system is provided in which a crank angle at engine stop is recorded as a stop crank angle when the position of the crankshaft, which is the rotating position of the engine 11, is expressed as an angle from a specified reference point (hereinafter, referred to as a reference point), namely, a crank angle, and in which the generator motor is driven to start the engine at engine startup to rotate the crankshaft from the stop crank angle to a crank angle best suited to start the engine, namely, an optimum crank angle. See, for example, JP-A-2001-221138.

In this case, however, because it is necessary to rotate the crankshaft to the position of the optimum crank angle at the start of the engine, not only the engine start timing is delayed correspondingly but also an uncomfortable feeling may be produced in the occupant of the vehicle.

Accordingly, a vehicle-drive control system is provided in which a generator motor is driven to control the brake when the drive of the engine is stopped, with the position of the optimum crank angle as target stop position, to stop the engine at the target stop position as found, for example, in JP-A-9-264235.

FIG. 2 is a time chart for the operation of the conventional vehicle-drive control system. When the ignition switch is turned off to turn an ignition switch SGig from on to off at timing t1, the fuel injection control and ignition control in the engine are stopped. Although the engine thereafter continues to rotate by inertia, the engine speed NE decreases gradually by friction. When the engine speed NE becomes lower than, for example, 100 rpm, the system waits until the value of the counter indicating a crank angle reaches a start count value indicating the position to start preset brake control. When the count value reaches the start count value at timing t2, the brake control by the generator motor is started. The start count value is set so as to be within the range indicating an optimum crank angle when the engine speed NE reaches 0 rpm.

The engine speed NE decreases with the brake control, and when the engine speed NE reaches 0 rpm at timing t3, the brake control is finished. In this way, the engine is stopped at a target stop position.

SUMMARY OF THE INVENTION

Thus, in the conventional vehicle-drive control systems, when the friction of the engine, generator motors, etc. varies or the temperature or viscosity of lubricating and cooling oils varies, the count value during the brake control also varies. As a result, it becomes difficult to place the crankshaft at the optimum crank angle when the brake control is finished. Also, when the vehicle-drive control systems are mounted to hybrid vehicles to execute brake control process, it becomes more difficult to place the crankshaft at the optimum crank angle.

FIG. 3 is a first speed diagram for the conventional hybrid vehicle, showing the state before starting brake control. FIG. 4 is a second speed diagram for the conventional hybrid vehicle, showing the state when starting the brake control. FIG. 5 is a third speed diagram for the conventional hybrid vehicle, showing the state during the brake control.

In the drawings, the broken lines indicate the rotational speed of a ring gear, namely, a ring-gear speed NR, the rotational speed of the engine, namely, the engine speed NE, and the rotational speed of the generator, namely, a generator speed NG when the hybrid vehicle is stopped. Referring to FIG. 3, the solid line indicates a state in which the engine and the drive motor are driven and the generator brake is engaged. When the brake control is started in the state of FIG. 3, a target generator speed NG* indicating the target value of the generator speed, namely, the generator speed NG is determined from the present rotational speed of the drive motor, namely, a drive-motor speed NM, and the target generator speed NG* is gradually decreased. As a result, as shown in FIG. 4, the target generator speed NG* is gradually decreased in the direction of the arrow A1 and the engine speed NE is simultaneously decreased.

Referring to FIG. 5, when the ring-gear speed NR varies in the directions of the arrow A2, because of variations in friction in the engine, the generators, etc., variations in the temperature or viscosity of the lubricating and cooling oils, or variations in pressure in the cylinders of the engine, the drive-motor speed NM also varies causing the target generator speed NG* to vary. As a result, when the generator speed NG gradually decreases, and so the engine speed NE gradually decreases, the generator speed NG varies in the directions of the arrow A3 and the engine speed NE varies in the directions of the arrow A4. This makes it more difficult to place the crankshaft at the target stop position to stop the engine at the target stop position when the brake control is finished.

When the engine cannot be stopped at the target stop position, the generator must be driven to rotate the crankshaft at a specified timing after the engine stop, giving the occupants of the vehicle a shock and uncomfortable feeling.

Accordingly, it is an object of the invention to provide a system and a method for controlling the drive of a vehicle and a program therefor in which the problems of the conventional vehicle-drive control system are addressed and solved to allow the engine to be stopped at a target stop position.

According to the invention, the vehicle-drive control system includes a target-engine-speed acquisition means for reducing the engine speed to acquire a target engine speed necessary to stop the engine at a target stop position, a crank-angle acquisition means for acquiring a crank angle indicative of the position of a crankshaft, and a target-engine-speed correction means for correcting the target engine speed according to the acquired crank angle.

In that case, a crank angle is acquired and the target engine speed is corrected according to the acquired crank angle. Accordingly, even if the friction in the engine, the electric motor, etc. varies, the temperature or viscosity of the lubricating and cooling oils varies, or the vehicle is accelerated or decelerated during reduction of the engine speed, the engine can be stopped at a target stop position. The engine can then be started at an optimum crank angle. This prevents the occurrence of a shock along with the startup.

Also, there is no need to move the crankshaft to the position of an optimum crank angle after stopping the engine. This prevents the occurrence of torque fluctuations due to the rotation of the crankshaft and eliminates the need to move the crankshaft to the position of the optimum crank angle at the start of the engine to prevent the delay of engine-start timing, thus giving no uncomfortable feeling to occupants.

BRIEF DESCRIPTION OF THE DRAWINGS

The invention will be described with reference to the drawings, in which:

FIG. 31 is a second diagram of the target-integrated-value map according to the embodiment of the invention;

FIG. 38 is a second diagram of the target-integrated-value map according to the variant of the invention;

DETAILED DESCRIPTION OF PREFERRED EMBODIMENTS

Figure 1:
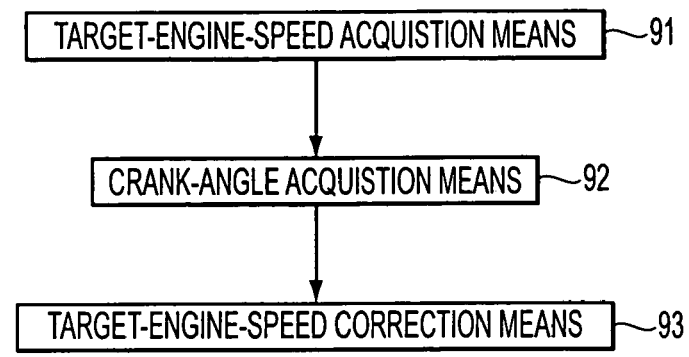
FIG. 1 is a functional block diagram of a hybrid-vehicle-drive control system according to an embodiment of the invention.
Figure 2:
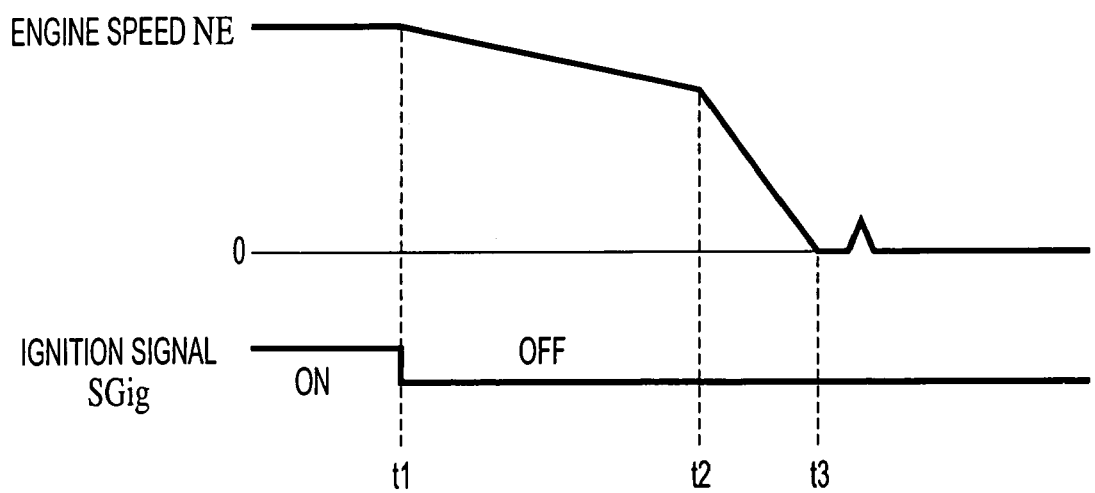
FIG. 2 is a time chart for the operation of a conventional vehicle-drive control system.
Figure 3:
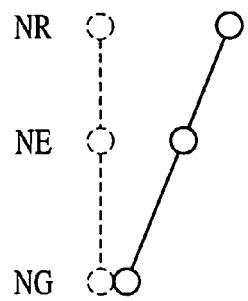
FIG. 3 is a first speed diagram of the conventional hybrid vehicle, showing a state before starting brake control.
Figure 4:
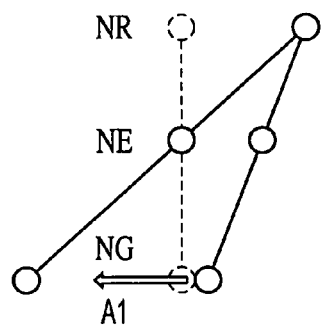
FIG. 4 is a second speed diagram of the conventional hybrid vehicle, showing a state when starting the brake control.
Figure 5:
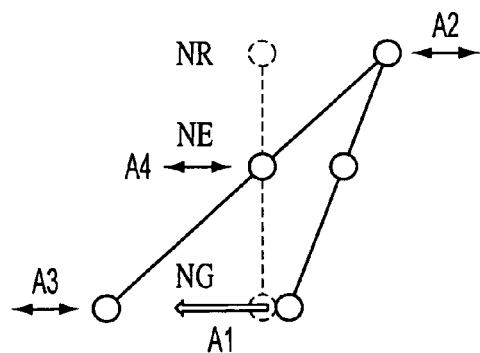
FIG. 5 is a third speed diagram of the conventional hybrid vehicle, showing a state during the brake control.

A base embodiment, and variants thereof, of the invention will be specifically described hereinafter with reference to the drawings. In this description, a vehicle drive system is mounted to a hybrid vehicle as the vehicle and a hybrid-vehicle-drive control system as the vehicle-drive control system for controlling the hybrid-vehicle-drive will be described. FIG. 1 is a functional block diagram of a hybrid-vehicle-drive control system according to the base embodiment.

In the drawing, reference numeral 91 denotes a target-engine-speed acquisition means for decreasing the engine speed to acquire a target engine speed indicative of the target value of an engine speed necessary to stop an engine (not shown) at a target stop position; numeral 92 denotes a crank-angle acquisition means for acquiring a crank angle indicative of the position of a crankshaft; and numeral 93 denotes a target-engine-speed correction means for correcting the target engine speed according to the obtained crank angle.

Figure 6:
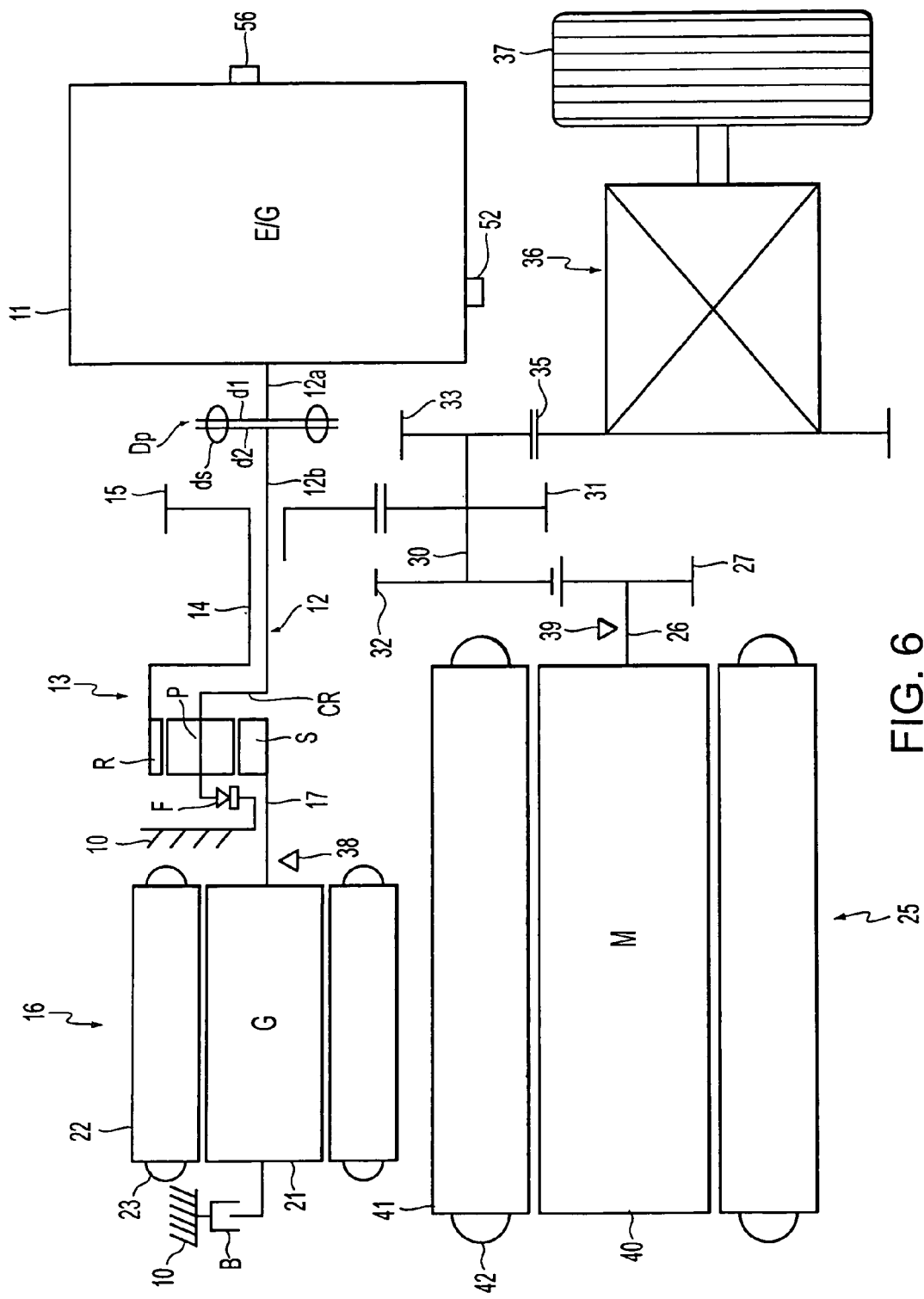
FIG. 6 is a schematic diagram of a hybrid vehicle according to the embodiment of the invention.

FIG. 6 is a schematic diagram of a hybrid vehicle used to describe the invention. In the drawing, reference numeral 11 denotes an engine (E/G) serving as power unit disposed on a first axis; numeral 12 denotes an output shaft (engine output shaft) disposed on the first axis for outputting the rotation generated in a crankshaft (not shown) by driving the engine 11; numeral 13 denotes a planetary gear unit disposed on the first axis and serving as a transmission and differential rotator for changing the rotation inputted through the output shaft 12; numeral 14 denotes an output shaft disposed on the first axis for outputting the rotation changed by the planetary gear unit 13; numeral 15 denotes a first counter-drive gear serving as output gear and fixed to the output shaft 14; and numeral 16 denotes a generator (G) disposed on the first axis and serving as a first electric motor joined to the planetary gear unit 13 through a transmission shaft 17 and also joined to the engine 11 so as to rotate differentially and mechanically. The generator 16 constitutes a generator motor that serves as motor and generator.

The output shaft 12 mounts a damper gear Dp to control the rapid fluctuation of an engine torque TE transmitted through the output shaft 12. The damper gear Dp includes a drive plate d1 joined to the engine-side of the output shaft 12, namely, a driving part 12a; a driven plate d2 joined to the transaxle side of the output shaft 12, namely, a driven part 12b; and a spring ds connecting the drive plate d1 and the driven plate d2 together and serving as biasing member. The rapid fluctuation of the engine torque TE is absorbed by the spring ds.

The output shaft 14 is shaped like a sleeve and arranged to surround the output shaft 12. The first counter-drive gear 15 is arranged on the side adjacent to the engine 11 with respect to the planetary gear unit 13.

The planetary gear unit 13 includes at least a sun gear S serving as a first element, a pinion P in engagement with the sun gear S, a ring gear R serving as a second element in engagement with the pinion P, and a carrier CR serving as a third element for rotatably supporting the pinion P. The sun gear S is joined with the generator 16 through the transmission shaft 17. The ring gear R is joined with a drive motor (M) 25, serving as a second electric motor, and a driving wheel 37, disposed on a second axis parallel with the first axis, which are mechanically connected to the engine 11 and the generator 16 so as to rotate differentially, through the output shaft 14 and a specified gear train and the carrier CR is joined with the engine 11 through the output shaft 12. The drive motor 25 and the driving wheel 37 are mechanically joined together. A one-way clutch F is disposed between the carrier CR and the casing 10 of the vehicle drive system. The one-way clutch F is released when a normal rotation is transmitted from the engine 11 to the carrier CR and is locked when a reverse rotation is transmitted from the generator 16 or the drive motor 25 to the carrier CR to prevent the transmission of the reverse rotation to the engine 11.

The generator 16 includes a rotor (generator rotor) 21 fixed to and rotatable with the transmission shaft 17, a stator 22 disposed around the rotor 21, and a coil 23 wound around the stator 22. The generator 16 generates electricity by the rotation transmitted through the transmission shaft 17. The coil 23 is connected to a battery (not shown) to feed a direct current to the battery. A generator brake B, serving as generator fixing mechanism, is disposed between the rotor 21 and the casing 10. When the generator brake B is brought into engagement, the rotor 21 can be fixed to mechanically stop the rotation of the generator 16. For this purpose, the generator brake B includes a plurality of thin plates, hydraulic servo, etc. (not shown) on the driving side and the driven side. The thin plates are pushed against one another to become engaged by friction by the application of oil pressure to the hydraulic servo.

Reference numeral 26 denotes an output shaft (drive-motor output shaft) disposed on the second axis and outputting the rotation of the drive motor 25. Reference numeral 27 denotes a second counter-drive gear serving as an output gear fixed to the output shaft 26. The drive motor 25 includes a rotor 40 fixed to and rotatable with the output shaft 26, a stator 41 disposed around the rotor 40, and a coil 42 wound around the stator 41.

The drive motor 25 generates a drive-motor torque TM with U-phase, V-phase, and W-phase alternating currents applied to the coil 42. To this end, the coil 42 is connected to the battery and a direct current from the battery is converted to the phase currents and fed to the coil 42.

In order to rotate the driving wheel 37 in the same direction as that of the rotation of the engine 11, a counter shaft 30 is disposed on a third axis parallel with the first and second axes. Fixed to the counter shaft 30 are a first counter-driven gear 31 and a second counter-driven gear 32, having more teeth than the first counter-driven gear 31. The first counter-driven gear 31 and the first counter-drive gear 15 are engaged with each other and the second counter-driven gear 32 and the second counter-drive gear 27 are engaged with each other so that the rotation of the first counter-drive gear 15 is reversed and transmitted to the first counter-driven gear 31 and the rotation of the second counter-drive gear 27 is reversed and transmitted to the second counter-driven gear 32. A differential pinion gear 33 having fewer teeth than the first counter-driven gear 31 is fixed to the counter shaft 30.

A differential gear 36 is disposed on a fourth axis parallel with the first to third axes such that a differential ring gear 35 of the differential gear 36 and the differential pinion gear 33 are brought into engagement. The rotation transmitted to the differential ring gear 35 is thus distributed by the differential gear 36 and transmitted to the driving wheel 37. Because not only the rotation generated by the engine 11 is transmitted to the first counter-driven gear 31 but also the rotation generated by the drive motor 25 can be transmitted to the second counter-driven gear 32 in this way, the hybrid vehicle can be driven by driving the engine 11 and the drive motor 25.

Reference numeral 38 denotes a generator-rotor position sensor, such as a resolver, for detecting the position of the rotor 21, namely, a generator-rotor position $\theta G$; numeral 39 denotes a drive-motor-rotor position sensor, such as a resolver, for detecting the position of the rotor 40, namely, a drive-motor rotor position $\theta M$; numeral 52 denotes an engine speed sensor serving as engine-speed detector for detecting the engine speed NE; and numeral 56 denotes a crank-angle sensor serving as rotational-position sensor and crank-angle sensor for sensing a crank angle $\rho$ indicating the position of the crankshaft that is the rotational position of the engine 11, for which a pickup sensor is used in this embodiment. The detected generator-rotor position $\theta G$ is sent to a vehicle control unit (not shown) and a generator control system (not shown). The drive-motor rotor position $\theta M$ is sent to the vehicle control unit and a drive-motor control system (not shown). The engine speed NE and the crank angle $\rho$ are sent to the vehicle control unit and an engine control unit (not shown).

The operation of the planetary gear unit 13 will now be described. In the planetary gear unit 13 (FIG. 6), the carrier CR is joined with the engine 11, the sun gear S is joined with the generator 16, and the ring gear R is joined with the drive motor 25 and the driving wheel 37 through the output shaft 14. Accordingly, the ring-gear speed NR and the rotational speed outputted to the output shaft 14, namely, the output-shaft speed become equal; the rotational speed of the carrier CR and the engine speed NE become equal; and the rotational speed of the sun gear S and the generator speed NG, that is, the electric-motor speed become equal. When the number of teeth of the ring gear R is set to $\gamma$ times as many as that of the sun gear S (twice in this embodiment), the following equation holds:

$$(\gamma+1)\cdot NE=1\cdot NG+\gamma\cdot NR.$$

Accordingly, the engine speed NE can be calculated from the ring-gear speed NR and the generator speed NG as follows:

$$NE=(1\cdot NG+\gamma\cdot NR)/(\gamma+1) \quad (1).$$

The equation (1) defines the rotational-speed relationship of the planetary gear unit 13.

Figure 7:
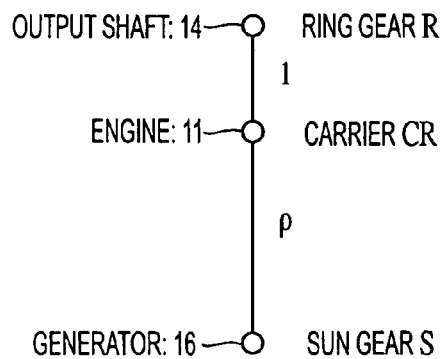
FIG. 7 is an operation diagram of a planetary gear unit according to the embodiment of the invention.

The relationships (FIG. 7) among an engine torque TE, the torque generated in the ring gear R, namely, a ring-gear torque TR, and a generator torque TG that is the electric-motor torque is expressed as $$TE:TR:TG=(\gamma+1):\gamma:1 \quad (2).$$

wherein they are subjected to the reaction forces from one another. The expression (2) defines the torque relationships of the planetary gear unit 13.

Figure 8:
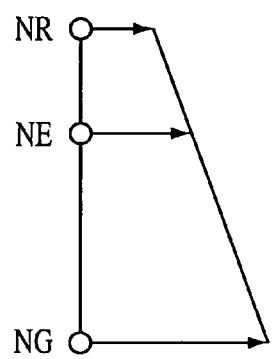
FIG. 8 is a speed diagram during normal driving according to the embodiment of the invention.
Figure 9:
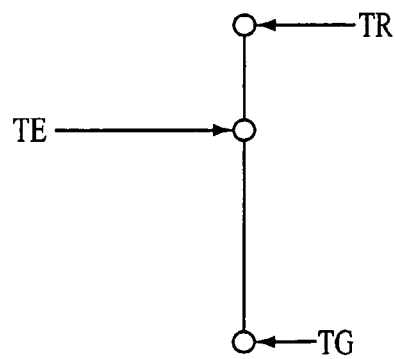
FIG. 9 is a torque diagram during normal driving according to the embodiment of the invention.

The ring gear R, the carrier CR, and the sun gear S are all rotated in the normal direction during the normal driving of the hybrid vehicle and so the ring-gear speed NR, the engine speed NE, and the generator speed NG take positive values, as shown in FIG. 8. As the ring-gear torque TR and the generator torque TG can be acquired by dividing the engine torque TE at a torque ratio determined by the number of teeth of the planetary gear unit 13, the sum of the ring-gear torque TR and the generator torque TG is the engine torque TE in the torque diagram of FIG. 9.

Figure 10:
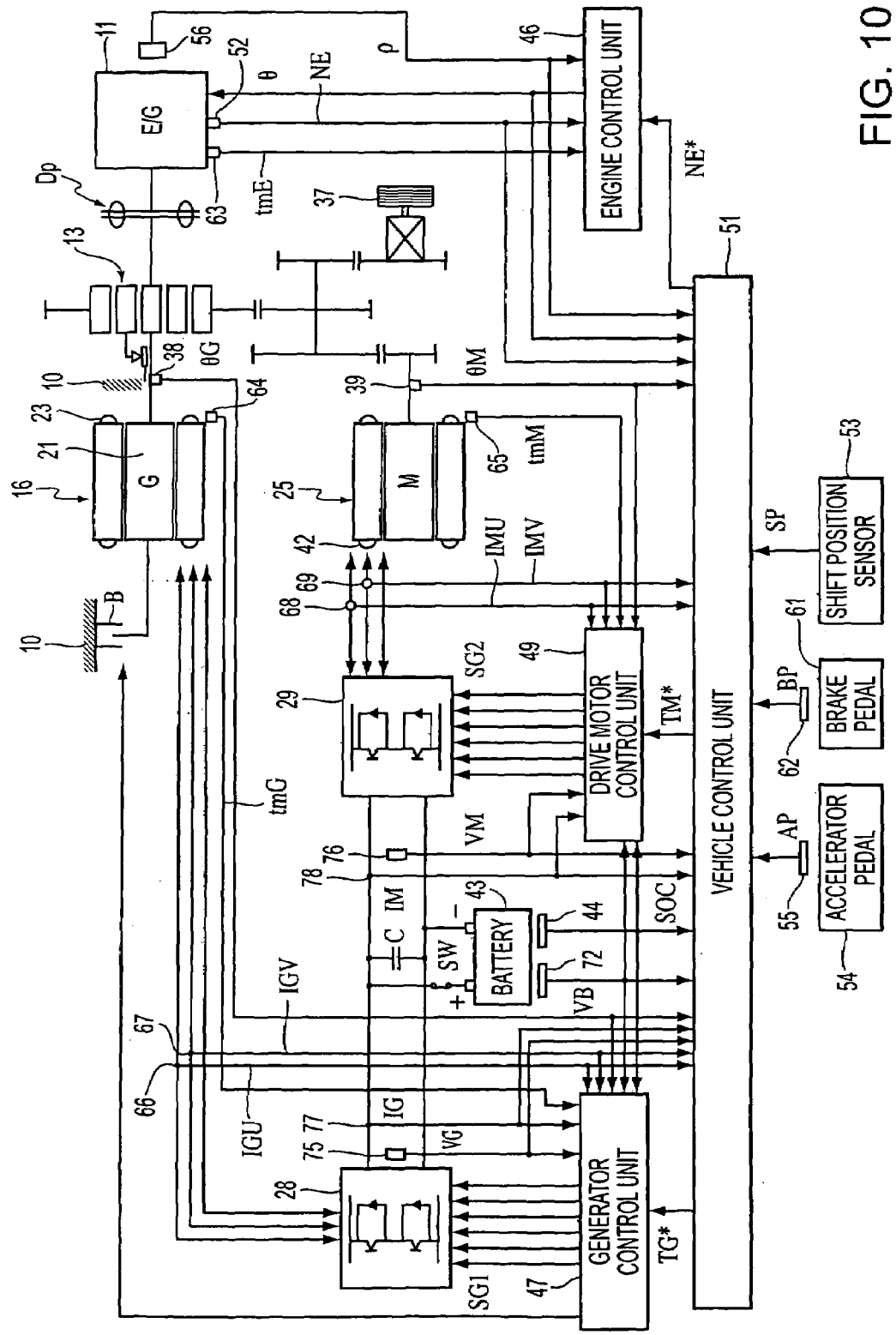
FIG. 10 is a schematic diagram of a hybrid-vehicle-drive control system according to the embodiment of the invention.

FIG. 10 is a schematic diagram of a hybrid-vehicle-drive control system according to the embodiment of the invention. In the drawing, reference numeral 10 denotes the casing; numeral 11 denotes the engine (E/G); numeral 13 denotes the planetary gear unit; numeral 16 denotes the generator (G); symbol B is the generator brake for fixing the rotor 21 of the generator 16; numeral 25 denotes the drive motor (M); numeral 28 denotes an inverter serving as a generator inverter for driving the generator 16; numeral 29 denotes an inverter serving as a drive-motor inverter for driving the drive motor 25; numeral 37 denotes a driving wheel; numeral 38 denotes the generator-rotor position sensor; numeral 39 denotes the drive-motor-rotor position sensor; and numeral 43 denotes a battery. The inverters 28, 29 are connected to the battery 43 through a power switch SW. The battery 43 feeds a direct current to the inverters 28, 29 when the power switch SW is ON.

A generator-inverter voltage sensor 75, serving as a first DC voltage detector, for detecting the DC voltage applied to the inverter 28, namely, a generator-inverter voltage VG and a generator-inverter current sensor 77, serving as a first direct-current detector, for detecting the direct current supplied to the inverter 28, namely, a generator inverter current IG are disposed on the inlet side of the inverter 28. Similarly, a drive-motor-inverter voltage sensor 76, serving as a second DC voltage detector, for detecting the DC voltage fed to the inverter 29, namely, a drive-motor inverter voltage VM and a drive-motor inverter current sensor 78, serving as a second direct-current detector, for detecting the direct current fed to the inverter 29, namely, a drive-motor inverter current IM, are disposed on the inlet side of the inverter 29. The generator-inverter voltage VG and the generator-inverter current IG are sent to a generator control unit 47 and a vehicle control unit 51, while the drive-motor inverter voltage VM and the drive-motor inverter current IM are sent to a drive-motor control unit 49 and the vehicle control unit 51. A smoothing capacitor C is connected between the battery 43 and the inverters 28, 29.

The vehicle control unit 51 includes a CPU, a recording device, etc. (not shown), and controls the entire hybrid-vehicle drive system by functioning as a computer according to various programs and data. The vehicle control unit 51 is connected to an engine control unit 46, the generator control unit 47, and the drive-motor control unit 49. The engine control unit 46 includes a CPU, a recording device, etc. (not shown) and transmits instruction signals for a throttle opening $\theta$, valve timing, etc. to the engine 11 to control the engine 11. The generator control unit 47 includes a CPU, a recording device, etc. (not shown) and transmits a driving signal SG1 to the inverter 28 to control the generator 16. The drive-motor control unit 49 includes a CPU, a recording device, etc. (not shown) and transmits a driving signal SG2 to the inverter 29 to control the drive motor 25. The engine control unit 46, the generator control unit 47, and the drive-motor control unit 49 constitute a first control system located downstream from, or subordinate to, the vehicle control unit 51, while the vehicle control unit 51 constitutes a second control system located upstream from, or managing, the engine control unit 46, the generator control unit 47, and the drive-motor control unit 49. The engine control unit 46, the generator control unit 47, and the drive-motor control unit 49 also function as computers according to various programs and data.

The inverter 28 is driven in accordance with the driving signal SG1 and, upon powering, is given a direct current from the battery 43 to generate phase currents IGU, IGV, and IGW and feeds them to the generator 16. During regeneration, the inverter 28 is given the phase currents IGU, IGV, and IGW from the generator 16 to generate a direct current and feeds it to the battery 43.

The inverter 29 is driven in accordance with the driving signal SG2 and, upon powering, is given a direct current from the battery 43 to generate phase currents IMU, IMV, and IMW and feeds them to the drive motor 25. During regeneration, the inverter 29 is given the phase currents IMU, IMV, and IMW from the drive motor 25 to generate a direct current and feeds it to the battery 43.

Reference numeral 44 denotes a battery indicator for sensing the condition of the battery 43, namely, a battery remaining amount SOC which is battery condition; numeral 52 denotes the engine speed sensor; numeral 53 denotes a shift position sensor for detecting the position of a shift lever (not shown) serving as speed control means, namely, a shift position SP; numeral 54 denotes an accelerator pedal; numeral 55 denotes an accelerator switch serving as an accelerator-operation detector for detecting the position (depression) of the accelerator pedal 54, namely, an accelerator-pedal position AP; numeral 56 denotes the crank-angle sensor; numeral 61 denotes a brake pedal for applying brakes (not shown); numeral 62 denotes a brake switch serving as a brake-operation detector for detecting the position (depression) of the brake pedal 61, namely, a brake-pedal position BP; numeral 63 denotes an engine-temperature sensor for sensing the temperature tmE of the engine 11; numeral 64 denotes a generator-temperature sensor for sensing the temperature of the generator 16, e.g., the temperature tmG of a coil 23 (see FIG. 6); and numeral 65 denotes a drive-motor temperature sensor for sensing the temperature of the drive motor 25, e.g., the temperature tmM of a coil 42.

Numerals 66 to 69 denote current sensors serving as AC current detectors for detecting the phase currents IGU, IGV, IMU, and IMV; and numeral 72 denotes a battery-voltage sensor serving as a voltage sensor for the battery 43 for detecting a battery voltage VB which is the battery condition. The battery voltage VB and the battery remaining amount SOC are sent to the generator control unit 47, the drive-motor control unit 49, and the vehicle control unit 51. The battery conditions may include a battery current, a battery temperature, etc. The battery indicator 44, the battery-voltage sensor 72, a battery current sensor (not shown), and a battery-temperature sensor (not shown) constitute a battery-condition sensor. The detected currents IGU, IGV are sent to the generator control unit 47 and the vehicle control unit 51, while the currents IMU, IMV are sent to the drive-motor control unit 49 and the vehicle control unit 51.

The vehicle control unit 51 transmits an engine control signal to the engine control unit 46 and sets the drive/stop of the engine 11 with the engine control unit 46. A vehicle-speed calculation means (not shown) of the vehicle control unit 51 calculates the vehicle speed to determine the rate of change $\Delta\theta M$ of the drive-motor rotor position $\theta M$ and calculates a vehicle speed V from the rate of change $\Delta\theta M$ and a gear ratio $\gamma V$ in the torque transmission system from the output shaft 26 to the driving wheel 37.

The vehicle control unit 51 determines a target engine speed NE* indicating the target value of the engine speed NE, a target generator torque TG* that is a target electric-motor torque indicating the target value of the generator torque TG, and a target drive-motor torque TM* indicating the target value of the drive-motor torque TM and sends them to the engine control unit 46, the generator control unit 47, and the drive-motor control unit 49, respectively. The generator control unit 47 sets a target generator speed NG* that is a target electric-motor speed indicating the target value of the generator speed NG. The drive-motor control unit 49 sets a drive-motor-torque correction value $\delta TM$ indicating the correction value of the drive-motor torque TM. The target engine speed NE*, the target generator torque TG*, and the target drive-motor torque TM* constitute control instruction values.

A generator-speed calculation means (not shown) of the generator control unit 47 executes a generator-speed calculation process to calculate the generator speed NG by reading the generator-rotor position $\theta G$ and calculating the rage of change $\Delta\theta G$ of the generator-rotor position $\theta G$.

A drive-motor speed calculation means (not shown) of the drive-motor control unit 49 executes a drive-motor speed calculation process to calculate the rotational speed of the drive motor 25, namely, a drive motor speed NM by reading the drive-motor rotor position $\theta M$ and calculating the rate of change $\Delta\theta M$ of the drive-motor rotor position $\theta M$.

Because the generator-rotor position $\theta G$ and the generator speed NG are proportional to each other and the drive-motor rotor position $\theta M$, the drive-motor speed NM, and the vehicle speed V are proportional to one another, the generator-rotor position sensor 38 and the generator-speed calculation means can be used as a rotational-speed sensor for sensing the generator speed NG, the drive-motor-rotor position sensor 39 and the drive-motor-speed calculation means can be used as a rotational-speed sensor for sensing the drive-motor speed NM, and the drive-motor-rotor position sensor 39 and the vehicle-speed calculation means can be used as a vehicle-speed sensor for sensing the vehicle speed V.

Although the engine speed NE is sensed by the engine speed sensor 52 in this embodiment, it can also be calculated by the engine control unit 46. Although the vehicle speed V is calculated by the vehicle-speed calculation means in accordance with the drive-motor rotor position $\theta M$ in this embodiment, it is also possible to detect the ring-gear speed NR and calculate the vehicle speed V from the ring-gear speed NR or, alternatively, from the rotational speed of the driving wheel 37, namely, a driving-wheel speed. In that case, a ring-gear speed sensor or a driving-wheel speed sensor are provided as a vehicle-speed sensor.

Figure 14:
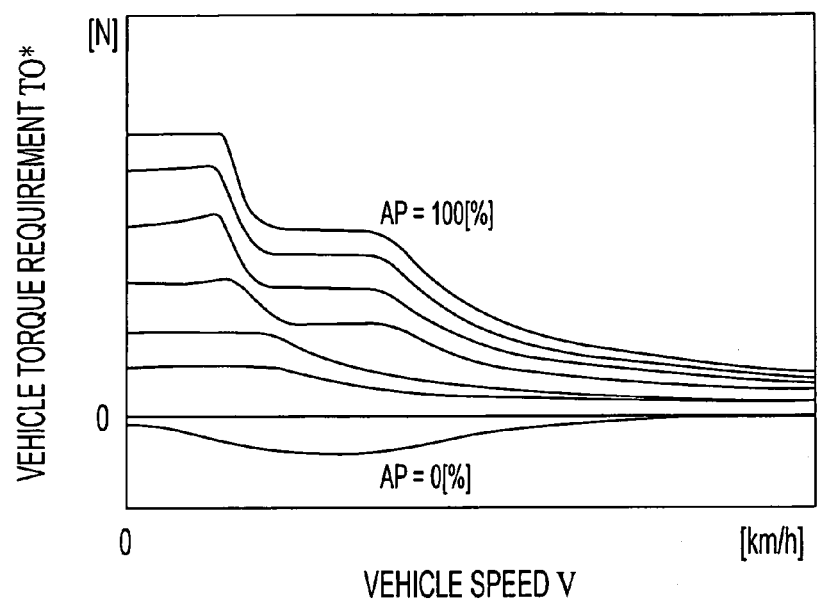
FIG. 14 is a diagram of a first vehicle-torque-requirement map according to the embodiment of the invention.
Figure 15:
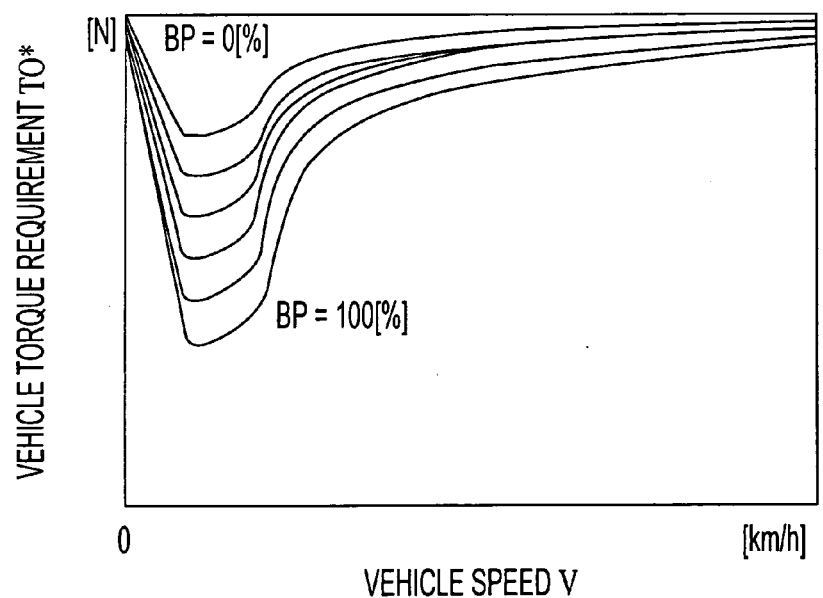
FIG. 15 is a diagram of a second vehicle-torque-requirement map according to the embodiment of the invention.
Figure 16:
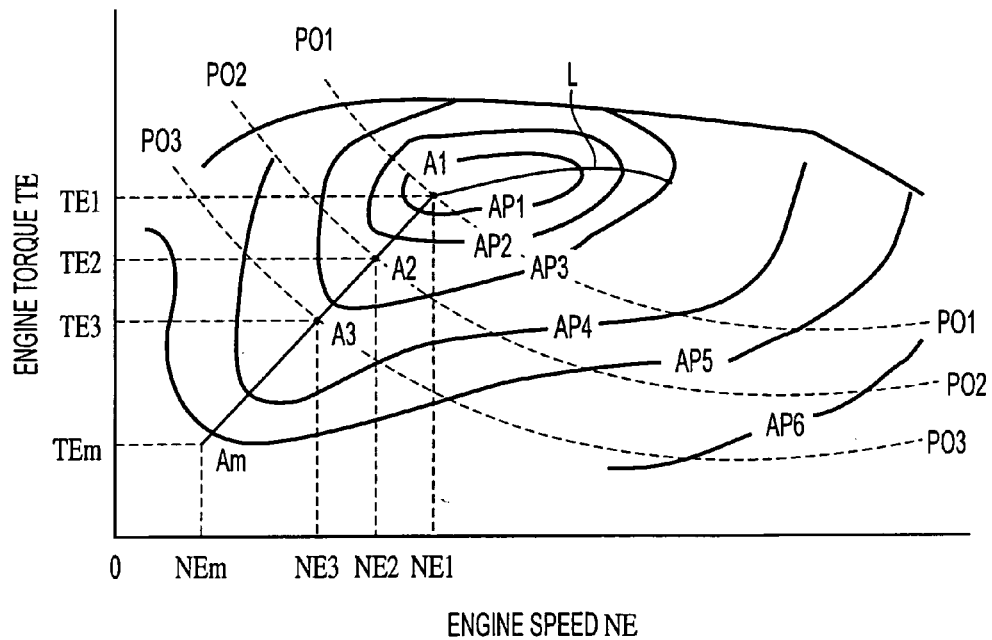
FIG. 16 is a diagram of a target-engine-operating-condition map according to the embodiment of the invention.
Figure 17:
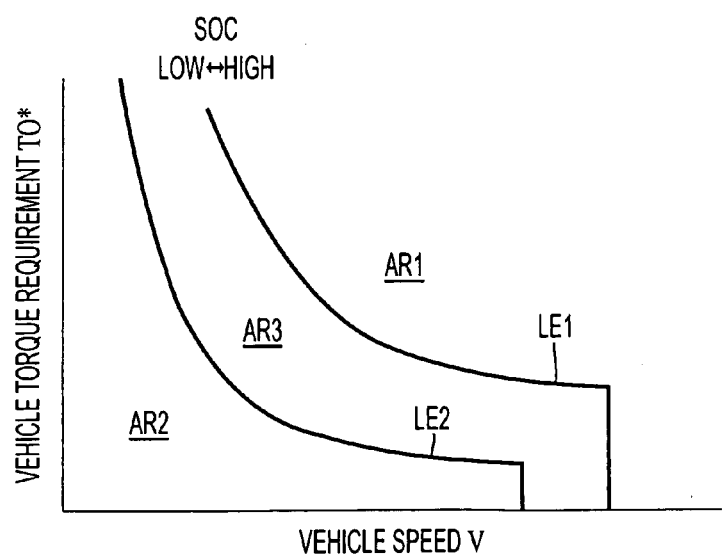
FIG. 17 is an engine-drive-region map according to the embodiment of the invention.

The operation of a hybrid-vehicle-drive control system with the above structure will now be described. In FIGS. 14, 15, and 17, the horizontal axis is scaled in terms of the vehicle speed V, and the vertical axis is scaled to reflect a vehicle torque requirement TO*. In FIG. 16, the horizontal axis is scaled in terms of the engine speed NE, and the vertical axis is scaled to reflect the engine torque TE.

Figure 11:
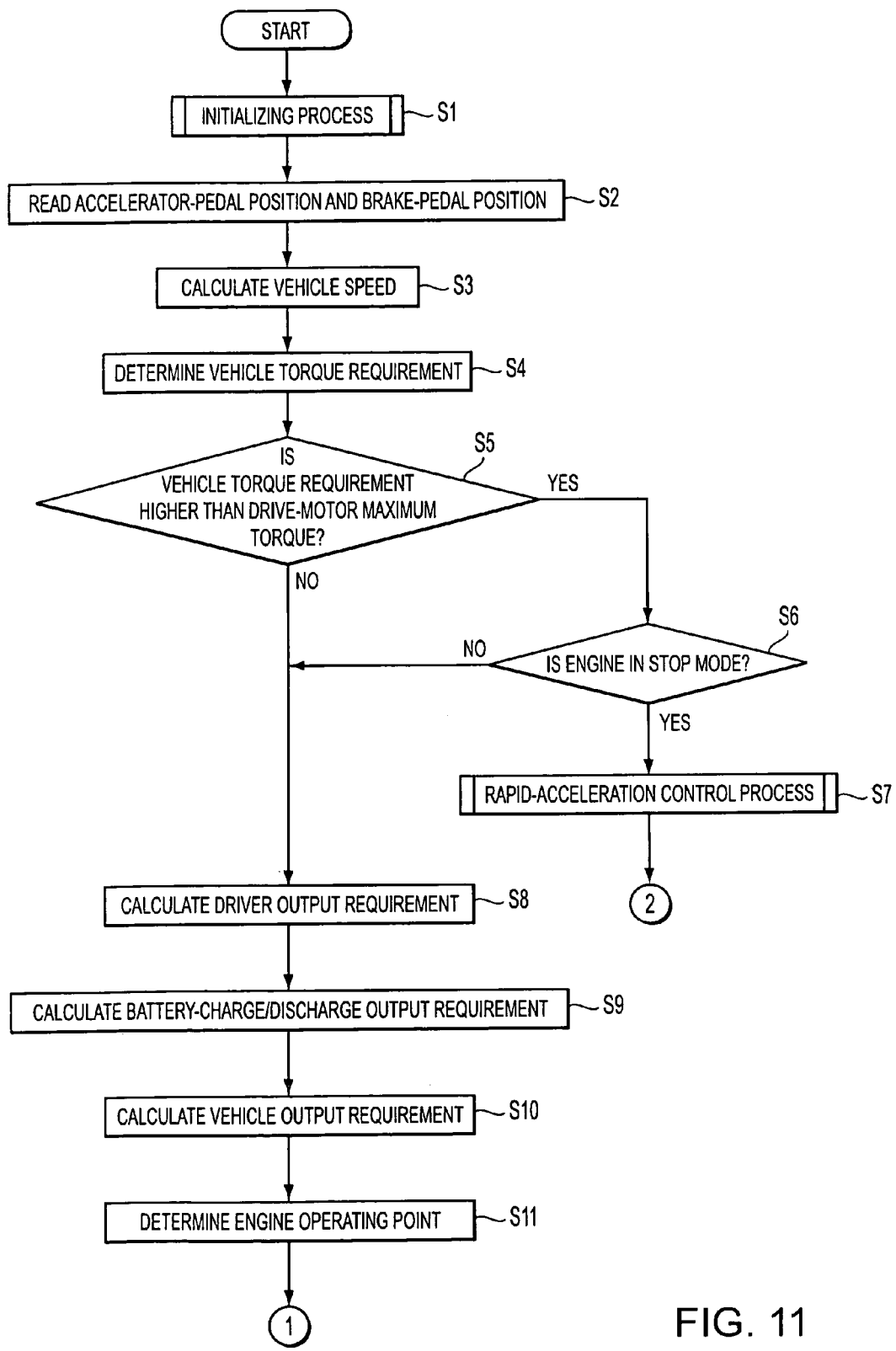
FIG. 11 is a first main flowchart for the operation of the hybrid-vehicle-drive control system according to the embodiment of the invention.

An initializing means (not shown) of the vehicle control unit 51 (FIG. 10) first initializes various variables by an initializing process (step S1, FIG. 11). The vehicle control unit 51 then reads the accelerator-pedal position AP from the accelerator switch 55 and the brake-pedal position BP from the brake switch 62 (step S2). The vehicle-speed calculation means reads the drive-motor rotor position θM, calculates the rate of change ΔθM of the drive-motor rotor position θM, and calculates the vehicle speed V from the rate of change ΔθM and the gear ratio γV (step S3).

A vehicle-torque-requirement determination means (not shown) (throughout this disclosure the various means can be considered to be a program or set of instructions executed either by software or hardware of the relevant control unit) of the vehicle control unit 51 then executes a vehicle-torque-requirement determination process to determine the vehicle torque requirement TO* necessary to drive the hybrid vehicle (step S4). The vehicle torque requirement TO* is predetermined in correspondence with vehicle speed V and the accelerator-pedal position AP or the brake-pedal position BP, with reference to the first vehicle-torque-requirement map of FIG. 14, when the accelerator pedal 54 is depressed, and with reference to the second vehicle-torque-requirement map of FIG. 15, when the brake pedal 61 is depressed. Both maps are recorded in the recording device of the vehicle control unit 51.

The vehicle control unit 51 then determines whether the vehicle torque requirement TO* is higher than a drive-motor maximum torque TMmax preset as the rating of the drive motor 25 (step S5). When the vehicle torque requirement TO* is higher than the drive-motor maximum torque TMmax (step S5, Yes), the vehicle control unit 51 determines whether the engine 11 is stopped (step S6), wherein when the engine 11 is stopped, a rapid-acceleration control means (not shown) of the vehicle control unit 51 executes a rapid acceleration control process to drive the drive motor 25 and the generator 16, thereby driving the hybrid vehicle (step S7).

When the vehicle torque requirement TO* is lower than the drive-motor maximum torque TMmax (step S5, No) or when the vehicle torque requirement TO* is higher than the drive-motor maximum torque TMmax and the engine 11 is not in operation (step S6, No), a driver-output-requirement calculation means (not shown) of the vehicle control unit 51 executes a driver-output-requirement calculation process (step S8) to calculate a driver output requirement PD by multiplying the vehicle torque requirement TO* and the vehicle speed V together as follows:

$$PD=TO^* \cdot V.$$

A battery-charge/discharge-output-requirement calculation means (not shown) of the vehicle control unit 51 then executes a battery-charge/discharge-output-requirement calculation process to read the battery remaining amount SOC from the battery indicator 44 and calculate a battery-charge/discharge output requirement PB from the battery remaining amount SOC (step S9).

A vehicle-output-requirement calculation means (not shown) of the vehicle control unit 51 executes a vehicle-output-requirement calculation process to add the driver output requirement PD and the battery-charge/discharge output requirement PB together, thereby calculating a vehicle output requirement PO as follows:

$$PO=PD+PB \text{ (step S10)}.$$

A target-engine-operating-condition setting means (not shown) of the vehicle control unit 51 executes a target-engine-operating-condition setting process to determine points A1 to A3, . . . Am, at which lines PO, PO2, . . . indicating the vehicle output requirement PO intersect an optimum fuel efficiency curve L indicating the highest efficiency of the engine 11 at accelerator-pedal positions AP1 to AP6 as an operating point of the engine 11 under target engine operating condition, determine engine torques TE1 to TE3, . . . TEm, at the operating point as a target engine torque TE* indicating the target value of the engine torque TE, and determine engine speeds NE1 to NE3, . . . NEm, at the operating point as the target engine speed NE*, with reference to the target-engine-operating-condition map of FIG. 16, recorded in the recording device of the vehicle control unit 51 (step S11).

The vehicle control unit 51 determines whether the engine 11 is in an operating region AR1 with reference to the engine drive region map of FIG. 17, recorded in the recording device of the vehicle control unit 51 (step S12). In FIG. 17, symbol AR1 indicates a drive region where the engine 11 is driven, symbol AR2 indicates a stop region where the drive of the engine 11 is stopped, and symbol AR3 indicates a hysteresis region. Symbol LE1 indicates a line where the stopped engine 11 is driven; and symbol LE2 indicates a line where the drive of the driven engine 11 is stopped. The larger the battery remaining amount SOC is, the more the line LE1 is shifted to the right in FIG. 17 to decrease the drive region AR1; the smaller the battery remaining amount SOC is, the more the line LE1 is shifted to the left in FIG. 17 to increase the drive region AR1.

When the engine 11 is not operated even though the engine 11 is in the drive region AR1 (step S12, Yes; step S13, No), an engine-start control means (not shown) of the vehicle control unit 51 executes engine-start control process to send the target engine speed NE* to the engine control unit 46 and so the engine control unit 46 starts the engine 11 (step S15). Then the process ends. When the engine 11 is in operation even though the engine 11 is not in the drive region AR1 (step S12, No; step S14, Yes), an engine-stop control means (not shown) of the vehicle control unit 51 executes engine-stop control process to stop the operation of the engine 11 (step S16) and the process ends. When the engine 11 is not in the drive region AR1 and the engine 11 is stopped (step S12, No; step S14, No), a target-drive-motor-torque calculation means (not shown) of the vehicle control unit 51 executes a target-drive-motor-torque calculation process to calculate and determine the vehicle torque requirement TO* as a target drive-motor torque TM* and send it to the drive-motor control system 49 (step S26). A drive-motor control means (not shown) of the drive-motor control system 49 executes a drive-motor control process to control the torque of the drive motor 25 (step S27) and the process ends.

When the engine 11 is in the drive region AR1 and in operation (step S12, Yes; step S13, Yes), an engine control means (not shown) of the engine control unit 46 executes an engine control process to control the engine 11 according to the target engine speed NE* by a specified method so that the engine speed NE reaches the target engine speed NE* (step S17).

Then, a target-generator-speed calculation means (not shown) of the generator control system 47, which serves as target-electric-motor-speed calculation means, executes target-generator-speed calculation process serving as target-electric-motor-speed calculation process. Specifically, the target-generator-speed calculation means reads the drive-motor rotor position θM from the drive-motor-rotor position sensor 39 and calculates the ring-gear speed NR from the drive-motor rotor position θM and a gear ratio γR from the output shaft 26 (FIG. 6) to the ring gear R, also reads the target engine speed NE* determined in the target-engine-operating-condition setting process and calculates the target generator speed NG* from the ring-gear speed NR and the target engine speed NE* from the rotational-speed relationship (step S18).

When the generator speed NG is low, and the hybrid vehicle with the above structure is driven in a motor engine drive mode, it consumes considerable electric power to decrease generation efficiency of the generator 16, decreasing fuel efficiency of the hybrid vehicle correspondingly. An engagement-condition determination means (not shown) of the generator control system 47 therefore executes an engagement-condition determination process to determine whether specified engaging conditions are met depending on whether the absolute value of the generator speed NG is smaller than a threshold NGth1 (step S19).

The generator control unit 47 (following step S19, Yes) determines whether the generator brake B is in engagement when the engaging conditions are met and the absolute value of the generator speed NG is smaller than the threshold NGth1 (step S21). When the generator brake B is out of engagement (step S21, No), a generator-brake engagement control means (not shown) of the generator control unit 47 executes a generator-brake engagement control process to turn on a brake signal indicating a generator-brake engaging requirement that requires the engagement of the generator brake B, turning on a brake solenoid to apply a brake hydraulic pressure Pb to the hydraulic servo, thereby bringing the generator brake B into engagement (step S22). As a result, the generator speed NG reaches 0 rpm while the ring-gear speed NR and the engine speed NE achieve specified values and the process ends. Further, if the generator brake B is engaged (step S21, Yes), the process ends.

On the other hand, when the engaging conditions are not met and the absolute value of the generator speed NG is equal to or larger than the threshold NGth1 (step S19, No), the generator control unit 47 determines whether the generator brake B has been released (step S20). When the generator brake B has been released (step S20, Yes), a generator-speed control means (not shown) of the generator control unit 47, which serves as electric-motor-speed control means, executes a generator-speed control process serving as electric-motor-speed control process to control the torque of the generator 16 according to the generator speed NG (step S23). When the generator brake B has not been released (step S20, No), a generator-brake-release control means (not shown) of the generator control system 47 executes a generator-brake-release control process to turn off the brake signal, thus turning off the brake solenoid to drain the brake hydraulic pressure Pb from the hydraulic servo, thereby releasing the generator brake B (step S24) and the process ends.

In the generator-speed control process (step S23), when the target generator torque TG* is determined so that the generator speed NG reaches the target generator speed NG* to generate a specified generator torque TG at the rotational speed, the engine torque TE, the ring-gear torque TR, and the generator torque TG apply reaction forces to one another, so that the generator torque TG is converted to the ring-gear torque TR and is outputted from the ring gear R.

When the ring-gear torque TR is varied with an inertia torque TGI of the rotor 21 and its rotor shaft, which is produced by the change of the generator speed NG, the changed ring-gear torque TR is transmitted to the driving wheel 37 to reduce the drive feeling of the hybrid vehicle. The ring-gear torque TR is therefore calculated in view of the inertia torque TGI associated with the change of the generator speed NG.

To this end, a ring-gear-torque calculation means (not shown) of the vehicle control unit 51 executes ring-gear-torque calculation process to calculate a ring-gear torque TR from the target generator torque TG* and the ratio of the number of teeth of the ring gear R to that of the sun gear S.

Specifically, the torque applied to the sun gear S, namely, a sun-gear torque TS can be given by subtracting the torque equivalent component of the inertia InG, namely, the inertia torque TGI $$TGI = InG \cdot \alpha G$$

from the target generator torque TG*, where InG is the inertia of the generator 16 and $\alpha G$ is the angular acceleration (rate of rotation change) of the generator 16. The sun-gear torque TS is expressed as $$TS = TG^* - TGI \qquad (3)$$
$$= TG^* - InG \cdot \alpha G.$$

The inertia torque TGI generally takes a positive value in the direction of acceleration during acceleration of hybrid vehicles, while it takes a negative value in the direction of acceleration during deceleration of hybrid vehicles. The angular acceleration $\alpha G$ can be calculated by differentiating the generator speed NG.

With the assumption that the number of teeth of the ring gear R is $\gamma$ times as many as that of the sun gear S, the ring-gear torque TR can be written as $$TR = \gamma \cdot TS \qquad (4)$$
$$= \gamma \cdot (TG^* - TGI)$$
$$= \gamma \cdot (TG^* - InG \cdot \alpha G).$$

because the ring-gear torque TR is $\gamma$ times as much as a sun-gear torque TS. In this way, the ring-gear torque TR can be calculated from the target generator torque TG* and the inertia torque TGI.

A drive-shaft-torque estimation means (not shown) of the vehicle control unit 51 executes a drive-shaft-torque estimation process to estimate the torque of the output shaft 26, namely, a drive-shaft torque TR/OUT from the target generator torque TG* and the inertia torque TGI (step S25). Specifically, the drive-shaft-torque estimation means calculates the drive-shaft torque TR/OUT from the ring-gear torque TR and the ratio of the number of teeth of the second counter-drive gear 27 to that of the ring gear R.

Because the target generator torque TG* is brought to zero (0) when the generator brake B is brought into engagement, the ring-gear torque TR becomes proportional to the engine torque TE. Accordingly, when the generator brake B is brought into engagement, the drive-shaft-torque estimation means reads the engine torque TE from the engine control unit 46 and calculates the ring-gear torque TR from the engine torque TE by the torque relationship and calculates the drive-shaft torque TR/OUT from the ring-gear torque TR and the ratio of the number of teeth of the second counter-drive gear 27 to that of the ring gear R.

The target drive-motor-torque calculation means executes the target drive-motor-torque calculation process to calculate and determine any deficiency in the drive-shaft torque TR/OUT as the target drive-motor torque TM* by subtracting the drive-shaft torque TR/OUT from the vehicle torque requirement TO* and sends the determined target drive-motor torque TM* to the drive-motor control unit 49 (step S26).

The drive-motor control means then executes the drive-motor control process to control the torque of the drive motor 25 according to the determined target drive-motor torque TM*, thereby controlling the drive-motor torque TM (step S27) and the process ends.

Figure 12:
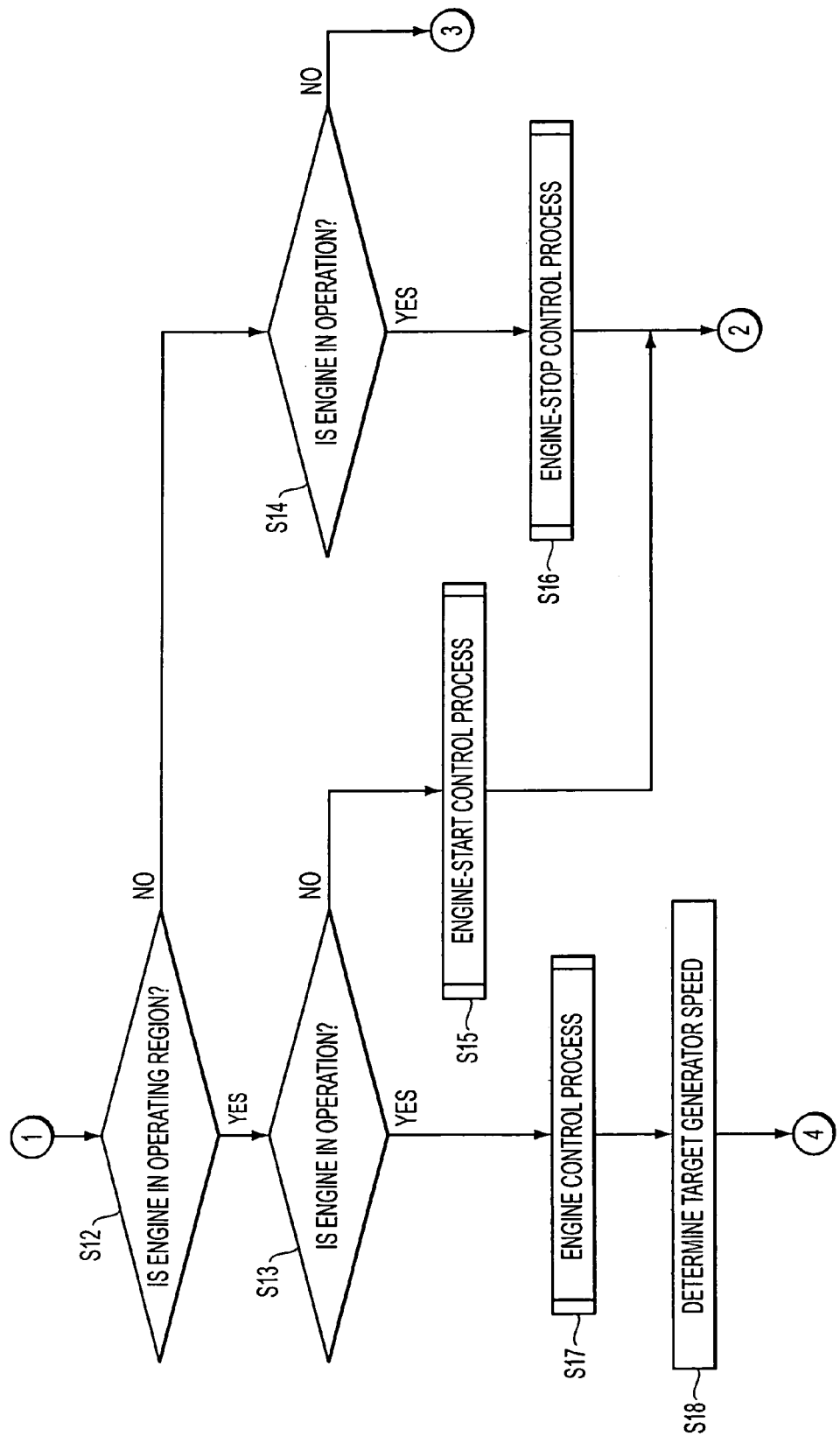
FIG. 12 is a second main flowchart for the operation of the hybrid-vehicle-drive control system according to the embodiment of the invention.
Figure 13:
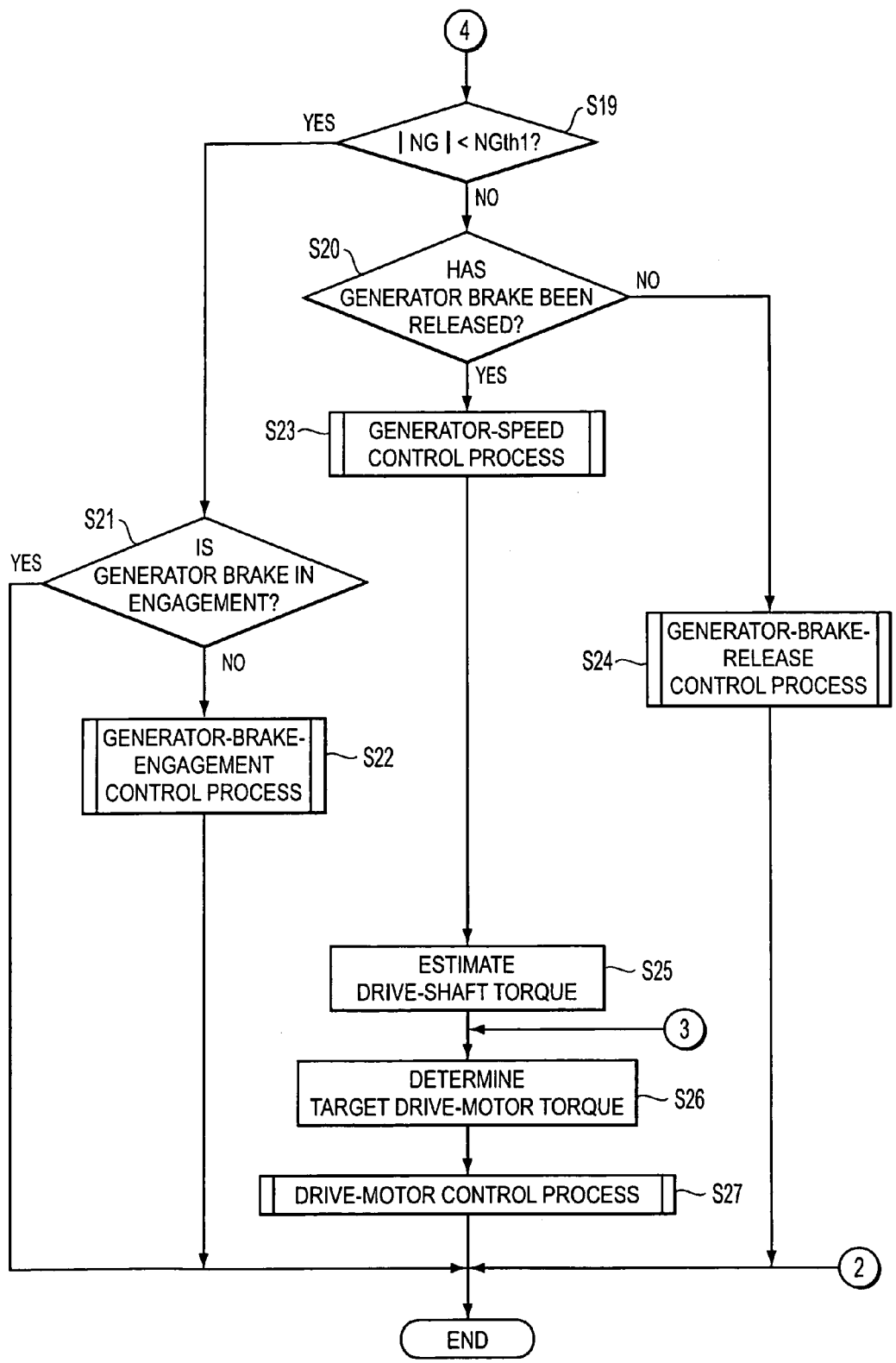
FIG. 13 is a third main flowchart for the operation of the hybrid-vehicle-drive control system according to the embodiment of the invention.

The flow of FIGS. 11 to 13 will be briefly reviewed by step below.

Step S1: Initialization process is executed.

Step S2: The accelerator-pedal position AP and the brake-pedal position BP are read.

Step S3: Vehicle speed V is calculated.

Step S4: The vehicle torque requirement TO* is determined.

Step S5: It is determined whether the vehicle torque requirement TO* is higher than the drive-motor maximum torque TMmax. When the vehicle torque requirement TO* is higher than the drive-motor maximum torque TMmax, the procedure moves to step S6; when the vehicle torque requirement TO* is lower than the drive-motor maximum torque TMmax, the procedure moves to step S8.

Step S6: It is determined whether the engine 11 is in a stopped mode. When the engine 11 is in stopped mode, the procedure moves to step S7; when it is not in the stopped mode (during operation), the procedure moves to step S8.

Step S7: Rapid-acceleration control process is executed and the procedure is finished.

Step S8: The driver output requirement PD is calculated.

Step S9: The battery-charge/discharge output requirement PB is calculated.

Step S10: The vehicle output requirement PO is calculated.

Step S11: The operating point of the engine 11 is determined.

Step S12: It is determined whether the engine 11 is in the operating region AR1. When the engine 11 is in the operating region AR1, the procedure moves to step S13; when it is not in the operating region AR1, the procedure moves to step S14.

Step S13: It is determined whether the engine 11 is in operation. When the engine 11 is in operation, the procedure moves to step S17; when it is not in operation, the procedure moves to step S15.

Step S14: It is determined whether the engine 11 is in operation. When the engine 11 is in operation, the procedure moves to step S16; when it is not in operation, the procedure moves to step S26.

Step S15: The engine-start control process is executed and the procedure is finished.

Step S16: The engine-stop control process is executed to finish the process.

Step S17: The engine control process is executed.

Step S18: The target generator speed NG* is determined.

Step S19: It is determined whether the absolute value of the generator speed NG is smaller than the threshold NGth1. When the absolute value of the generator speed NG is smaller than the threshold NGth1, the procedure moves to step S21; when the absolute value of the generator speed NG is larger than the threshold NGth1, the procedure moves to step S20.

Step S20: It is determined whether the generator brake B has been released. When the generator brake B has been released, the procedure moves to step S23; when it has not been released, the procedure moves to step S24.

Step S21: It is determined whether the generator brake B is in engagement. When the generator brake B is in engagement, the procedure is finished; when it is out of engagement, the procedure moves to step S22.

Step S22: The generator-brake-engagement control process is executed and the procedure is finished.

Step S23: The generator-speed control process is executed.

Step S24: The generator-brake-release control process is executed and the procedure is finished.

Step S25: The drive-shaft torque TR/OUT is estimated.

Step S26: The target drive-motor torque TM* is determined.

Step S27: The drive-motor control process is executed and the procedure is finished.

Figure 18:
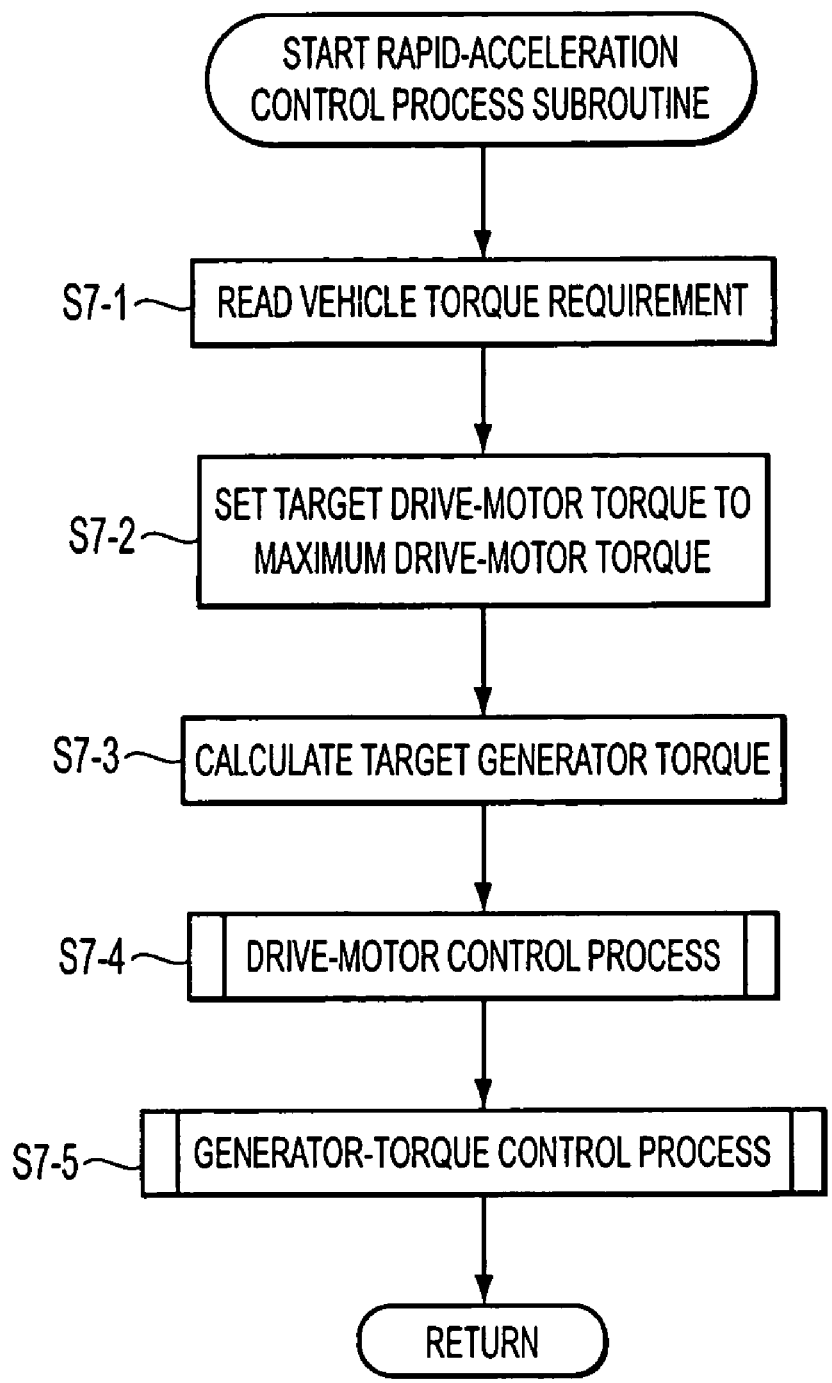
FIG. 18 is a diagram of the subroutine of a rapid-acceleration control process according to the embodiment of the invention.

The subroutine of the rapid-acceleration control process, executed in step S7 of FIG. 11, will be described with reference to FIG. 18. The rapid-acceleration control means reads the vehicle torque requirement TO* (step S7-1), in which case, because the vehicle torque requirement TO* is higher than the drive-motor maximum torque TMmax, the target drive-motor-torque calculation means sets the target drive-motor torque TM* at the drive-motor maximum torque TMmax and sends the target drive-motor torque TM* to the drive-motor control unit 49 (step S7-2).

A target-generator-torque calculation means (not shown) of the vehicle control unit 51 executes a target-generator-torque calculation process to calculate the difference torque ΔT between the vehicle torque requirement TO* and the target drive-motor torque TM*, calculates the deficiency of the drive-motor maximum torque TMmax which is the target drive-motor torque TM* as the target generator torque TG*, and sends the target generator torque TG* to the generator control unit 47 (step S7-3).

The drive-motor control means executes the drive-motor control process to control the torque of the drive motor 25 according to the target drive-motor torque TM* (step S7-4). A generator-torque control means (not shown) of the generator control unit 47 executes a generator-torque control process to control the torque of the generator 16 according to the target generator torque TG* (step S7-5). Then the process is returned to the main routine to continue processing.

Figure 19:
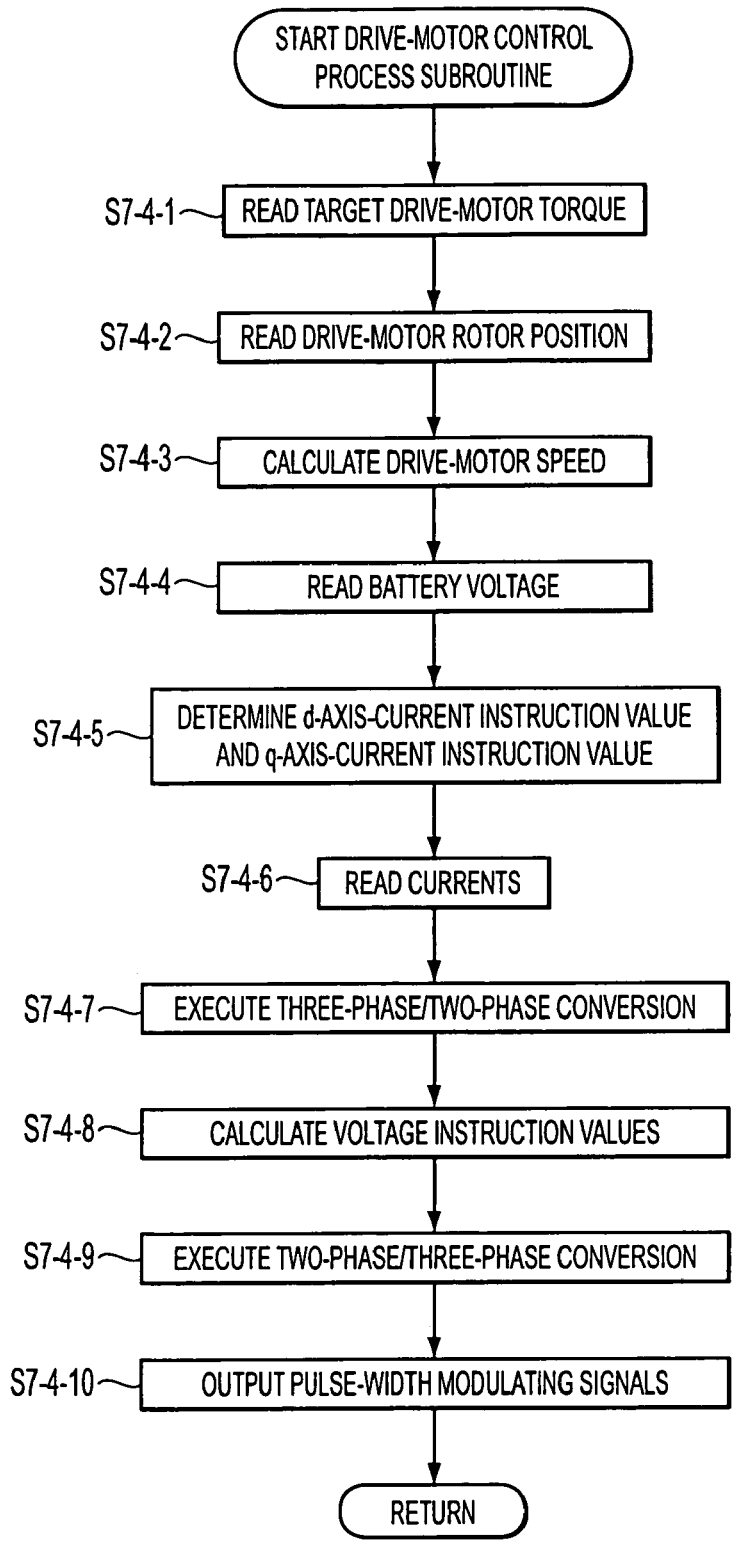
FIG. 19 is a diagram of the subroutine of a drive-motor control process according to the embodiment of the invention.

The subroutine for the drive-motor control process executed in step S27 of FIG. 13 and step S7-4 of FIG. 18 will now be described with reference to FIG. 19. In the drive-motor control process, the drive-motor control means first reads the target drive-motor torque TM* (step S7-4-1). The drive-motor-speed calculation means reads the drive-motor rotor position θM (step S7-4-2) and calculates the rate of change ΔθM of the drive-motor rotor position θM, thereby calculating the drive-motor speed NM (step S7-4-3). The drive-motor control means reads the battery voltage VB (step S7-4-4). The actual measurement is defined by the drive-motor speed NM and the battery voltage VB.

The drive-motor control means then calculates a d-axis-current instruction value IMd* and a q-axis-current instruction value IMq* from the target drive-motor torque TM*, the drive-motor speed NM, and the battery voltage VB with reference to the current-instruction-value map for controlling the drive motor, recorded in the recording device of the drive-motor control unit 49. The d-axis-current instruction value IMd* and the q-axis-current instruction value IMq* define an AC-current instruction value for the drive motor 25 (step S7-4-5).

The drive-motor control means reads currents IMU, IMV from current sensors 68, 69 and calculates a current IMW from the currents IMU, IMV as follows:

$$IMW = IMU - IMV.$$

Alternatively, the current IMW can be detected by a current sensor, as with the currents IMU, IMV (step S7-4-6).

An AC-current calculation means of the drive-motor control means executes an AC-current calculation process to perform three-phase/two-phase conversion (step S7-4-7), converting the currents IMU, IMV, IMW to an alternating d-axis current IMd and q-axis current IMq, thereby calculating the d-axis current IMd and the q-axis current IMq. An AC-voltage instruction-value calculation means of the drive-motor control means executes an AC-voltage instruction-value calculation process to calculate voltage instruction values VMd*, VMq* from the d-axis current IMd, the q-axis current IMq, d-axis-current instruction value IMd*, and the q-axis-current instruction value IMq* (step S7-4-8). The drive-motor control means performs two-phase/three-phase conversion to convert the voltage instruction values VMd*, VMq* to voltage instruction values VMU*, VMV*, VMW* (step S7-4-9), thereby calculating pulse-width modulating signals Su, Sv, Sw from the voltage instruction values VMU*, VMV*, VMW*, and outputs the pulse-width modulating signals Su, Sv, Sw to a drive process means (not shown) of the drive-motor control unit 49. The drive process means executes a drive process to send a drive signal SG2 according to the pulse-width modulating signals Su, Sv, Sw to the inverter 29. The voltage instruction values VMd*, VMq* define an AC-voltage instruction value for the drive motor 25 (step S7-4-10). The processing then returns to the point from which the subroutine was called.

The subroutine for the generator-torque control process executed in step S7-5 of FIG. 18 will be described with reference to FIG. 20. Initially, the generator-torque control means reads the target generator torque TG* (step S7-5-1) and the generator-rotor position θG (step S7-5-2), calculates the generator speed NG from the generator-rotor position θG (step S7-5-3), and then reads the battery voltage VB (step S7-5-4). The generator-torque control means then calculates a d-axis-current instruction value IGd* and a q-axis-current instruction value IGq* from the target generator torque TG*, the generator speed NG, and the battery voltage VB with reference to the current-instruction-value map for controlling the generator, recorded in the recording device of the generator control unit 47. The d-axis-current instruction value IGd* and the q-axis-current instruction value IGq* define an AC-current instruction value for the generator 16 (step S7-5-5).

The generator-torque control means reads currents IGU, IGV from current sensors 66, 67 and calculates a current IGW from the currents IGU, IGV as follows:

$$IGW = -IGU - IGV.$$

Alternatively, the current IGW can be detected by a current sensor, as with the currents IGU, IGV (step S7-5-6).

An AC-current calculation means of the generator-torque control means executes an AC-current calculation process to perform three-phase/two-phase conversion, converting the currents IGU, IGV, IGW to a d-axis current IGd and a q-axis current IGq, thereby calculating the d-axis current IGd and the q-axis current IGq (step S7-5-7). An AC-current-voltage instruction-value calculation means of the generator-torque control means executes an AC-voltage instruction-value calculation process to calculate voltage instruction values VGd*, VGq* from the d-axis current IGd, the q-axis current IGq, d-axis-current instruction value IGd*, and the q-axis-current instruction value IGq* (step S7-5-8). The generator-torque control means performs two-phase/three-phase conversion to convert the voltage instruction values VGd*, VGq* to voltage instruction values VGU*, VGV*, VGW* (step S7-5-9), calculates the pulse-width modulating signals Su, Sv, Sw from the voltage instruction values VGU*, VGV*, VGW*, and outputs the pulse-width modulating signals Su, Sv, Sw to a drive process means (not shown) of the generator control unit 47. The drive process means executes a drive process to send a drive signal SG1 according to the pulse width modulating signals Su, Sv, Sw to the inverter 28 (step S7-5-10). The voltage instruction values VGd*, VGq* define an AC-voltage instruction value for the generator 16. Processing then returns to the point from which the subroutine was called.

Figure 21:
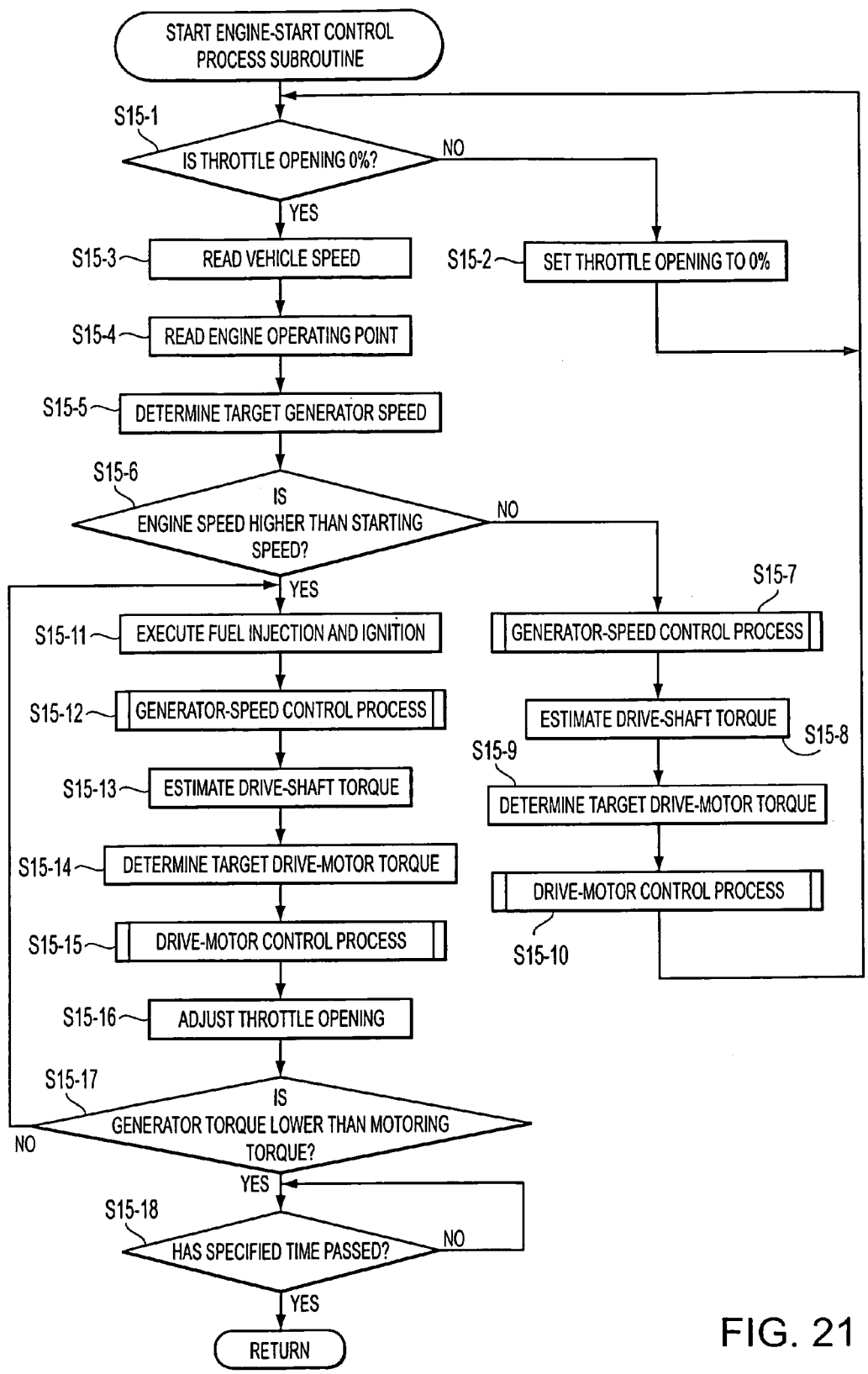
FIG. 21 is a diagram of the subroutine of an engine-startup control process according to the embodiment of the invention.

The subroutine for the engine-start control process executed in step S15 of FIG. 12 will be described with reference to FIG. 21. In the engine-start control process, the engine-start control means reads the throttle opening θ (step S15-1), and when the throttle opening is not 0% (step S15-1, No) the processing sets the throttle opening to 0% (Step S15-2) and returns to step S15-1. Conversely, when the throttle opening θ is 0%, the process goes to step S15-3 to read the vehicle speed V, calculated by the vehicle-speed calculation means, and then to read the operating point of the engine 11 (step S15-4) determined by the target engine-operating-condition setting process.

The target-generator-speed calculation means executes the target-generator-speed calculation process to read the drive-motor rotor position θM and calculate the ring-gear speed NR from the drive-motor rotor position θM and the gear ratio γR, read the target engine speed NE* in the operating point, calculate the target generator speed NG* from the ring-gear speed NR and the target engine speed NE* by the rotational-speed relation, and send it to the generator control unit 47 (step S15-5).

The engine-start control means compares the engine speed NE with a preset starting speed NEth1 to determine whether the engine speed NE is higher than the starting speed NEth1 (step S15-6). When the engine speed NE is higher than the starting speed NEth1, the engine-start control means sends an instruction to start the engine 11 to the engine control unit 46. An engine start means (not shown) of the engine control unit 46 executes engine-start process to emit a jet of fuel to the engine 11 and ignite it, or start the engine (step S15-11).

In the generator control unit 47, the generator-speed control means executes a generator-speed control process according to the target generator speed NG* to increase the generator speed NG and also increase the engine speed NE along therewith (step S15-12).

As in steps S25 to S27, the drive-shaft-torque estimation means estimates the drive-shaft torque TR/OUT (step S15-13) and the target drive-motor torque calculation means calculates the target drive-motor torque TM* and sends it to the drive-motor control unit 49 (step S15-14). In the drive-motor control unit 49, the drive-motor control means controls the torque of the drive motor 25 according to the target drive-motor torque TM*, thereby controlling the drive-motor torque TM (step S15-15).

The engine-start control means controls the throttle opening θ so that the engine speed NE reaches the target engine speed NE* (step S15-16). The engine-start control means then determines whether the generator torque TG is lower than a motoring torque TEth associated with the starting of the engine 11 in order to determine whether the engine 11 is normally operated (step S15-17) and stands by for a specified time when the generator torque TG is lower (step S15-17, Yes) than the motoring torque TEth (step S15-18). After the specified time, processing then returns to where the subroutine was called.

In step S15-6, when the engine speed NE is equal to or lower than the starting speed NEth1 (step S15-6, No), the generator-speed control means executes the generator-speed control process according to the target generator speed NG* (step S15-7), then, as in steps S25 to S27, the drive-shaft-torque estimation means estimates the drive-shaft torque TR/OUT (step S15-8), and the target-drive-motor-torque calculation means calculates the target drive-motor torque TM* and sends it to the drive-motor control unit 49 (step S115-9). In the drive-motor control unit 49, the drive-motor control means controls the torque of the drive motor 25 according to the target drive-motor torque TM* to control the drive-motor torque TM (step S15-10) and processing returns to step S15-1. Further, if, in step S15-17, the generator torque is equal to or greater than the motoring torque (step S15-17, No) processing returns to step S115-11.

Figure 22:
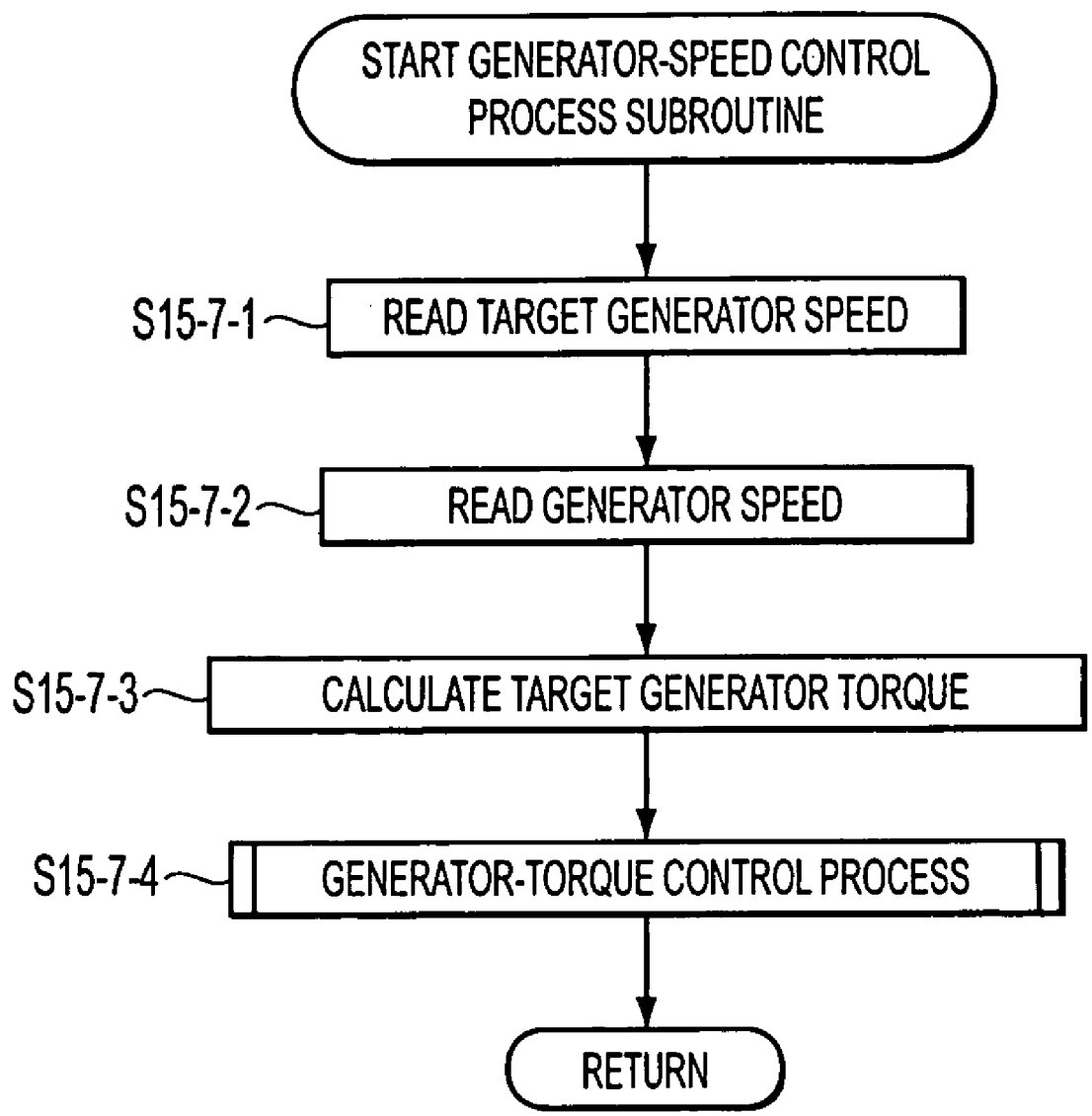
FIG. 22 is a diagram of the subroutine of a generator-speed control process according to the embodiment of the invention.

The subroutine of the generator-speed control process executed in step S23 of FIG. 13 and in steps S15-7 and S15-12 of FIG. 21 will be described with reference to FIG. 22. In the subroutine, the generator-speed control means reads the target generator speed NG* (step S15-7-1) and generator speed NG (step S15-7-2), executes PI control according to the speed difference ΔNG between the target generator speed NG* and the generator speed NG to calculate the target generator torque TG* (step S15-7-3). In that case, the higher the speed difference ΔNG is, the higher the target generator torque TG* is and also whether positive or negative is taken into consideration.

Figure 20:
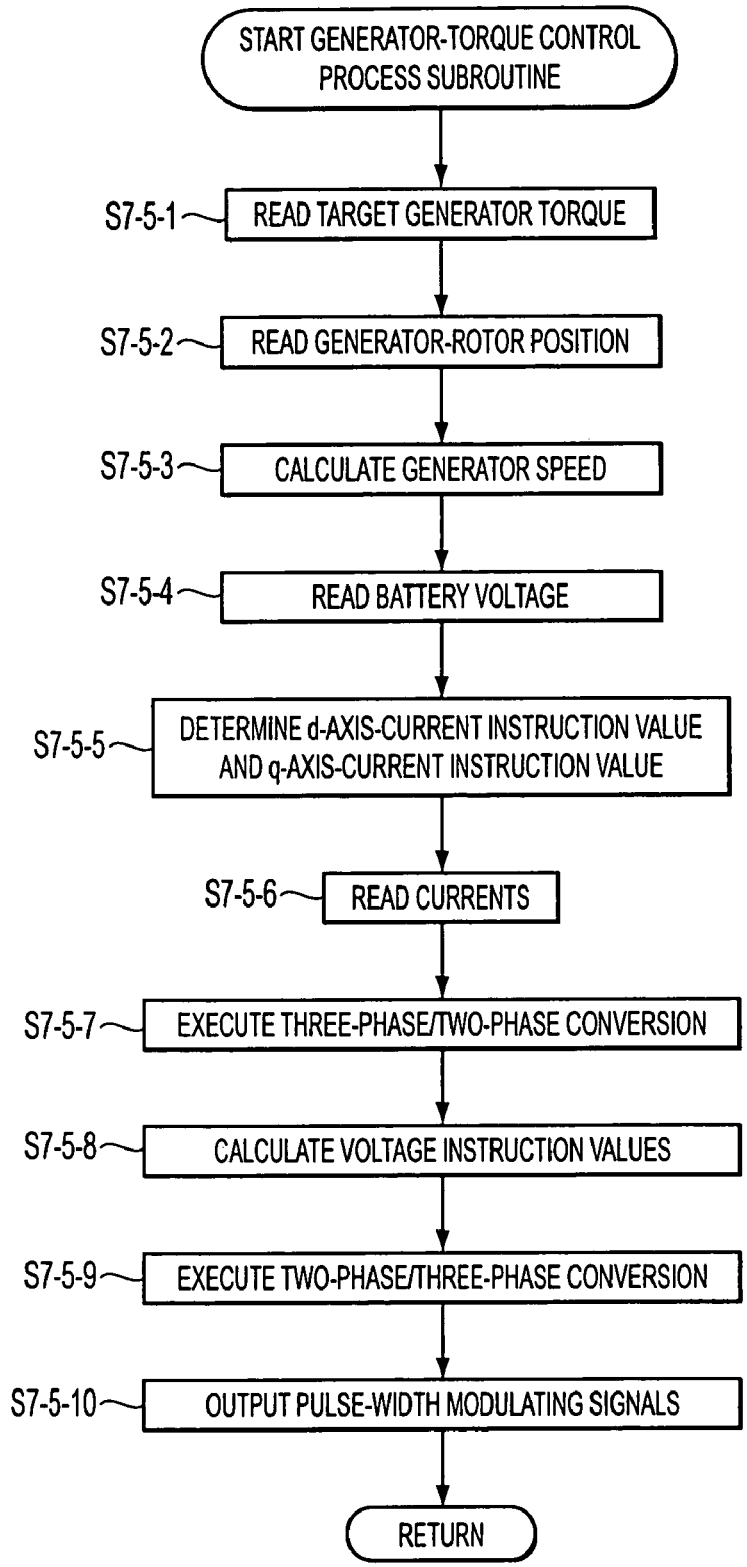
FIG. 20 is a diagram of the subroutine of a generator-torque control process according to the embodiment of the invention.

The generator-torque control means then executes the generator-torque control process of FIG. 20 to control the torque of the generator 16 (step S15-7-4). Processing then returns to where the subroutine was called.

Figure 23:
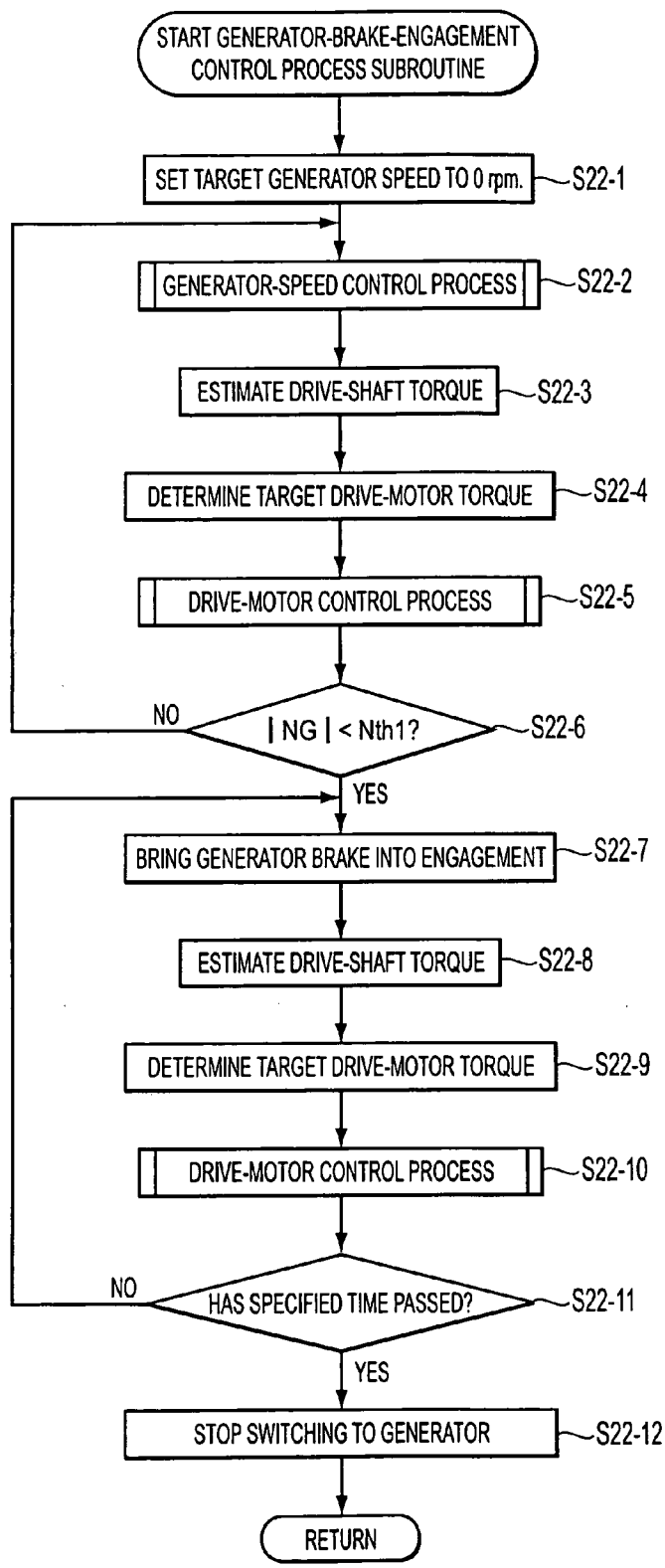
FIG. 23 is a diagram of the subroutine of a generator-brake-engagement control process according to the embodiment of the invention.

The subroutine for the generator-brake-engagement control process executed in step S22 of FIG. 13 will be described with reference to FIG. 23.

In the generator-brake-engagement control process, the generator-brake-engagement control means turns the brake signal from OFF to ON and sets the target generator speed NG* to 0 rpm (step S22-1). After the generator control unit 47 has executed the generator-speed control process of FIG. 22 (step S22-2), the drive-shaft-torque estimation means estimates the drive-shaft torque TR/OUT (step S22-3), and the target-drive-motor-torque calculation means determines the target drive-motor torque TM* (step S22-4) and sends the value to the drive-motor control unit 49. In the drive-motor control unit 49, the drive-motor control means controls the torque of the drive motor 25 according to the target drive-motor torque TM*, thereby controlling the drive-motor torque TM, as in steps S25 to S27 (step S22-5).

The generator-brake-engagement control means then determines whether the absolute value of the generator speed NG is smaller than a specified rotational speed Nth1 (for example, 100 rpm) (step S22-6). When the generator speed NG is equal to or greater than the specified rotational speed Nth1 (step S22-6, No) processing returns to step S22-2. Conversely, when the absolute value of the generator speed NG is smaller than the rotational speed Nth1 (step S22-6, Yes), the generator brake B is brought into engagement (step S22-7). The drive-shaft-torque estimation means estimates the drive-shaft torque TR/OUT (step S22-8), and the target-drive-motor-torque calculation means determines the target drive-motor torque TM* (step S22-9) and sends the value to the drive-motor control unit 49. In the drive-motor control unit 49, the drive-motor control means controls the torque of the drive motor 25 according to the target drive-motor torque TM*, thereby controlling the drive-motor torque TM, as in steps S25 to S27 (step S22-10).

After the lapse of a specified time with the generator brake B in engagement (step S27-11, Yes), the generator-brake-engagement control means stops the switching to the generator 16 to shut down the generator 16 (step S22-12). Processing then returns to the main routine. If the specified time has not lapsed (step S22-11, No) processing proceeds back to step S22-7.

Figure 24:
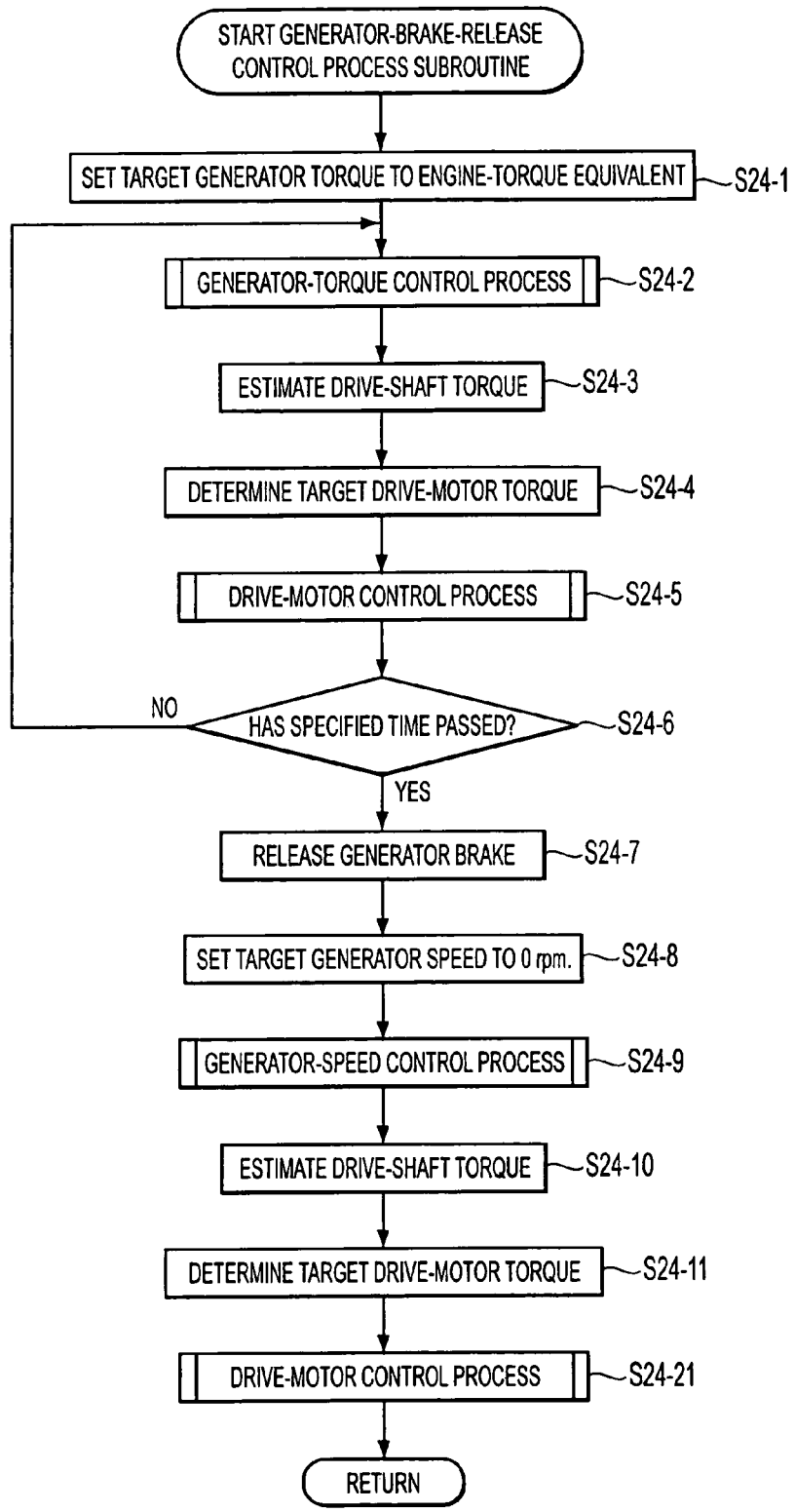
FIG. 24 is a diagram of the subroutine of a generator-brake-release control process according to the embodiment of the invention.

The subroutine for the generator-brake release control process executed in step S24 of FIG. 13 will be described with reference to FIG. 24. In the generator-brake-engagement control process, the specified engine torque TE is applied to the rotor 21 of the generator 16 as a reaction force while the generator brake B (FIG. 10) is engaged. Thus, when the generator brake B is simply released, because the generator torque TG and the engine torque TE vary greatly at that time and the engine torque TE is transmitted to the rotor 21, a shock is transmitted to the operator.

Accordingly, in the vehicle control unit 51, the engine torque TE transmitted to the rotor 21 is estimated or calculated and the generator-brake-release control means reads a torque corresponding to the estimated or calculated engine torque TE, namely, the equivalent of engine torque, and sets it as the target generator torque TG* (step S24-1). Subsequently, after the generator-torque control means has executed the generator-torque control process of FIG. 20 (step S24-2), the drive-shaft-torque estimation means estimates the drive-shaft torque TR/OUT (step S24-3), and the target-drive-motor-torque calculation means determines the target drive-motor torque TM* (step S24-4) and sends the value to the drive-motor control unit 49. The drive-motor control means of the drive-motor control unit 49 controls the torque of the drive motor 25 according to the target drive-motor torque TM*, thereby controlling the drive-motor torque TM, as in steps S25 to S27 (step S24-5).

When a specified time has passed after starting of the generator-torque control process (step S24-6, Yes), the generator-brake-release control means releases the generator brake B (step S24-7) and sets the target generator speed NG* to 0 rpm (step S24-8). The generator-speed control means then executes the generator-speed control process of FIG. 22 (step S24-9). Subsequently, the drive-shaft-torque estimation means estimates the drive-shaft torque TR/OUT (step S24-10), and the target-drive-motor-torque calculation means determines the target drive-motor torque TM* (step S24-11) and sends the value to the drive-motor control unit 49. The drive-motor control means of the drive-motor control unit 49 controls the torque of the drive motor 25 according to the target drive-motor torque TM*, thereby controlling the drive-motor torque TM, as in steps S25 to S27 (step S24-12). Processing then returns to the main routine. Further, when the specified time has not passed (step S24-6, No) processing returns to step S24-2. In the process, the engine-torque equivalent is estimated or calculated by determining the torque ratio of the generator torque TG to the engine torque TE.

Figure 25:
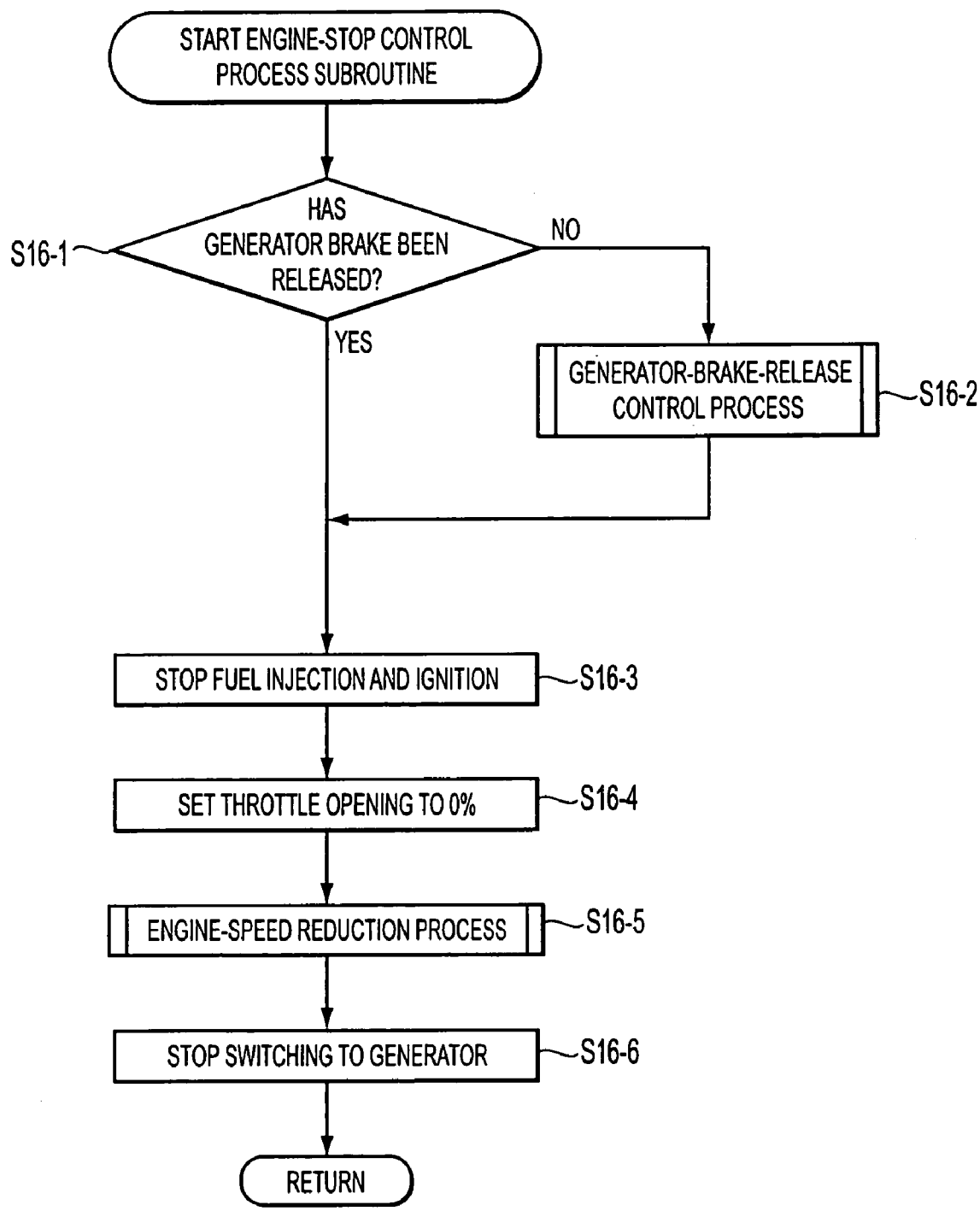
FIG. 25 is a diagram of the subroutine of an engine-stop control process according to the embodiment of the invention.
Figure 26:
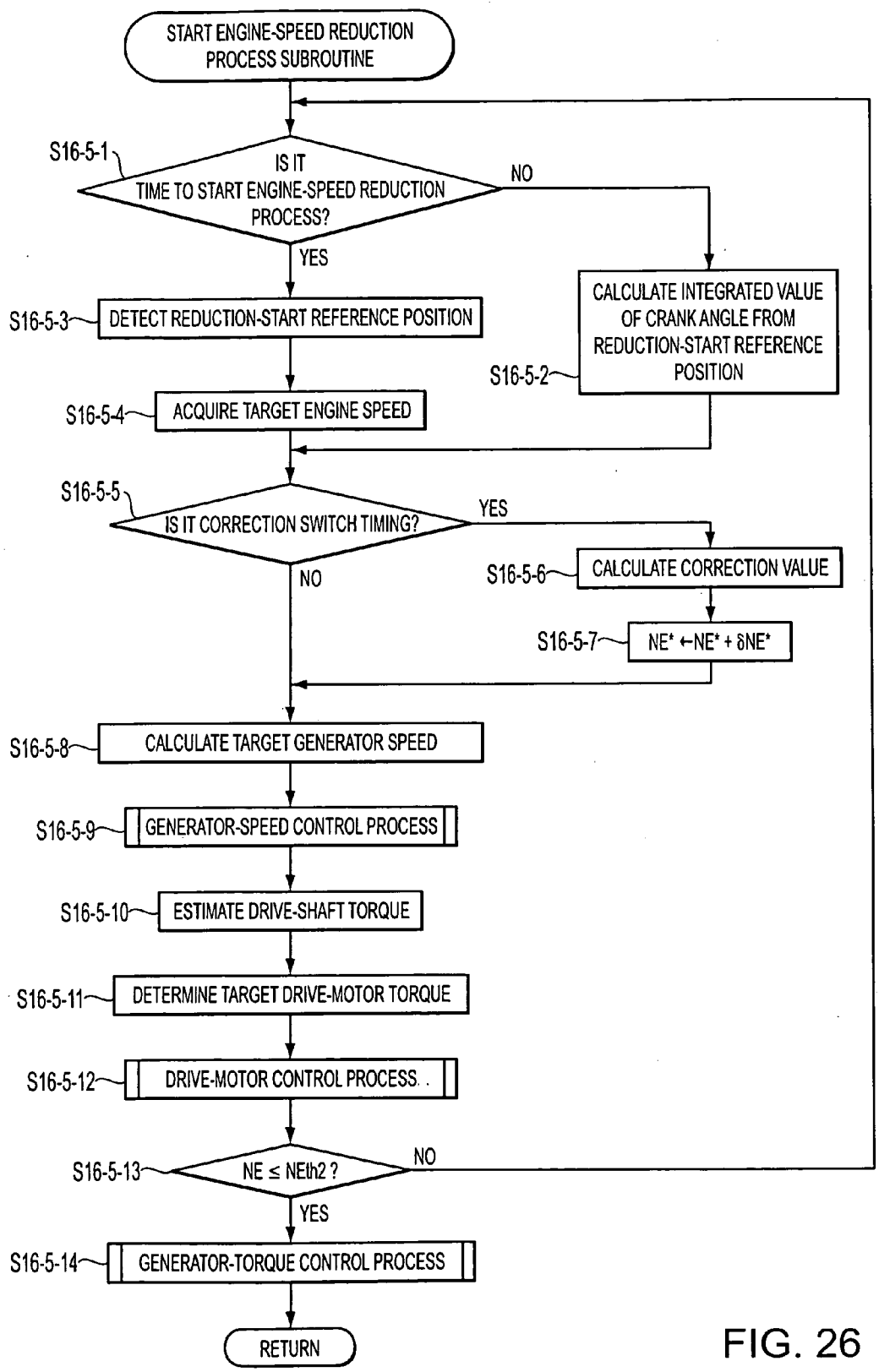
FIG. 26 is a diagram of the subroutine of an engine-speed reduction process according to the embodiment of the invention.
Figure 28:
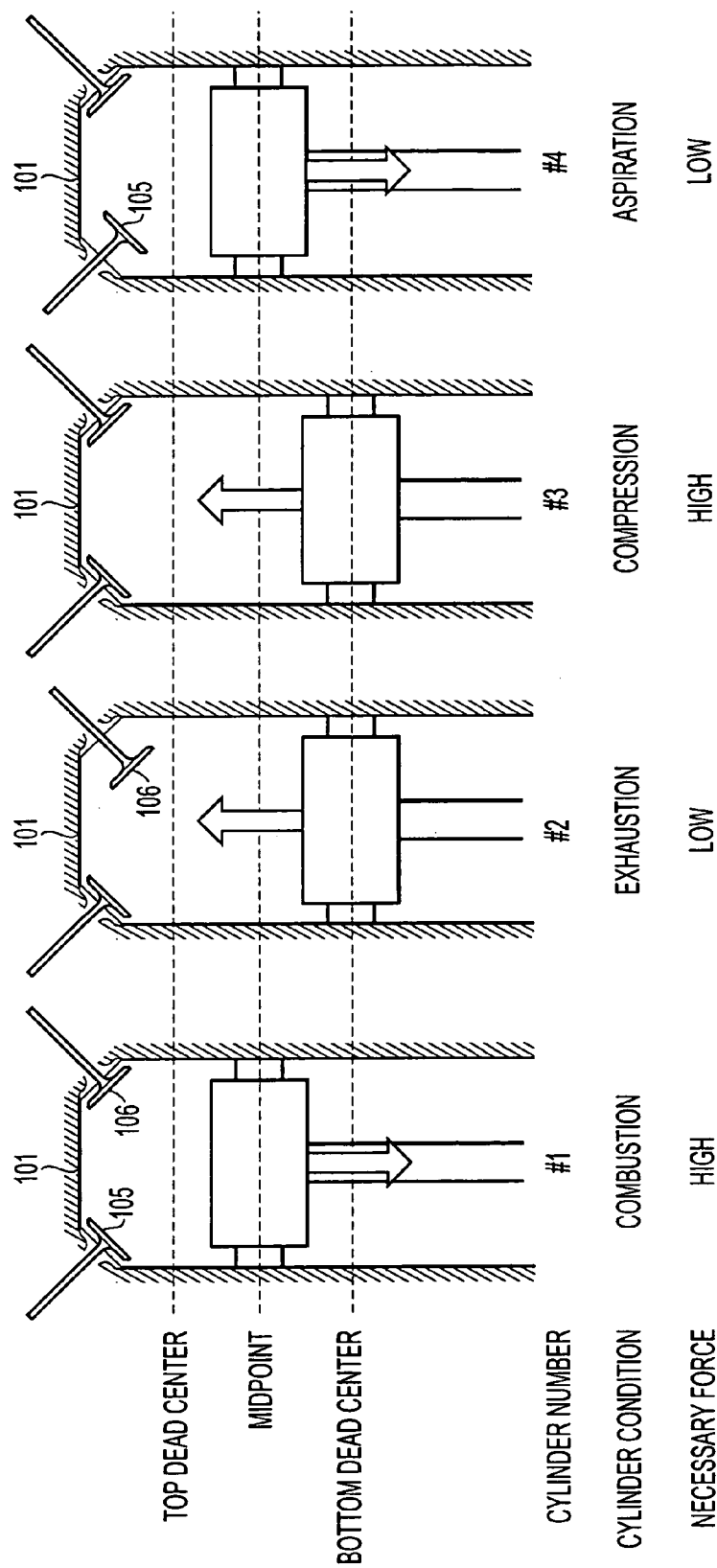
FIG. 28 is a diagram of a second condition of the engine according to the embodiment of the invention.
Figure 29:
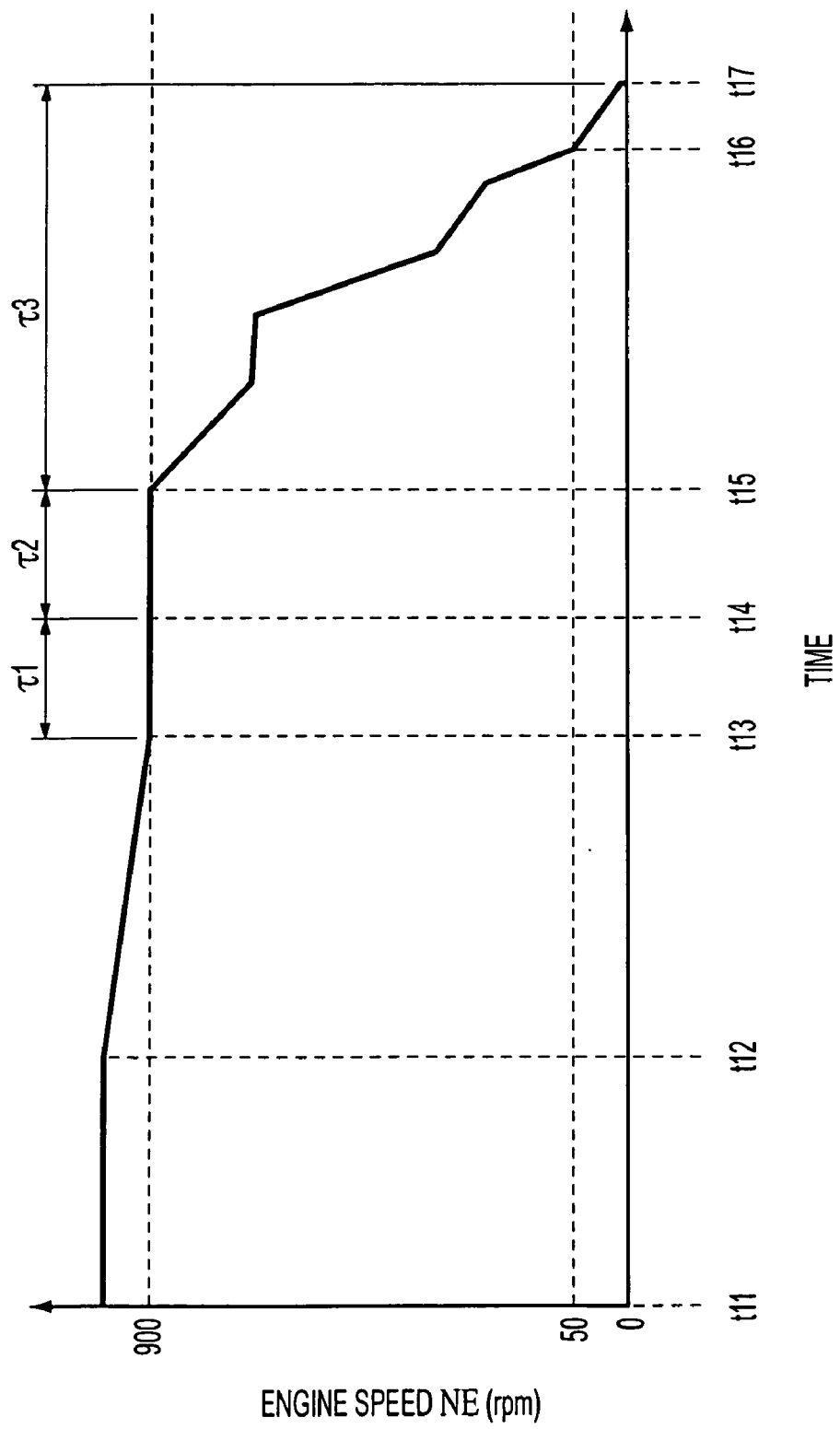
FIG. 29 is a time chart for the operation of the engine-stop control process according to the embodiment of the invention.
Figure 30:
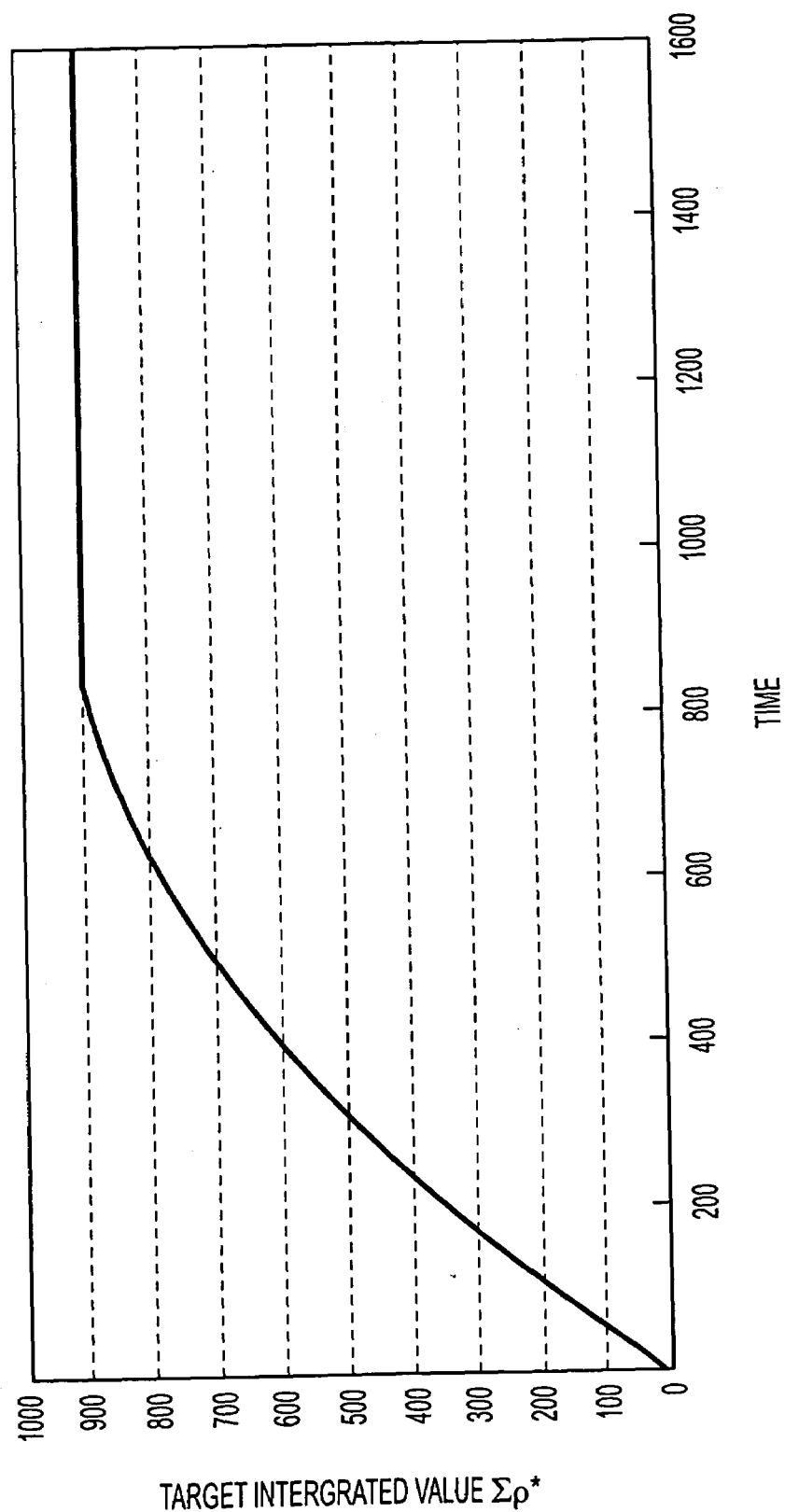
FIG. 30 is a first diagram of a target-integrated-value map according to the embodiment of the invention.
Figure 32:
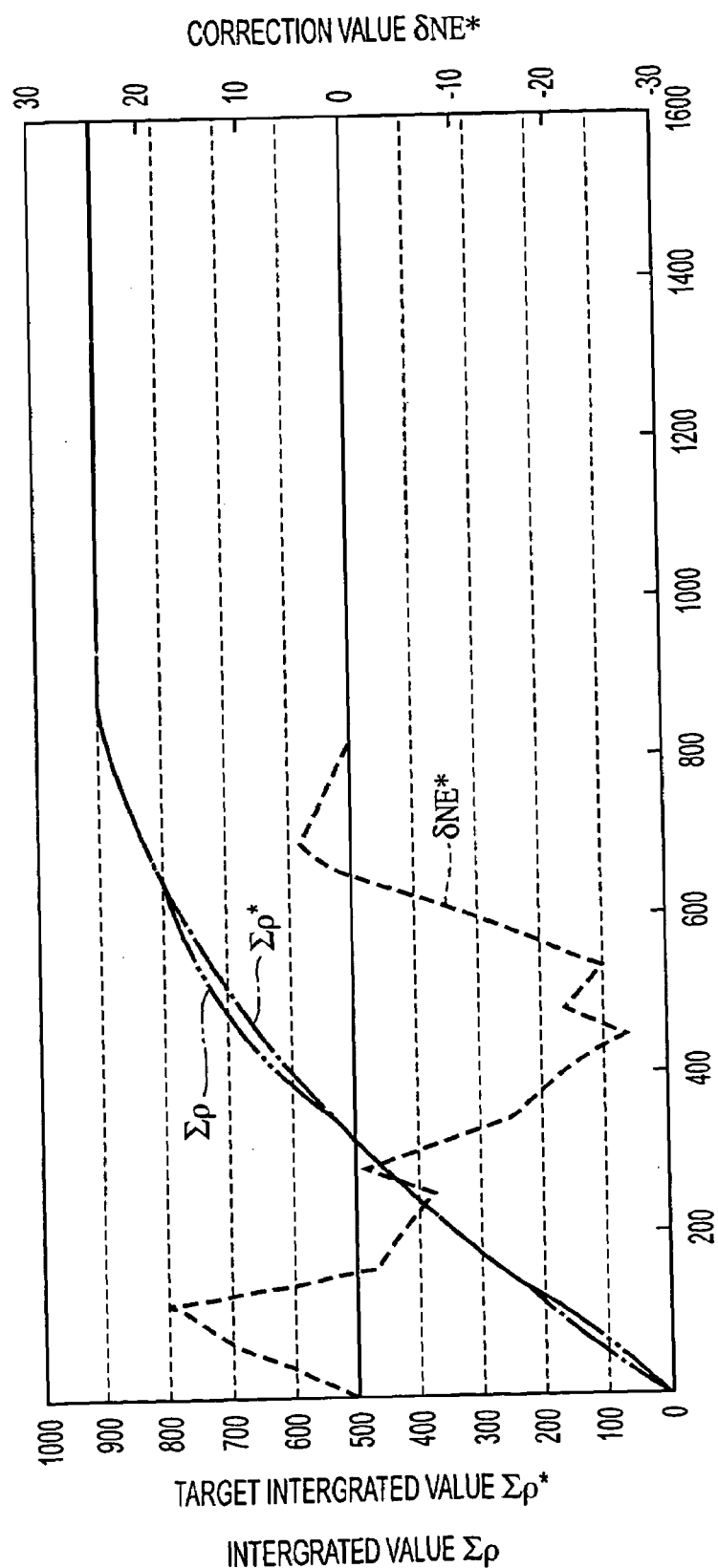
FIG. 32 is a graph of the correction value of a target engine speed according to the embodiment of the invention.
Figure 33:
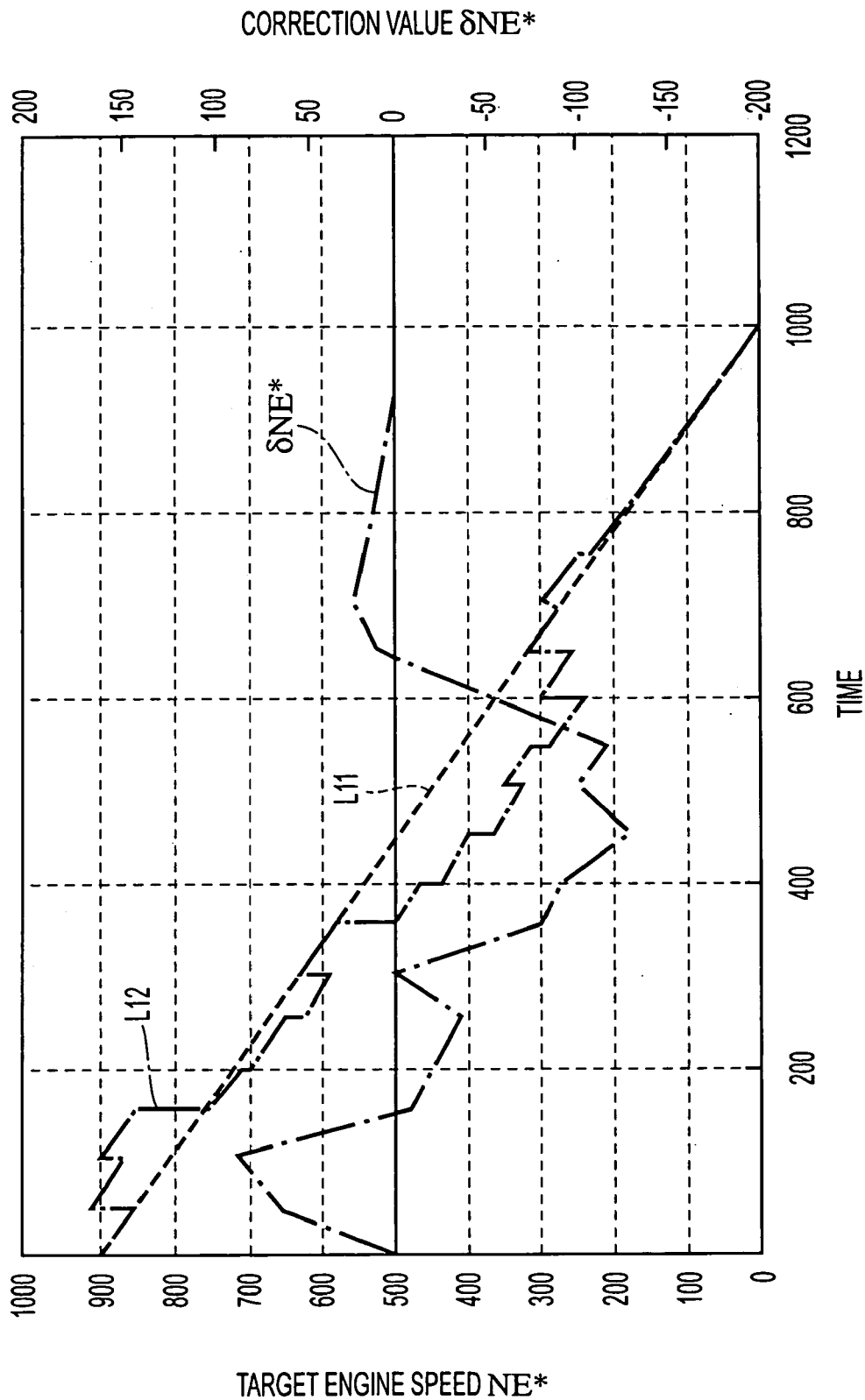
FIG. 33 is a graph of the operation of a target-engine-speed correction process according to the embodiment of the invention.

The subroutine of the engine-stop control process in step S16 of FIG. 12 will be described with reference to FIGS. 25 and 26. Further, FIGS. 27–33 will be referenced. In FIG. 29, the horizontal axis is scaled in terms of time and the vertical axis is scaled in terms of engine speed NE. In FIG. 30, the horizontal axis is scaled in terms of time; the vertical axis is scaled in terms of a target integrated value $\Sigma\rho^*$. In FIG. 32, the horizontal axis is scaled in terms of time; the vertical axis is scaled in terms of an integrated value $\Sigma\rho$, the target integrated value $\Sigma\rho^*$, and a correction value $\delta NE^*$. In FIG. 33, the horizontal axis is scaled in terms of time; the vertical axis is scaled in terms of the target engine speed NE* and the correction value $\delta NE^*$.

The engine 11 and the drive motor 25 are first driven so that, when the engine 11 shifts from the operating region AR1 to the stop region AR2 shown in FIG. 17 while the engine 11 is driven according to the target engine speed NE* and the drive motor 25 is driven according to a target drive-motor speed NM*, the engine-stop control means determines whether the generator brake B has been released (step S16-1). When the generator brake B has not been released and is engaged (step S16-1, No), an instruction to release the generator brake B is sent to the generator control unit 47 and the generator-brake-release control means executes generator-brake-release control process of FIG. 24 to release the generator brake B (step S16-2).

When the generator brake B has been released (either step S116-1, Yes or after step S16-2), the engine-stop control means issues an engine stop request to the engine control unit 46 at timing t11 (FIG. 29) to stop the fuel injection and firing of the engine 11 (step S16-3), thereby bringing the throttle opening θ into 0% (step S16-4).

The engine 11 generally includes a plurality of cylinders, in which the pistons are joined together with a crankshaft. The cylinders draw in air and are subjected to the processes (brought into conditions) of aspiration by which fuel is injected, compression by which the mixture of air and fuel is compressed, combustion by which the mixture is ignited, and exhaustion by which exhaust gas after the combustion is exhausted.

The condition of the engine 11 will be described with reference to FIGS. 27 and 28. In the drawings, reference numeral 101 denotes a cylinder; numeral 102 denotes a piston which reciprocates in the cylinder 101; numeral 103 denotes a piston rod connected between the piston 102 and a crankshaft (not shown) such that the piston rod 103 oscillates freely; numeral 105 denotes an intake valve for sucking air; and numeral 106 denotes an exhaust valve for letting out the exhaust gas.

The four cylinders 101 are arranged adjacent to one another and the pistons 102 in the cylinders 101 are each joined with the crankshaft through the piston rods 103 and reciprocate through the top dead center, the midpoint, and the bottom dead center. Suppose the cylinders 101 are numbered #1 to #4 and the ignition order is #1→#3→#4→#2 for a four-cylinder engine. When the cylinder 101 No. #1 is subjected to the combustion process, the cylinders 101 of Nos. #2 to #4 are subjected to the exhaustion process, the compression process, and the aspiration process, respectively, as shown in FIGS. 27 and 28. The force necessary to move the pistons 102 is large in the cylinders 101 Nos. #1, #3 and is small in the cylinders 101 Nos. #2, #4.

Figure 27:
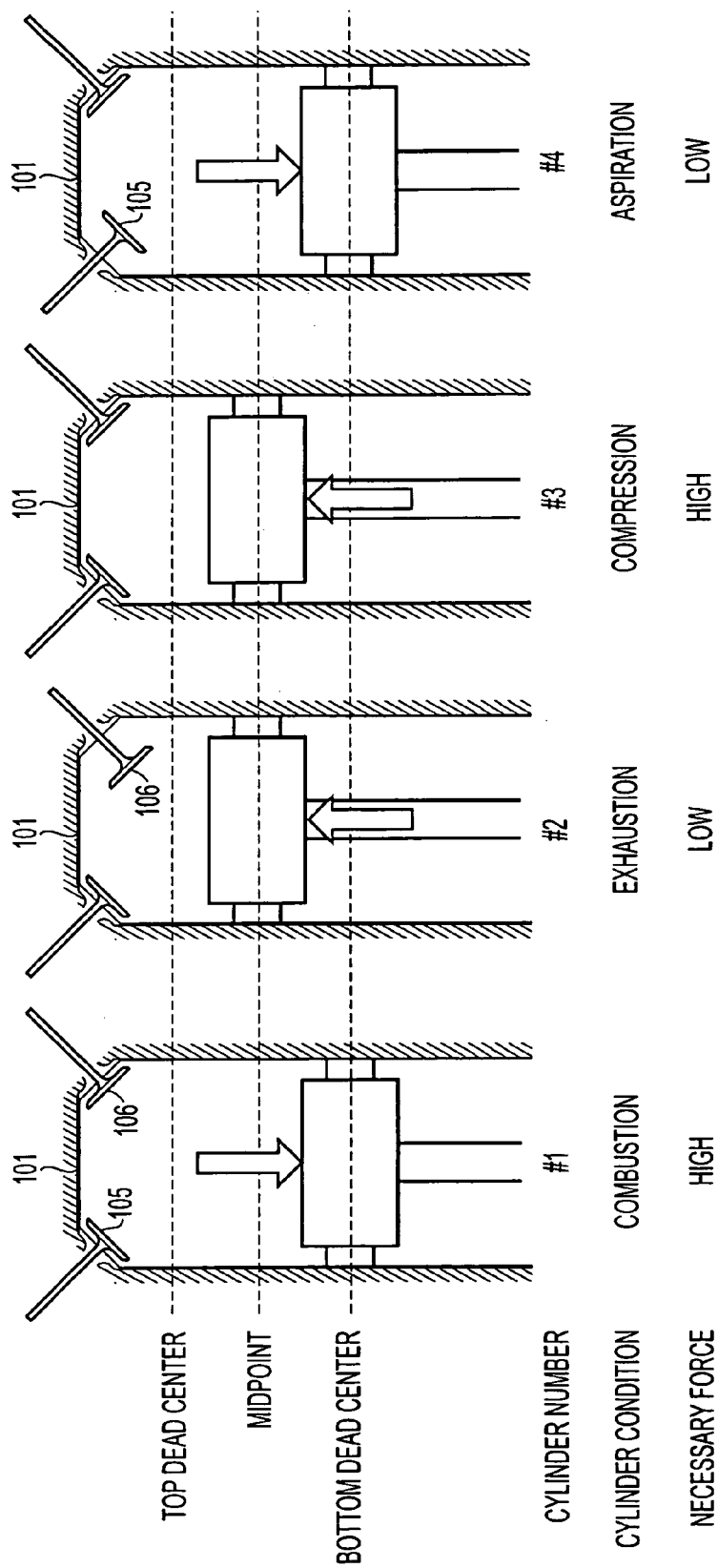
FIG. 27 is a diagram of a first condition of the engine according to the embodiment of the invention.

Referring to FIG. 27, the top surfaces of the pistons 102 in the cylinders 101 Nos. #1, #4 are located between the midpoint and the bottom dead center of the combustion process and the aspiration process, respectively, while the top surfaces of the pistons 102 in the cylinders 101 Nos. #2, #3 are located between the top dead center and the midpoint of the exhaustion process and the compression process, respectively. In other words, when the stroke of the cylinders 101 Nos. #1, #3 in the combustion process and the compression process, respectively, which require large power to move the piston 102, is small, the shock generated at the start of the engine 11 is reduced. On the other hand, referring to FIG. 28, the top surfaces of the pistons 102 in the cylinders 101 Nos. #1, #4 are located between the top dead center and the midpoint of the combustion process and the aspiration process, respectively, while the top surfaces of the pistons 102 in the cylinders 101 Nos. #2, #3 are located between the midpoint and the bottom dead center of the exhaustion process and the compression process, respectively. In other words, as the stroke of the cylinders 101 Nos. #1, #3 in the combustion process and the compression process, respectively, which require large power to move the piston 102, is larger than that of FIG. 27, the shock generated at the start of the engine 11 is increased. This gives a driver an uncomfortable feeling.

Accordingly, placing the crankshaft of the engine 11 at an optimum crank angle at the start of the engine 11 when the position of the crankshaft of the engine 11 is expressed in terms of the crank angle ρ prevents the occurrence of shock with the startup. Thus, in this embodiment, to stop the engine 11, the position of the optimum crank angle is set as a target stop position and the crankshaft is placed at the target stop position. In other words, the engine 11 is stopped at the target stop position.

To this end, the engine-stop control means reads a generator-mode switching signal generated in the vehicle control unit 51 at timing t12, sets the target engine speed NE* to an idling speed Nid (for example, 900 rpm) that is a threshold, and waits for the engine speed NE to reach the idling speed Nid.

When the engine speed NE has reached the idling speed Nid at timing t13, an engine-speed reduction means of the engine-stop control means determines it is time to start and starts an engine-speed reduction process (step S16-5; step S16-5-1, Yes). That is, a preprocess means of the engine-speed reduction means executes a preprocess to start timing with a timer built into the vehicle control unit 51 and to drive the generator 16, thereby operating the engine 11 with no load at the idling speed Nid for time τ1 (for example, 500 ms). This eliminates the variation in pressure in the cylinders 101 of the engine 11 after the fuel injection and ignition have been stopped.

A reduction-start-reference-position detection means of the engine-speed reduction means starts a reduction-start-reference-position detection process (step S16-5-3) at timing t14 to read the crank angle ρ from the crank-angle sensor 56 and detects the reduction-start reference position serving as the reference to start the reduction of the engine speed NE when the engine 11 is stopped at a target stop position according to the crank angle ρ. The reduction-start reference position is calculated, set, and expressed in terms of the crank angle ρ in advance from the target stop position, the moving time when the crankshaft is moved to the target stop position, moving speed, etc.

The reduction-start-reference-position detection process is started and, after a lapse of a specified time τ2 (for example, 2 to 1,000 ms) from the detection of the reduction-start reference position, at timing t15, the engine-speed reduction means starts to reduce the engine speed NE, i.e., the process determines if it is correction switch timing in step S16-5-5.

In that case, the engine speed NE reaches 0 rpm in a specified time τ3, 1,000 ms in this embodiment, and the position of the crankshaft is moved from the reduction-start reference position to the target stop position.

After initially acquiring the target engine speed NE* (step S16-5-4), during each control processing, the target-enginespeed acquisition means 91 of the engine-speed reduction means executes a target-engine-speed acquisition process to acquire the target engine speed NE* after the start of the reduction of the engine speed NE until the engine speed NE reaches 0 rpm by sequentially calculating the following expression:

NE*←NE*−∈NE*.

The target engine speed NE* can be determined in advance in correspondence with the elapsed time after the start of reduction of the engine speed NE and recorded as target-engine-speed map in the recording device of the vehicle control unit 51. In that case, the engine-speed reduction means acquires the target engine speed NE* by reading the target engine speed NE* corresponding to the elapsed time after the start of reduction of the engine speed NE with reference to the target-engine-speed map.

The value ∈NE* for calculating the target engine speed NE* is set according to the engine speed NE when the reduction-start reference position was detected and the time τ3 as follows: because the engine speed NE at the time when the reduction-start reference position was detected is 900 rpm in this embodiment, the engine speed NE must be brought from 900 rpm to 0 rpm while the position of the crankshaft moves from the reduction-start reference position to the target stop position.

Accordingly, the deceleration β after the start of reduction of the engine speed NE until the engine speed NE reaches 0 rpm is expressed as $$\beta = (900 - 0)/1{,}000$$
$$= 0.9 \ [\text{rpm/ms}].$$

The initial value of the target engine speed NE* is set to 900 rpm and the value ∈NE* which is subtracted from the target engine speed NE* each control timing time period has passed after the start of reduction of the engine speed NE can be calculated using the deceleration β. That is, in step S16-5-5 it is determined whether the timing is correction switch timing. When it is the correction switch timing, the procedure moves to step S16-5-6; when it is not the correction switch timing, the procedure moves to step S16-5-8. Further, after step S16-5-7, as discussed above, the processing proceeds to step S16-5-8.

In step S116-5-8, the target-generator-speed calculation means of the engine-speed reduction means executes a target-generator-speed calculation process to read the ring-gear speed NR and the target engine speed NE*, calculate target generator speed NG* from the ring-gear speed NR and the target engine speed NE* by the rotational-speed relationship, and send it to the generator control unit 47. The generator control unit 47 executes the generator-speed control process (step S16-5-9) of FIG. 22 to control the rotational speed of the generator 16 so that the generator speed NG reaches the target generator speed NG*.

As in steps S25 to S27, the drive-shaft-torque estimation means estimates the drive-shaft torque TR/OUT (step S16-5-10), and the target drive-motor torque calculation means determines the target drive-motor torque TM* (step S16-5-11) and sends it to the drive-motor control unit 49. In the drive-motor control unit 49, the drive-motor control means controls the torque of the drive motor 25 according to the target drive-motor torque TM*, thereby controlling the drive-motor torque TM (step S16-5-12).

Thus, in the process, the target engine speed NE* is acquired, the target generator speed NG* is calculated from the target engine speed NE*, and the rotational speed of the generator 16 is controlled to gradually reduce the engine speed NE. When the friction in the engine 11, the generator 16, etc. varies or the temperature or viscosity of the lubricating and cooling oils varies, it becomes difficult to place the crankshaft at a target stop position when the engine speed NE reaches 0 rpm. Accordingly, as discussed above, the target engine speed NE* is corrected every specified correction switch timing (step S16-5-6).

For this purpose, the deviation of the theoretical crank angle ρ from the reduction-start reference position when the engine speed NE is reduced at the deceleration β is calculated in advance as an integrated value which is the target of the crank angle ρ and is set as the target integrated value Σρ* indicative of a target deviation. The target integrated value Σρ* is set as the target deviation map and the target integrated-value map, shown in FIGS. 30 and 31, in correspondence with the elapsed time from the start of reduction of the engine speed NE and is recorded in the recording device of the vehicle control unit 51. In this embodiment, the target integrated value Σρ* is set as index values within the range from 0 to 1,000 indicative of the position of a flywheel (not shown) joined with the crankshaft.

When the reduction of the engine speed NE has started, i.e. anytime after the process has started, (step S16-5-1, No), the crank-angle acquisition means 92 of the engine-speed reduction means executes a crank-angle acquisition process to read and acquire an actual crank angle ρ every control timing. An integrated-value calculation means, serving as crank-angle-deviation calculation means of the engine-speed reduction means, executes an integrated-value calculation process serving as the crank-angle-deviation calculation process to calculate the integrated value Σρ that is the deviation of the crank angle ρ from the reduction-start reference position (step S16-5-2). In this case, the integrated value Σρ can be acquired by calculating the amount of change Δρ of the crank angle ρ every control timing with the initial value at 0 and by integrating them and processing proceeds to step S16-5-5.

A target-engine-speed correction-value calculation means of the engine-speed reduction means executes target-engine-speed correction-value calculation process to determine whether the timing is correction switch timing (step S16-5-5), wherein, as discussed above, when it is the correction switch timing, the correction value δNE* of the target engine speed NE* is calculated (step S16-5-6). The correction switch timing is set at an interval longer than the control timing, for example, every 50 ms. Because the engine speed NE in the embodiment must be brought to 0 rpm in 1,000 ms, 20 correction switch timings are set.

Specifically, in step S16-5-6, the target-engine-speed correction-value calculation means reads the integrated value Σρ at the correction switch timing and also reads the target integrated value Σρ* corresponding to the elapsed time from the start of reduction of the engine speed NE with reference to the target-integrated-value map, and calculates the deviation ΔΣρ between the integrated value Σρ and the target integrated value Σρ* as follows:

ΔΣρ=Σρ*−Σρ and further calculates the correction value δNE* of the target engine speed NE*, shown in FIG. 32, from the deviation ΔΣρ as follows:

δNE*=k·ΔΣρ where k is a constant. In that case, when the target integrated value $\Sigma\rho^*$ is larger than the integrated value $\Sigma\rho$ and the deviation $\Delta\Sigma\rho$ takes a positive value, the correction value $\delta NE^*$ takes a positive value; when the target integrated value $\Sigma\rho^*$ is smaller than the integrated value $\Sigma\rho$ and the deviation $\Delta\Sigma\rho$ takes a negative value, the correction value $\delta NE^*$ takes a negative value.

Subsequently, at step S116-5-7, the target-engine-speed correction means 93 of the engine-speed reduction means executes target-engine-speed correction process to read the target engine speed $NE^*$ at the correction switch timing with reference to the target-engine-speed map and correct the target engine speed $NE^*$ by the correction value $\delta NE^*$ as follows:

$$NE^* \leftarrow NE^* + \delta NE^*,$$

and the process proceeds to step S16-5-8.

Referring to FIG. 33, reference symbol L11 denotes a target engine speed $NE^*$ before correction, which is read from the recording device, and symbol L12 denotes a target engine speed $NE^*$ after the correction. As shown in the graph, the target engine speed $NE^*$ is corrected every correction switch timing and is held at the same value until the following correction switch timing. The target engine speed $NE^*$ is thus corrected at every correction switch timing (steps S16-5-5, Yes; S16-5-6; S16-5-7) to gradually bring the engine speed NE close to 0 rpm. When the control of the engine speed NE is continued with the engine speed NE close to 0 rpm, the one-way clutch F can be locked.

In step S16-5-13, an end-condition-fulfillment determination means of the engine-speed reduction means executes end-condition-fulfillment determination process to determine whether the end condition for finishing the control of the engine speed NE has been met depending on whether the engine speed NE is lower than a specified value, or a stop speed NEth2 (for example, 50 rpm), wherein when the engine speed NE is lower than the stop speed NEth2, it determines that the end condition has been met (step S16-5-13, Yes). When the stop speed NEth2 (for example, 50 rpm) is set lower than the resonance speed of the damper gear Dp, disposed between the engine 11 and the generator 16, the resonance speed of the damper gear Dp can quickly be passed through. The vibration of the engine 11 at stopped mode can thus be reduced. When the end condition is met at timing t16, the engine-speed reduction process is finished.

Then in step S16-5-14, the engine-stop control means controls the torque of the generator 16 while setting the target generator torque $TG^*$ to be sent to the generator control unit 47 at zero. When the engine speed NE reaches 0 rpm at timing t17, the engine-stop control means sends an instruction to stop the operation of the generator 16 to the generator control unit 47. The generator control unit 47 stops the switching to the generator 16 to shut down the generator 16 (step S16-6). Processing then returns to the main routine. Conversely, when, at step S16-5-13, the engine speed NE is higher than the stop speed (step S16-5-13, No), the process returns to step S16-5-1.

In this embodiment, as described above, the correction value $\delta NE^*$ is calculated from the deviation $\Delta\Sigma\rho$ between the target integrated value $\Sigma\rho^*$ and the integrated value $\Sigma\rho$ every correction switch timing and the target engine speed $NE^*$ is corrected according to the correction value $\delta NE^*$. Accordingly, even if friction in the engine 11, the generator 16, etc. varies, the temperature or viscosity of the lubricating and cooling oils varies, or the hybrid vehicle is accelerated or decelerated during the reduction of the engine speed NE, the crankshaft can certainly be placed at the target stop position when the engine speed NE reaches 0 rpm. Briefly, the engine 11 can be stopped at the target stop position with certainty.

Because the engine 11 can thereafter be started at an optimum crank angle, the occurrence of a shock along with startup can be prevented. Also, because there is no need to move the crankshaft to the optimum crank angle after the stop of the engine 11, torque fluctuations due to the rotation of the crankshaft do not occur. Further, as there is no need to move the crankshaft to an optimum crank angle at the start of the engine 11, the timing of starting the engine 11 is not delayed. This prevents the uncomfortable feeling to the occupants of the vehicle.

Even when the vehicle drive system is installed in a hybrid vehicle, as in this embodiment, the crankshaft can certainly be placed at a target stop position.

Figure 34:
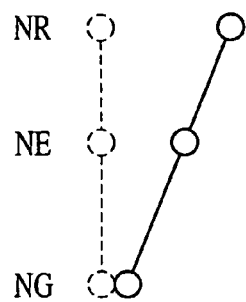
FIG. 34 is a first speed diagram showing a state before starting the engine-stop control process according to the embodiment of the invention.
Figure 35:
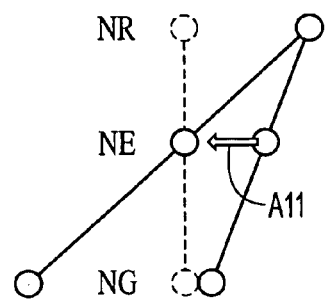
FIG. 35 is a second speed diagram showing a state when starting the engine-stop control process according to the embodiment of the invention.
Figure 36:
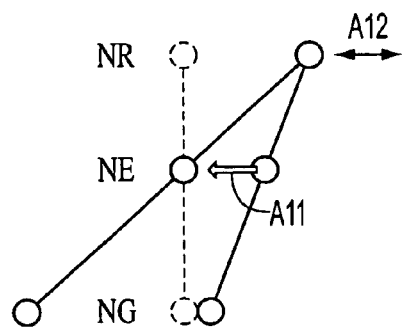
FIG. 36 is a third speed diagram showing a state during the engine-stop control process according to the embodiment of the invention.

FIGS. 34–36 are speed diagrams showing, respectively, the state before starting the engine-stop control process; the state when starting the engine-stop control process; and the state during the engine-stop control process according to the embodiment of the invention.

In the drawings, the broken lines indicate a ring-gear speed NR, an engine speed NE, and a generator speed NG when the hybrid vehicle is in stop mode. Referring to FIG. 34, the solid line indicates the state in which the engine 11 and the drive motor 25 are in operation and the generator brake B is engaged. When the engine-stop control process is started in the state of FIG. 34, the target engine speed $NE^*$ is decreased with the deceleration $\beta$. As a result, the engine speed NE is gradually decreased in the direction of the arrow A11, as shown in FIG. 35.

In that case, as described above, even if the friction in the engine 11, the generator 16, etc. varies or the temperature or viscosity of the lubricating and cooling oils varies to fluctuate the ring-gear speed NR in the direction of the arrow A12, as shown in FIG. 36, and fluctuate the drive-motor speed NM similarly, the engine speed NE can be stably decreased.

Thus, also when the vehicle drive system is installed in a hybrid vehicle, the crankshaft can certainly be placed at the target stop position when the engine-stop control process is finished, so that the engine 11 can certainly be stopped at the target stop position.

A variation of the invention will be described in which the correction value $\delta NE^*$ is assigned a weight when the target engine speed $NE^*$ is corrected.

Figure 37:
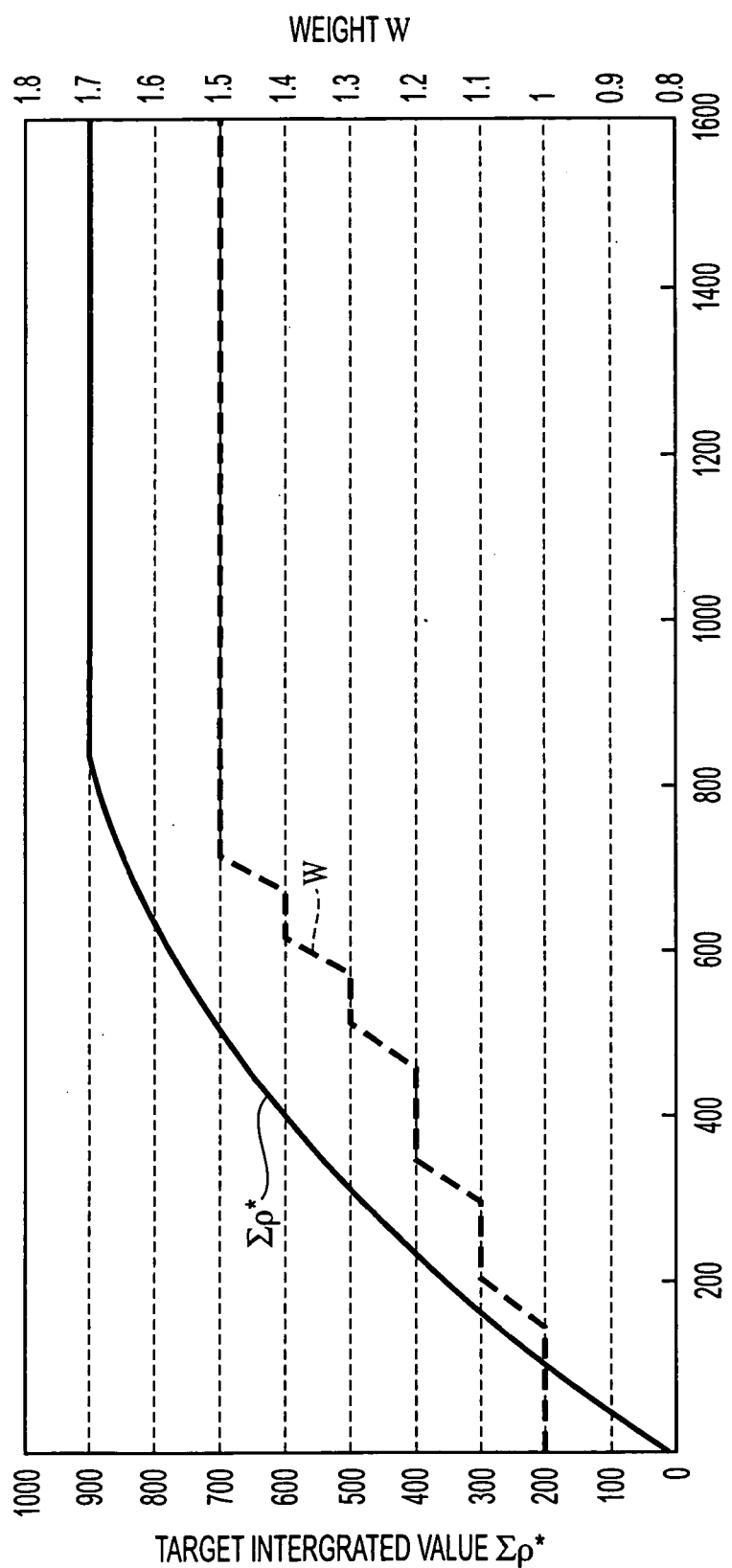
FIG. 37 is a first diagram of a target-integrated-value map according to a variant of the invention.
Figure 39:
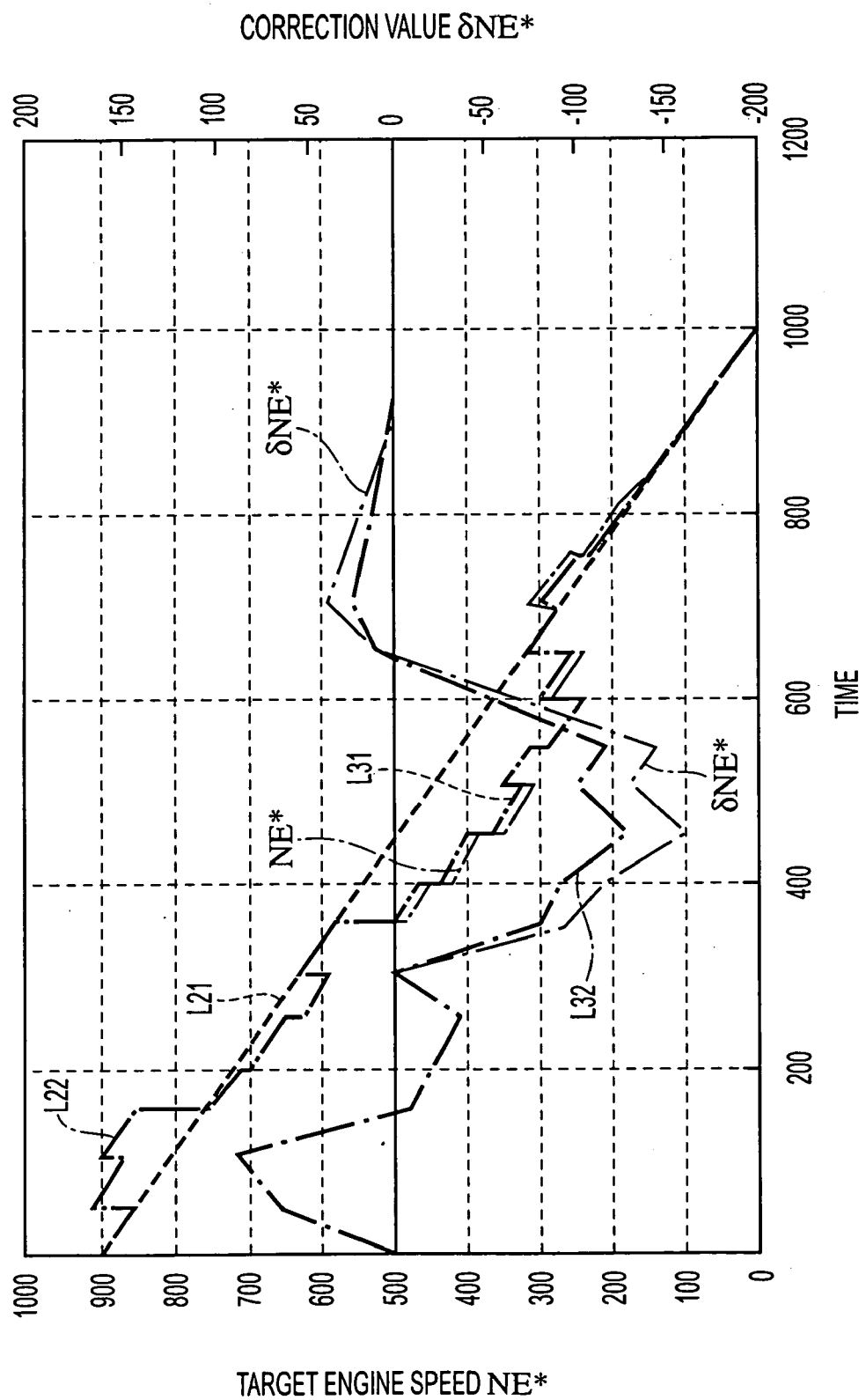
FIG. 39 is a graph of the operation of a target-engine-speed correction process according to the variant of the invention.

FIGS. 37 and 38 are first and second diagrams of target-integrated-value maps of the variation of the invention and FIG. 39 is a graph of the operation of a target-engine-speed correction process according to the variation of the invention. In FIG. 37, the horizontal axis is scaled in terms of time and the vertical axis is scaled in terms of the target integrated value $\Sigma\rho^*$ and the weight w. In FIG. 39, the horizontal axis is scaled in terms of time and the vertical axis is scaled in terms of the target engine speed $NE^*$ and the correction value $\delta NE^*$.

In this case, when the target engine speed $NE^*$ is switched by correcting it every specified correction switch timing, the weight w is set in addition to the target integrated value $\Sigma\rho^*$ serving as a target deviation, which is set as the target deviation map and the target-integrated-value map, as shown in FIGS. 37 and 38, in correspondence with the elapsed time from the start of reduction of the engine speed NE and is recorded in the recording device of the vehicle control unit 51.

Upon starting the reduction of the engine speed NE, the crank-angle acquisition means 92 (FIG. 1) of the engine-speed reduction means executes the crank-angle acquisition process to read and acquire the actual crank angle ρ at every control timing. The integrated-value calculation means, serving as the crank-angle-deviation calculation means of the engine-speed reduction means, executes the integrated-value calculation process, serving as the crank-angle-deviation calculation process, to calculate the integrated value Σρ that is the deviation of the crank angle ρ from the reduction-start reference position.

The target-engine-speed correction-value calculation means of the engine-speed reduction means executes the target-engine-speed correction-value calculation process to determine whether the timing is correction switch timing, wherein when it is the correction switch timing, the correction value δNE* of the target engine speed NE* is calculated.

Specifically, the target-engine-speed correction-value calculation means reads the integrated value Σρ at the correction switch timing and also reads the target integrated value Σρ* and the weight w corresponding to the elapsed time after the start of reduction of the engine speed NE with reference to the target-integrated-value map, and calculates the deviation ΔΣρ between the integrated value Σρ and the target integrated value Σρ* as follows:

ΔΣρ=Σρ*−Σρ and further calculates the correction value δNE* of the target engine speed NE*, shown in FIG. 39, from the deviation ΔΣρ as follows:

δ$NE$*=$k·w·$ΔΣρ where k is a constant. The weighting is thus performed when the correction value δNE* is calculated from the deviation ΔΣρ.

Subsequently, the target-engine-speed correction means 93 of the engine-speed reduction means executes the target-engine-speed correction process to read the target engine speed NE* at the correction switch timing with reference to the target-engine-speed map and correct the target engine speed NE* from the correction value δNE* as follows:

NE*←NE*+δNE*.

Referring to FIG. 39, reference symbol L21 denotes a target engine speed NE* before correction, which is read from the recording device, symbol L22 denotes a target engine speed NE* after the correction, symbol L31 denotes a target engine speed NE* when the weighting is not performed (base embodiment), and symbol L32 denotes a correction value δNE* when the weighting is not performed.

The shorter the elapsed time from the start of reduction of the engine speed NE, the lower the weight w is; the longer the elapsed time from the start of reduction of the engine speed NE, the higher the weight w is, so that it is low with increasing engine speed NE and high with decreasing engine speed NE.

Consequently, even when the engine speed NE is reduced with the elapsed time from the start of reduction of the engine speed NE, the weight w is increased to correspond to an increase in the correction value δNE*, allowing appropriate correction of the target engine speed NE* to ensure that the engine 11 stops at the target stop position.

Another variation of the invention will be described in which the rate of change ΔNE* of the target engine speed NE* is calculated every correction switch timing. The components with the same structure as those of the first embodiment are given the same numerals and their description will be omitted. The advantages owing to the same structure will be extended to this embodiment.

Figure 40:
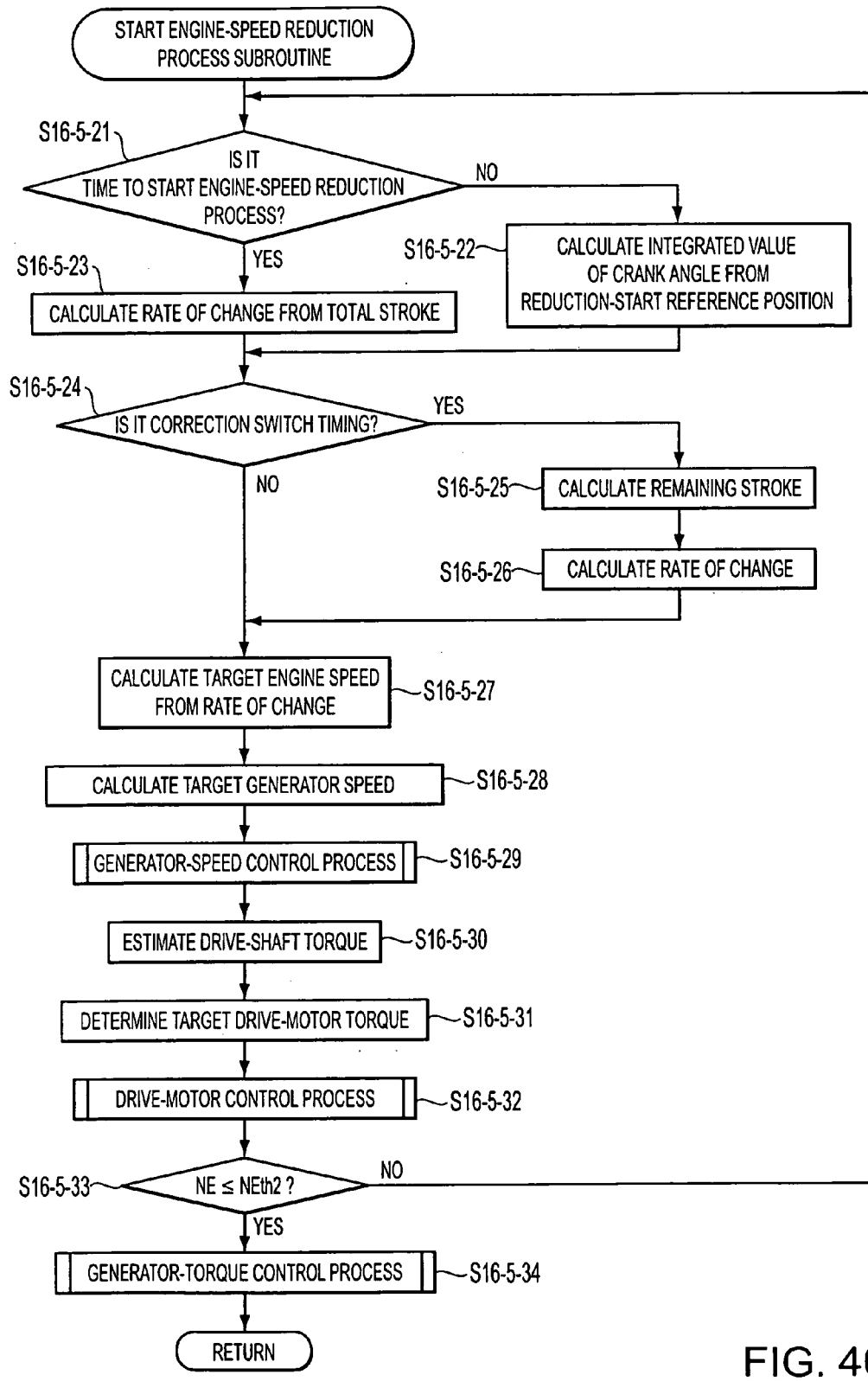
FIG. 40 is a diagram of the subroutine of an engine-speed reduction process according to a further variant of the invention.
Figure 41:
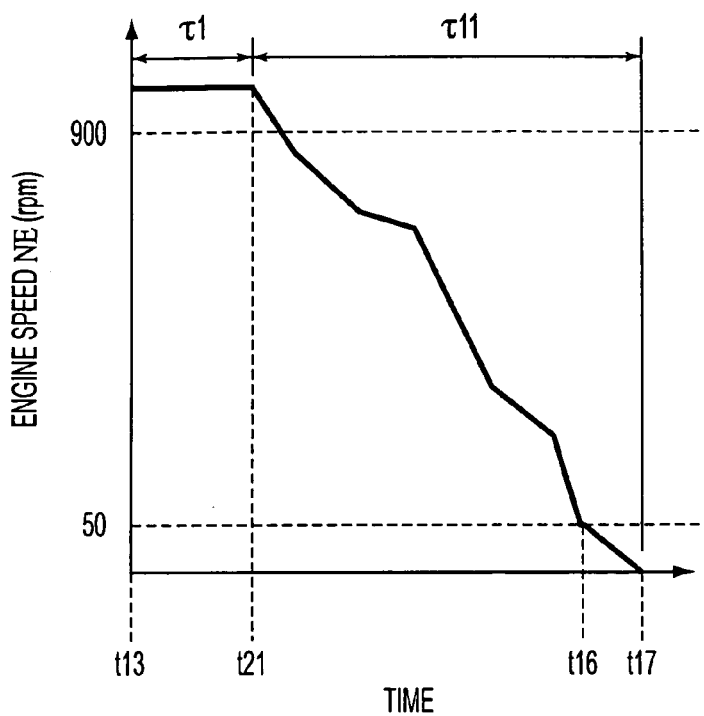
FIG. 41 is a time chart for the operation of an engine-stop control process according to the further variant of the invention.
Figure 42:
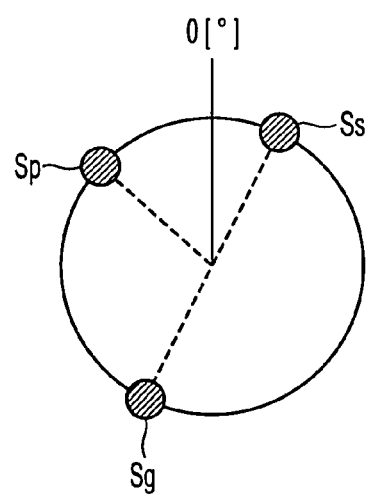
FIG. 42 is an explanatory diagram of a crank angle according to the further variant of the invention.
Figure 43:
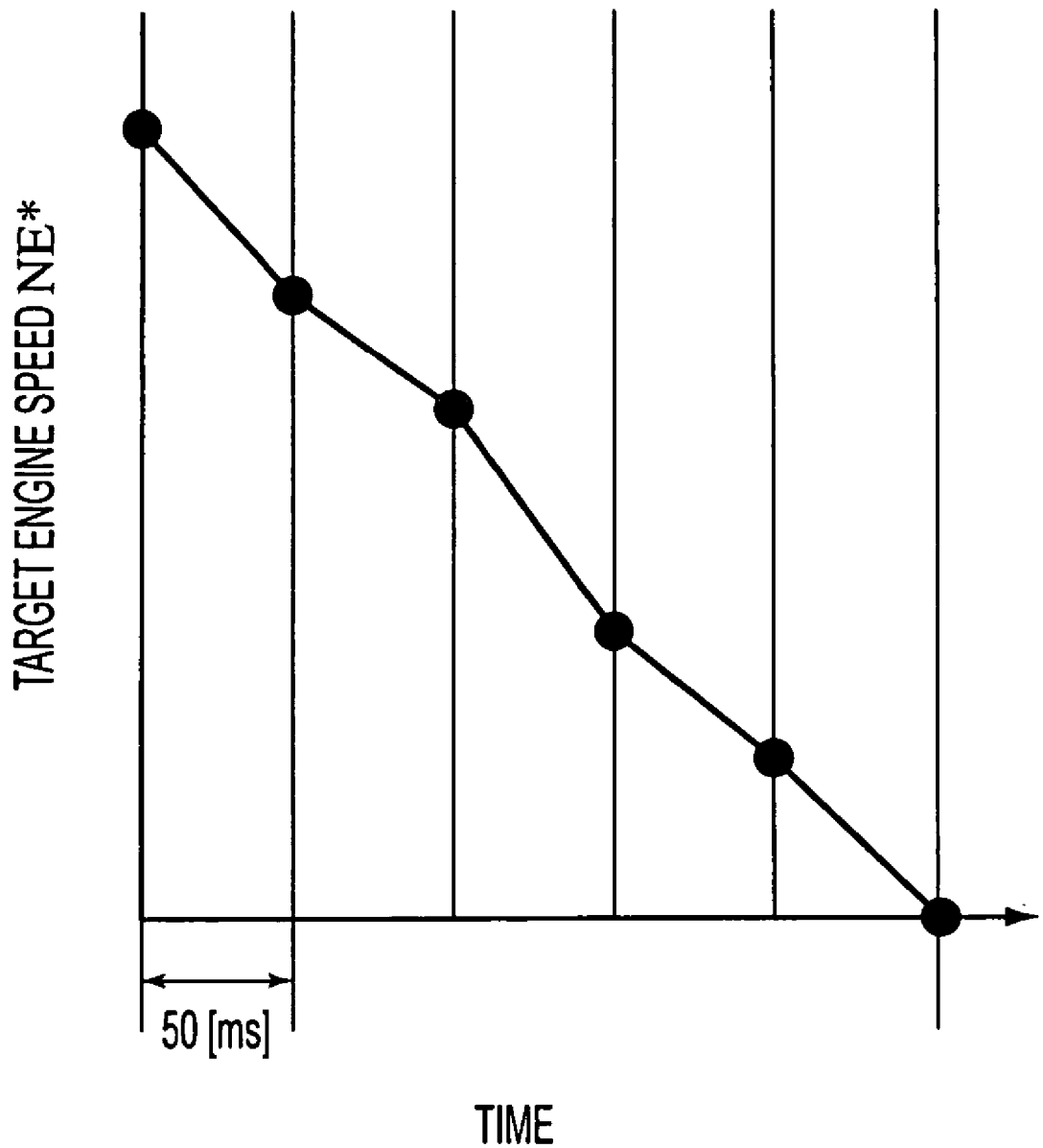
FIG. 43 is a conceptual diagram of the change in target engine speed according to the further variant of the invention.

FIG. 40 is a flowchart of the subroutine of an engine-speed reduction process according to the another variation of the invention. FIGS. 41–43 illustrate concepts of the variation. In FIG. 43, the horizontal axis is scaled in terms of time and the vertical axis is scaled in terms of target engine speed NE*.

In this variation, as in the base invention, the engine-stop control means stops the fuel injection and ignition of the engine 11 at timing t11 (FIG. 29) to set the throttle opening θ to 0%, reads the generator-mode switching signal produced by the vehicle control unit 51 at timing t12, sets the target engine speed NE* to an idling speed Nid (for example, 900 rpm) that is a threshold, and waits for the engine speed NE to reach the idling speed Nid.

When the engine speed NE has reached the idling speed Nid at timing t13, the engine-speed reduction means of the engine-stop control means starts engine-speed reduction process (step S16-5-21, Yes). More specifically, the preprocess means of the engine-speed reduction means executes a preprocess to start timing with the timer built into the vehicle control unit 51, drives the generator 16, thereby operating the engine 11 with no load at the idling speed Nid for time τ1 (for example, 500 ms). This eliminates the variation in pressure in the cylinders 101 (see FIG. 27) of the engine 11 after the fuel injection and ignition have been stopped.

The engine-speed reduction means starts reduction of the engine speed NE at a specified timing t21. A reduction-start-position reading means of the engine-speed reduction means therefore executes reduction-start-position reading process to read the crank angle ρ at that time from the crank-angle sensor 56 and set it as a reduction start position Sp.

A total-stroke calculation means of the engine-speed reduction means executes a total-stroke calculation process to reduce the engine speed NE at the start of reduction of the engine speed NE, 900 rpm (idling speed Nid) in this embodiment, to 0 rpm, with a specified deceleration β1, 900 ms/s in this embodiment, and calculates a stroke γ necessary to move the crankshaft to a target stop position Sg.

In this case, because the engine speed NE is 900 rpm in the initial stage, which is brought to 0 rpm in a specified time τ11, one second in this embodiment, the number of revolutions RX of the engine 11 necessary to move to the target stop position Sg is expressed as $$RX = (900/60) \times 1 - (1/2) \times (900/60) \times 1^2$$
$$= 7.5 \text{ [revolutions]}.$$

Accordingly, the stroke γ can be written as $$\gamma = 7.5 \times 360$$
$$= 2,700 \text{ } [deg].$$

The total-stroke calculation means calculates the position of the crank angle ρ upstream from the target stop position Sg in the rotating direction by a stroke γ (7.5 rev.) as reference position Ss and further calculates the difference ΔS between the reduction start position Sp and the reference position Ss. The reference position Ss theoretically corresponds to the reduction-start reference position of the base invention; in this variant, the reduction of the engine speed NE is not started at the reference position Ss but the reduction start position Sp is set separately.

The total-stroke calculation means adds the difference ΔS to the stroke γ to calculate a total stroke Tγ of the crankshaft from the reduction start position Sp to the target stop position Sg using the expression $$T\gamma = \gamma + \Delta S.$$

A rate-of-change calculation means of the engine-speed reduction means executes a rate-of-change calculation process (step S16-5-23) to read the present target engine speed NE* and the total stroke Tγ and calculates the rate of change dNE* of the target engine speed NE* necessary to bring the present target engine speed NE* to 0 rpm during the interval of moving the crankshaft by the total stroke Tγ as follows:

$$dNE^* = NE^* \cdot NE^* \times 3/T\gamma$$
$$= NE^* \cdot NE^* \times 3/(\gamma + \Delta S).$$

It is then determined whether the timing is correction switch timing. When it is the correction switch timing (step S16-5-24, Yes), the procedure moves to step S16-5-25; when it is not the correction switch timing, the procedure moves to step S16-5-27.

In step S16-5-27, the target-engine-speed calculation means of the engine-speed reduction means executes target-engine-speed calculation process to calculate the target engine speed NE* from the rate of change dNE*.

The target-generator-speed calculation means of the engine-speed reduction means executes target-generator-speed calculation process to read the ring-gear speed NR and the target engine speed NE*, calculate the target generator speed NG* from the ring-gear speed NR and the target engine speed NE* by the rotational-speed relationship, and send it to the generator control unit 47 (step S16-5-28). In the generator control unit 47, the generator-speed control process of FIG. 22 is executed wherein the torque of the generator 16 is controlled so that the generator speed NG reaches the target generator speed NG* (step S16-5-29).

Subsequently, as in steps S25 to S27, the drive-shaft-torque estimation means estimates the drive-shaft torque TR/OUT (step S16-5-30) and the target drive-motor torque calculation means determines the target drive-motor torque TM* and sends it to the drive-motor control unit 49 (step S16-5-31). In the drive-motor control unit 49, the drive-motor control means controls the torque of the drive motor 25 according to the target drive-motor torque TM*, thereby controlling the drive-motor torque TM (step S16-5-32).

It is determined whether the engine speed NE is lower than the stop speed NEth2. When the engine speed NE is lower than the stop speed NEth2, the procedure moves to step S16-5-34; when the engine speed NE is higher than the stop speed NEth2, the procedure returns to step S16-5-21.

In step S16-5-34, the target generator speed NG* is thus calculated from the target engine speed NE* to control the rotational speed of the generator 16.

In this variation, the target engine speed NE* is switched by correcting it at every specified correction switch timing (step S16-5-24, Yes) in order to stop the engine 11 at the target stop position Sg. The correction switch timing is set at a time interval longer than the control timing, for example, 50 ms, as in the first embodiment.

When the reduction of the engine speed NE has not been started (step S116-5-21, No), the crank-angle acquisition means 92 of the engine-speed reduction means executes the crank-angle acquisition process to read and acquire an actual crank angle ρ every control timing. The integrated-value calculation means, serving as the crank-angle-deviation calculation means of the engine-speed reduction means, executes the integrated-value calculation process serving as the crank-angle-deviation calculation process (step S16-5-22) to calculate an integrated value Σρ that is the deviation of the crank angle ρ from the reduction-start position Sp. In this case, the integrated value Σρ can be acquired by calculating the amount of change Δρ of the crank angle ρ every control timing with the initial value at 0 and integrating them and the process moves to step S16-5-24.

Further, when it is correction switch timing (step S16-5-24, Yes), a remaining-stroke calculation means of the engine-speed reduction means executes a remaining-stroke calculation process (step S16-5-25). The present engine speed NE is read and the stroke to the target stop position, which is indicated by the value obtained by subtracting the integrated value Σρ from the total stroke Tγ, namely, a remaining stroke Pr is calculated, as follows:

$$Pr = T\gamma - \Sigma\rho.$$

The rate-of-change calculation means calculates the rate of change dNE* (step S16-5-26) of the target engine speed NE* necessary to bring the present engine speed NE to 0 rpm while moving the crankshaft by a stroke Pr from the remaining stroke Pr and the target engine speed NE* as follows:

$$dNE^* = NE^* \cdot NE^* \times 3/Pr$$
$$= NE^* \cdot NE^* \times 3/(T\gamma + \Sigma\rho).$$

In this case, the rate-of-change calculation means constitutes the target-engine-speed correction-value calculation means. The target-engine-speed correction-value calculation means executes a target-engine-speed correction-value calculation process to calculate the rate-of-change dNE* as a correction value. The total-stroke calculation means and the remaining-stroke calculation means constitute the stroke calculation means; the total-stroke calculation process and the remaining-stroke calculation process constitute the stroke calculation process.

When the rate of change dNE* is thus calculated every correction switch timing, the target-engine-speed correction means 93 of the engine-speed reduction means executes target-engine-speed correction process (in step S16-5-27) to calculate the target engine speed NE* and correct it as follows:

$$NE^* \leftarrow NE^* \cdot dNE^*.$$

The target engine speed NE* is thus corrected according to the rate of change dNE*, as shown in FIG. 43. The target engine speed NE* is corrected every correction switch timing and kept at the same value until the following correction switch timing. The target engine speed NE* is thus corrected at every correction switch timing to gradually bring the engine speed NE close to 0 rpm. When the control of the engine speed NE is continued with the engine speed NE close to 0 rpm, as in the base invention, the one-way clutch F (FIG. 6) can be locked.

Accordingly, as in the base invention, the end-condition-fulfillment determination means of the engine-speed reduction means executes end-condition-fulfillment determination process to determine whether the end condition for finishing the control of the engine speed NE has been met depending on whether the engine speed NE is equal to or lower than the stop speed NEth2 (for example, 50 rpm) (step S16-5-33), wherein when the engine speed NE is lower than the stop speed NEth2, it determines that the end condition has been met. When the stop speed NEth2 (for example, 50 rpm) is set lower than the resonance speed of the damper gear Dp disposed between the engine 11 and the generator 16, the resonance speed of the damper gear Dp can quickly be passed through. The vibration of the engine 11 at stopped mode can thus be reduced.

When the end condition is met at timing t16, the engine-speed reduction means and the engine-stop control means controls the torque of the generator 16 (step S16-5-34) while setting the target generator torque TG* to be sent to the generator control unit 47 at zero. At that time the routine is complete and the process returns to where the subroutine was called.

When the engine speed NE reaches 0 rpm at timing t17, the engine-stop control means sends an instruction to stop the operation of the generator 16 to the generator control unit 47. The generator control unit 47 stops the switching to the generator 16 to shut down the generator 16.

As this variation of the invention calculates the target engine speed NE* for reducing the engine speed NE from the total stroke Tγ and the integrated value Σρ and corrects it, it requires no target-engine-speed map and no target-integrated-value map, thus reducing the cost of the hybrid-vehicle-drive control system.

In the base invention and the previously described variations, the crank angle sensor 56 is used to detect the crank angle ρ. The pickup sensor, used as the crank angle sensor 56, however, detects the crank position ρ only once during one rotation of the crankshaft, having a long detection period, so that it is necessary to calculate the crank position ρ during the interval after the crank position ρ is detected until the next time the crank position ρ is detected by interpolation. Accordingly, the crank position ρ calculated by interpolation and an actual crank position, namely, an actual crank position ρA sometimes are different, reducing detection accuracy correspondingly. As a result, when the engine-speed reduction process is executed in accordance with the crank angle detected by the crank angle sensor 56, the accuracy at the time of stopping the engine 11 at the target stop position is decreased.

As described, the engine 11 and the generator 16 of the vehicle drive system with the above structure are mechanically connected. Accordingly, when the generator rotor position θG is expressed in terms of a mechanical angle, that is, the angle from a specified reference point, the actual crank angle ρA of the crankshaft and the generator rotor position θG correspond to each other, varying in the same cycle.

Accordingly, yet another variant of the invention will be described in which a crank angle ρG is calculated from the generator rotor position θG detected by the generator-rotor position sensor 38 and so the engine-speed reduction process is executed according to the calculated crank angle ρG in place of the crank angle ρ.

Figure 44:
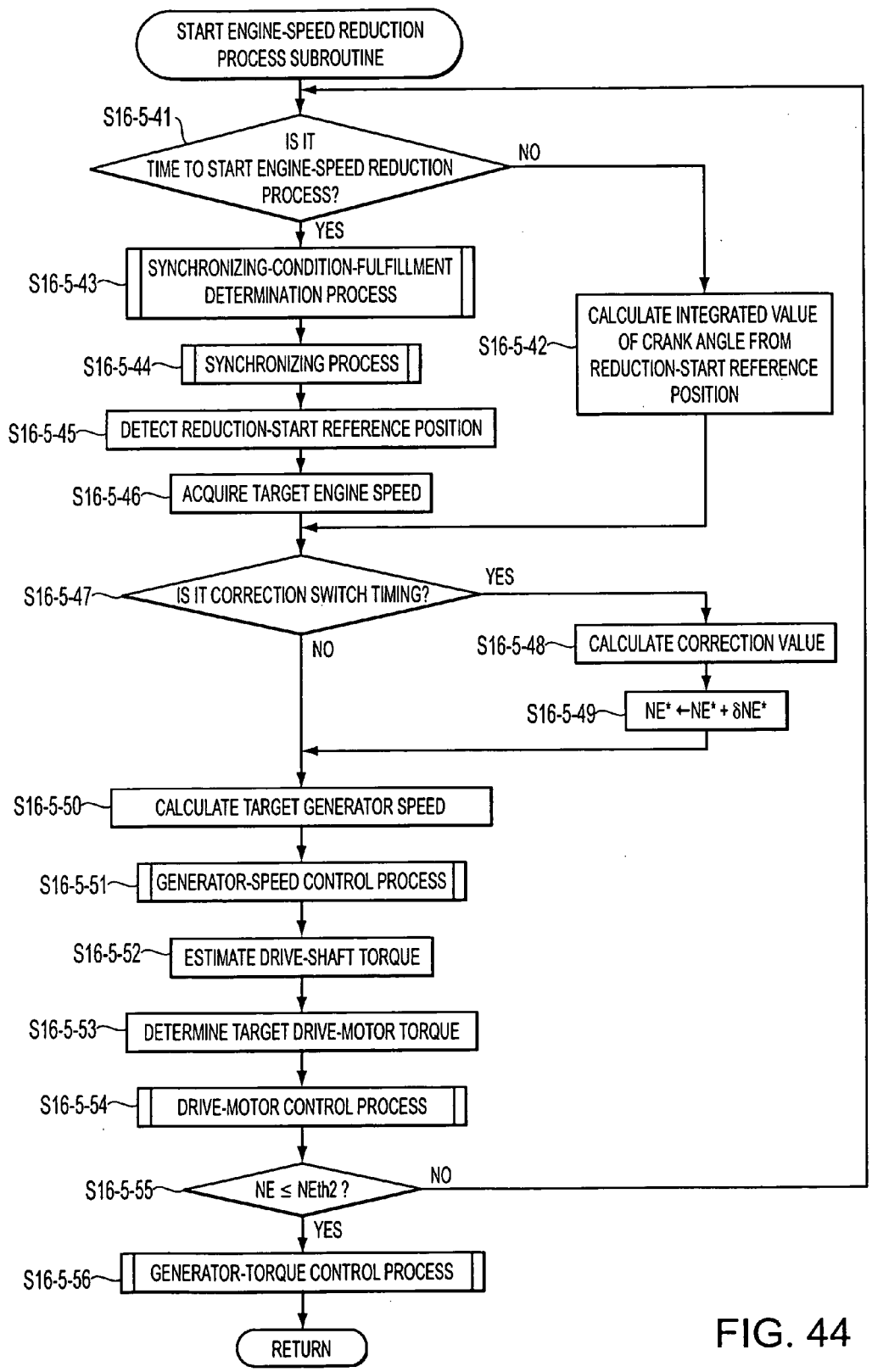
FIG. 44 is a diagram of the subroutine of an engine-speed reduction process according to yet another variant of the invention.
Figure 45:
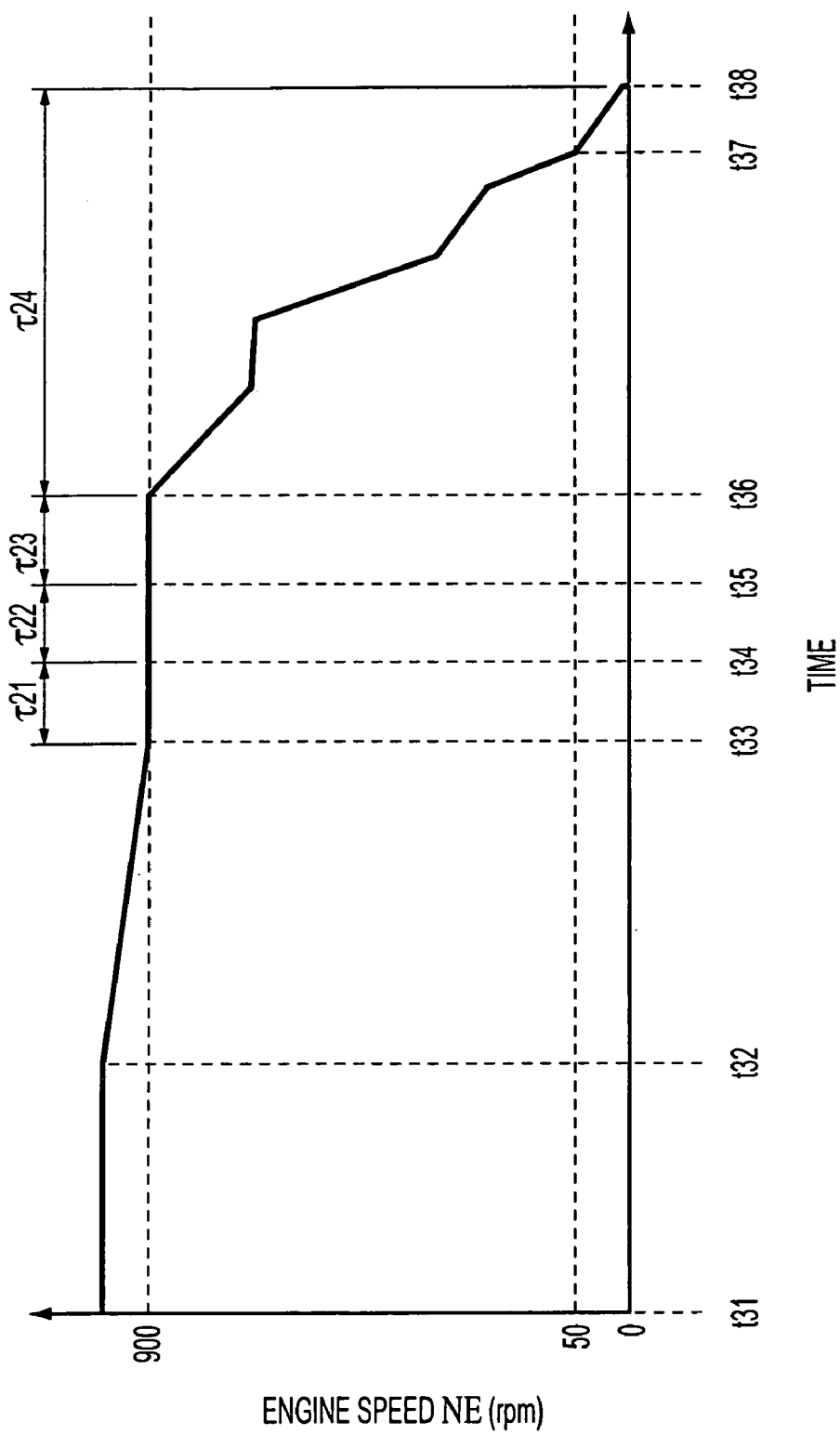
FIG. 45 is a time chart for the operation of an engine-stop control process according to the yet another variant of the invention.

FIG. 44 is a diagram of the subroutine of the engine-speed reduction process according to the yet another variant of the invention; and FIG. 45 is a time chart for the operation of the engine-stop control process according to this variation of the invention.

The engine 11 and the drive motor 25 are first driven so that, when the engine 11 is operated according to the target engine speed NE* and the drive motor 25 is operated according to the target drive-motor speed NM*, the engine 11 moves from the operating region AR1 to the stop region AR2 (FIG. 17). Then the engine-stop control means determines whether the generator brake B has been released. When the generator brake B has not been released and is in engagement, the engine-stop control means sends an instruction to release the generator brake B to the generator control unit 47, and so the generator-brake-release control means executes the generator-brake-release control process of FIG. 24 to release the generator brake B.

When the generator brake B has been released, the engine-stop control means issues an engine stop request to the engine control unit 46 at timing t31, stopping the fuel injection and ignition of the engine 11 to bring the throttle opening θ to 0%.

The engine-stop control means reads a generator-mode switching signal generated by the vehicle control unit 51 at timing t32, sets the target engine speed NE* to an idling speed Nid (for example, 900 rpm) that is a threshold, and waits for the engine speed NE to reach the idling speed Nid.

When the engine speed NE has reached the idling speed Nid at timing t33, the engine-speed reduction means of the engine-stop control means starts the engine-speed reduction process. More specifically, the preprocess means of the engine-speed reduction means executes a preprocess to drive the generator 16 to rotate at a specified target generator speed NG*, thereby operating the engine 11 with no load at the idling speed Nid for time τ21 (for example, 500 ms). This eliminates the variation in pressure in the cylinders 101 (see FIG. 27) of the engine 11 after the fuel injection and ignition have been stopped (step S116-5-41, Yes).

When the variation in pressure in the cylinders 101 of the engine 11 is eliminated, the reduction-start reference position is detected and so the reduction of the engine speed NE is started according to the reduction-start reference position, as described above. Because the output shaft 12, however, has the damper gear Dp between the driving part 12a and the driven part 12b, the spring ds is deflected by friction in the engine 11 to cause torsion in the damper gear Dp while the engine 11 is operated with no load by the torque control of the generator 16, so that the driving part 12a is rotated later than the driven part 12b, thus increasing the crank angle ρG as compared with the actual crank angle ρA. Consequently, when the engine speed NE is reduced by using the crank angle ρG as it is, the engine 11 cannot be stopped accurately at the target stop position.

Accordingly, the crank-angle acquisition means 92 (FIG. 1) of the engine-speed reduction means executes a crank-angle acquisition process to acquire a crank angle ρx after zero-point adjustment by synchronizing the crank angle ρG with the actual crank angle ρA to perform zero-point adjustment.

To this end, a crank-angle calculation means (not shown) of the crank-angle acquisition means 92 executes a crank-angle calculation process to read the generator rotor position θG detected by the generator-rotor position sensor 38 and calculate the crank angle ρG from the generator rotor position θG. A synchronizing-condition-fulfillment determination means (not shown) of the crank-angle acquisition means 92 executes a synchronizing-condition-fulfillment determination process (step S116-5-43) to determine whether the torsion in the damper gear Dp is low and whether specified synchronizing conditions for causing no torsion fluctuation are met when synchronizing the crank angle ρG with the actual crank angle ρA during a lapse of τ22 from timing t34. When the synchronizing conditions are met, a synchronizing means (not shown) of the crank-angle acquisition means 92 executes a synchronizing process (step S16-5-44) to read the crank angle ρ(ts) detected by the crank angle sensor 56 at specified timing ts and the generator rotor position θG(ts) detected by the generator-rotor position sensor 38 at the same timing ts as that of the crank angle sensor 56, calculate the angular difference Δρ(ts) between the crank angle ρG(ts) and the crank angle ρ(ts)

$$\Delta\rho(ts) = \mu G(ts) - \rho(ts)$$

and perform zero-point adjustment of the crank angle ρG according to the angular difference Δρ(ts). In this case, the crank angle ρx after the adjustment is given by subtracting the angular difference Δρ(ts) from the crank angle ρG as follows:

$$\rho x = \rho G - \Delta\rho(ts).$$

The crank angle ρG is thus synchronized with the actual crank angle ρA to be subjected to zero-point adjustment. The crank angle ρG and the actual crank angle ρA can thus be equalized and so the influence of the deflection of the spring ds of the damper gear Dp can be eliminated.

When the reference point of the actual crank angle ρA and the reference point of the generator rotor position θG are different, the value of the crank angle ρx is adjusted by the difference between the angles of the reference points.

In the synchronizing process, the engine torque TE or the generator torque TG fluctuates at the timing ts to calculate the angular difference Δρ(ts), the deflection of the spring ds varies to change the angular difference Δρ(ts), becoming unstable, so that the angular difference Δρ(ts) cannot be accurately calculated. The synchronizing-condition-fulfillment determination means therefore determines whether the synchronizing conditions have been met upon completion of the preprocess at timing t34, as described above, and calculates the angular difference Δρ(ts) while the synchronizing conditions are met.

In this case, the synchronizing conditions include a first and a second condition. The synchronizing-condition-fulfillment determination means determines whether the first condition has been met depending on whether the engine 11 is stopped and determines whether the second condition has been met depending on whether the generator torque TG and the generator speed NG are stable, wherein when both of the first and second conditions have been met, it determines that the synchronizing conditions have been met.

In this embodiment, during the lapse of time τ21, the fuel injection and ignition of the engine 11 are stopped, while the generator 16 is operated according to the specified target generator speed NG*, so that the generator torque TG and the generator speed NG are held within specified ranges. Accordingly, the synchronizing conditions are met at the timing t34 as long as the preprocess is performed smoothly, so that the synchronizing means can calculate the angular difference Δρ(ts). When the engine 11 is not in rotation, the crank angle sensor 56 cannot detect the crank angle ρ; however, because the engine 11 is operated with no load during the time τ22, the crank angle ρ can be detected.

In that case, the use of a resolver as the generator-rotor position sensor 38 always allows accurate detection of the generator rotor position θG without the need for interpolation. As the crank angle ρ(ts) detected by the crank angle sensor 56 at timing t34 is a detected one, it has high accuracy. The accuracy of the crank angle ρx can thus be increased.

The reduction-start-reference-position detection means of the engine-speed reduction means starts the reduction-start-reference-position detection process (step S16-5-45) at timing t35 to read the crank angle ρx and detect the reduction-start reference position serving as the reference to start the reduction of the engine speed NE at the time to stop the engine 11 at the target stop position according to the crank angle ρx. The reduction-start reference position is calculated and set in advance from the target stop position, the moving time and moving speed when the crankshaft is moved to the target stop position, etc., and is expressed in terms of the crank angle ρx.

When a predetermined time τ23 (for example, 2 to 1,000 ms) has passed from the start of the reduction-start-reference-position detection process and the reduction-start reference position is detected at timing t36, the engine-speed reduction means starts the reduction of the engine speed NE (step S16-5-46). At the time of correction switch timing (step S16-5-47), the target-engine-speed correction-value calculation means then calculates the correction value δNE* (step S16-5-48) from the crank angle ρx every correction switch timing and the target-engine-speed correction means 93 corrects the target engine speed NE* (step S16-5-49).

In that case, the engine speed NE is brought to 0 rpm and the position of the crankshaft is moved from the reduction-start reference position to the target stop position Sg (FIG. 42) in a specified time τ24, 1,000 ms in this embodiment. When the end conditions are met at timing t37, the engine-speed reduction means finishes the procedure.

The engine-stop control means brings the target generator torque TG* to be sent to the generator control unit 47 to zero and controls the torque of the generator 16 (FIG. 44, steps S16-5-50 through S16-5-54).

When the engine speed NE reaches 0 rpm at timing t38, the engine-stop control means sends an instruction to stop the operation of the generator 16 to the generator control unit 47. The generator control unit 47 stops the switching to the generator 16 to shut down the generator 16 (step S16-5-55, Yes; step S16-5-56).

In this variant, the crank angle ρx is calculated from the generator rotor position θG detected by the generator-rotor position sensor 38 and so the engine-speed-reduction process can be performed according to the crank angle ρx. Therefore, the accuracy of stopping the engine 11 at the target stop position can be increased.

In the variant, the crank angle ρx is calculated from the generator rotor position θG; the engine 11 and the drive motor 25 of the vehicle drive system are mechanically connected. Accordingly, when the drive-motor rotor position θM is expressed in terms of a mechanical angle that is the angle from a specified reference point, the actual crank angle ρA of the crankshaft and the drive-motor rotor position θM correspond to each other, varying in the same cycle.

The crank angle ρM can thus be calculated from the drive-motor rotor position θM detected by the drive-motor-rotor position sensor 39 and so the engine-speed reduction process can also be executed according to the calculated crank angle ρM in place of the crank angle ρ.

In this variant, while a similar process to those of the base invention and initial variant is performed after completion of the crank-angle acquisition process, a similar process to that of the second variant of FIGS. 40–43 can be performed after completion of the crank-angle acquisition process.

It is to be understood that the invention is not limited to the foregoing base invention and variants thereof; various modifications may be made within the spirit of the invention and are not excluded from the scope of the invention.

What is claimed is:

1. A vehicle-drive control system, comprising:
   target-engine-speed acquisition means for acquiring a target engine speed necessary to reduce engine speed, thereby stopping an engine at a target stop position;
   crank-angle acquisition means for acquiring a crank angle indicative of the position of a crankshaft; and
   target-engine-speed correction means for correcting the target engine speed according to the acquired crank angle.

2. The vehicle-drive control system according to claim 1, further comprising crank-angle-deviation calculation means for calculating a deviation of the crank angle from a reduction-start reference position serving as the reference to start the reduction of the engine speed according to the acquired crank angle, wherein the target-engine-speed correction means corrects the target engine speed according to the deviation of the crank angle.

3. The vehicle-drive control system according to claim 1, further comprising a target deviation map in which a target deviation is set which is indicative of a deviation used as a target of the crank angle from the reduction-start reference position, wherein the target-engine-speed correction means corrects the target engine speed according to a deviation between the target deviation and the calculated crank-angle deviation.

4. The vehicle-drive control system according to claim 3, further comprising target-engine-speed correction-value calculation means for calculating a correction value of the target engine speed from the deviation, wherein the target-engine-speed correction means corrects the target engine speed according to the correction value.

5. The vehicle-drive control system according to claim 1, further comprising:
   stroke calculation means for calculating a stroke to the target stop position from the acquired crank angle; and
   rate-of-change calculation means for calculating a rate of change in target engine speed from the stroke, wherein the target-engine-speed correction means corrects the target engine speed according to the rate of change.

6. The vehicle-drive control system according to claim 5, wherein the stroke calculation means calculates a total stroke from a reduction start position to the target stop position based on a reduction start position at a start of the reduction of the engine speed and the target stop position, and calculates the stroke to the target stop position based on the total stroke and the acquired crank angle, wherein the rate-of-change calculation means calculates the rate of change in target engine speed from the stroke and the target engine speed.

7. The vehicle-drive control system according to claim 6, further comprising crank-angle-deviation calculation means for calculating a deviation of the crank angle from the reduction start position according to the acquired crank angle, wherein the stroke calculation means calculates the stroke to the target stop position from the total stroke and the calculated crank-angle deviation.

8. The vehicle-drive control system according to claim 1, wherein the target-engine-speed correction means corrects the target engine speed every correction switch timing.

9. The vehicle-drive control system according to claim 2, wherein the deviation of the crank angle is an integrated value of the crank angles from the start of a reduction of the engine speed.

10. The vehicle-drive control system according to claim 1, wherein the target-engine-speed correction means reduces the engine speed by controlling an electric motor mechanically joined to the engine.

11. The vehicle-drive control system according to claim 10, further comprising:
    target-electric-motor-speed calculation means for calculating a target electric-motor speed from a corrected target engine speed; and
    electric-motor-speed control means for calculating a target electric-motor torque from the target electric-motor speed to control a torque of an electric motor.

12. The vehicle-drive control system according to claim 11, wherein the engine and the electric motor are joined to different elements of a differential rotator having at least three elements, wherein other elements of the differential rotator are joined to the driving wheels of the vehicle, and wherein the target-electric-motor-speed calculation means calculates the target electric-motor speed from the target engine speed and the rotational speed of the other elements of the differential rotator.

13. The vehicle-drive control system according to claim 10, wherein the target-engine-speed correction means brings a target electric-motor torque to zero when the engine speed becomes lower than a specified value.

14. The vehicle-drive control system according to claim 13, wherein the specified value is set lower than a resonance speed of a damper gear disposed between the engine and an electric motor.

15. The vehicle-drive control system according to claim 1, wherein the crank-angle acquisition means acquires the crank angle indicative of the position of a crankshaft, detected by a crank-angle detecting section.

16. The vehicle-drive control system according to claim 1, wherein the crank-angle acquisition means acquires the crank angle indicative of the position of a crankshaft, according to a rotor position of an electric motor mechanically connected to the engine.

17. The vehicle-drive control system according to claim 16, wherein the crank-angle acquisition means comprises synchronizing means for synchronizing the crank angle calculated from the rotor position with an actual crank angle.

18. The vehicle-drive control system according to claim 17, wherein the synchronizing means synchronizes the crank angle with the actual crank angle when torsion generated in a damper gear disposed between the engine and an electric motor is low and when specified synchronizing conditions for causing no torsion fluctuation are met.

19. The vehicle-drive control system according to claim 17, wherein the synchronizing means synchronizes the crank angle with the actual crank angle in accordance with the difference between a crank angle detected by the crank-angle detecting section at specified timing and a crank angle calculated from the rotor position at the timing.

20. A method for controlling the drive of a vehicle, comprising:
    reducing an engine speed;
    acquiring a target engine speed which is necessary to stop an engine at a target stop position;
    acquiring a crank angle indicative of the position of a crankshaft; and
    correcting the target engine speed according to the acquired crank angle.

21. A program for a method for controlling the drive of a vehicle, wherein a computer functions as target-engine-speed acquisition means for acquiring a target engine speed necessary to reduce engine speed, thereby stopping the engine at a target stop position;
- as a crank-angle acquisition means for acquiring a crank angle indicative of the position of a crankshaft; and
- as a target-engine-speed correction means for correcting the target engine speed according to the acquired crank angle.

22. A vehicle-drive control system, comprising:
a controller that:
- acquires a target engine speed necessary to reduce engine speed, thereby stopping an engine at a target stop position;
- acquires a crank angle indicative of the position of a crankshaft; and
- corrects the target engine speed according to the acquired crank angle.

* * * * *